US007658868B2

(12) United States Patent
Anquetil et al.

(10) Patent No.: US 7,658,868 B2
(45) Date of Patent: Feb. 9, 2010

(54) MOLECULAR ACTUATORS, AND METHODS OF USE THEREOF

(75) Inventors: Patrick A Anquetil, Boston, MA (US); Ian W Hunter, Lincoln, MA (US); John D Madden, Vancouver (CA); Peter G Madden, Somerville, MA (US); Anthony E Pullen, Belmont, MA (US); Timothy M Swager, Newton, MA (US); Bing Xu, Kowloon (HK); Hsiao-Hua Yu, Cambridge, MA (US)

(73) Assignees: Massachusetts Institute of Technology, Cambridge, MA (US); The United States of America as represented by the Secretary of the Navy, Washington, DC (US)

( * ) Notice: Subject to any disclaimer, the term of this patent is extended or adjusted under 35 U.S.C. 154(b) by 358 days.

(21) Appl. No.: 11/603,314

(22) Filed: Nov. 21, 2006

(65) Prior Publication Data
US 2007/0215839 A1 Sep. 20, 2007

Related U.S. Application Data

(63) Continuation of application No. 10/392,354, filed on Mar. 19, 2003, now Pat. No. 7,138,075.

(60) Provisional application No. 60/365,889, filed on Mar. 20, 2002.

(51) Int. Cl.
*H01B 1/00* (2006.01)
*C07D 495/00* (2006.01)
(52) U.S. Cl. ...................... 252/500; 548/527
(58) Field of Classification Search ............... None
See application file for complete search history.

(56) References Cited

U.S. PATENT DOCUMENTS

| 5,312,837 | A  | 5/1994 | Hwang et al. |
| 5,409,959 | A  | 4/1995 | Hwang et al. |
| 5,770,453 | A  | 6/1998 | Beer et al. |
| 5,811,212 | A  | 9/1998 | Tanaka et al. |
| 5,892,033 | A  | 4/1999 | Komamura et al. |
| 6,262,257 | B1 | 7/2001 | Gale et al. |
| 6,355,749 | B1 | 3/2002 | Chung et al. |

FOREIGN PATENT DOCUMENTS

| WO | WO-00/73204 | 12/2000 |
| WO | WO-01/21863 | 3/2001 |

OTHER PUBLICATIONS

Liu et al Tetrahedron Letters 45 (2004) 6137-6177.*
Astumian, R.D., "Making Molecules into Motors", *Scientific American*, Jul. 2001, (57-64).
Ballardini, R., et al. "Artificial Molecular-Level Machines: Which Energy to Mark Them Work?", *Accounts of Chemical Research*, vol. 34, No. 6, 23-33, (2001).
Baughman, R.H., et al., "Micro Electromechanical Actuators Based on Conducting Polymers", *Molecular Electronics*, 267-289, (1991).
Collin, J., et al., Shuttle and Muscles: Linear Molecular Machines Based on Transition Metals, *Accounts of Chemical Research*, vol. 34, No. 6, 477-487, (2001).
Fu, D. et al., Methylcalix[4]arene: A new Versatile Precursor to Inherently Chiral Calix[4]arenes. *J. Org Chem.*, vol. 61, No. 2 (1996).
Full, R. and Meijer, K., "Metrics of Natural Muscle Function", 67-83.
Hunter, I. And LaFontaine, S., A Comparison of Muscle with Artificial Actuators, 178-185, (1992).
Kinsborough, R. and Swager, T., Polythiopene Hybrids of Transition-Metal Bis(salicylidenimine)s: Correlation between Structure and Electronic Properties: *J. American Chemical Society*, 121, 8825-8834, (1999).
Madden J. et al., "Conducting Polymer Actuators as Engineering Materials", *Proceedings of SPIE*, vol. 4695, 176-190, (2002).
Madden, J. et al., "Polypyrrole Actuators: Modeling and Performance", *Proceedings of SPIE*, vol. 4329, 72-83, (2001).
Madden, J., et al., "Fast Contracting Polypyrrole Actuators", *Synthetic Metals*, 113, 185-192, (2000).
Mahadevan, L. and Matsudaira, P., "Motility Powered by Supramolecular Springs and Ratchets", *Science*, vol. 288, (Apr. 7, 2000).
Mao, C., et al., "A Nanomechanical Device Based on the B-Z Transition of DNA", *Nature*, vol. 397, 144-146, (Jan. 13, 1999).
Marsella, M. and Reid, R., "Toward Molecular Muscles: Design and Synthesis of an Electrically Conducting Poly[cyclooctaterathiophene]", *Macromolecules*, vol. 32, No. 18, 5982-5984 (1999).
Otero, T. and Sansinena, J., "Soft and Wet Conducting Polymers for Artificial Muscles", *Adv. Mater*, 10, No. 6, (1998).
Soong, R., et al., "Powering an Inorganic Nanodevice with a Biomolecular Motor", *Science*, vol. 290, 1555-1558, (Nov. 24, 2000).
Takashima, W., et al., "The Electrochemical Actuator Using Electro-chemically-deposited Poly-aniline Film", *Synthetic Methals*, 71, 2265-2266, (1995).

(Continued)

*Primary Examiner*—Kamal A Saeed
(74) *Attorney, Agent, or Firm*—Dana M. Gordon; Foley Hoag LLP

(57) ABSTRACT

The synthesis of thiophene based conducting polymer molecular actuators, exhibiting electrically triggered molecular conformational transitions is reported. Actuation is believed to be the result of conformational rearrangement of the polymer backbone at the molecular level, not simply ion intercalation in the bulk polymer chain upon electrochemical activation. Molecular actuation results from $\pi$-$\pi$ stacking of thiophene oligomers upon oxidation, producing a reversible molecular displacement that leads to surprising material properties, such as electrically controllable porosity and large strains. The existence of active molecular conformational changes is supported by in situ electrochemical data. Single molecule techniques have been used to characterize the molecular actuators.

11 Claims, 25 Drawing Sheets

OTHER PUBLICATIONS

Vale, R. and Milligan, R., "The Way Things Move: Looking Under the Hood of Molecular Motor Proteins", *Science*, vol. 288, 88-95, (Apr. 7, 2000).

Xu, B, et al., "Palladium Couplings on Metallocalix[4]arenes: A Efficient Synthesis of New Functionalized Cavities", *J. Org. Chem.*, 63, 8561-8564, (1998).

Yamakoshi, Y., et al., Synthesis of Molecular-gripper-type Receptors and STM-imaging of Self-assembled Monolayers on Gold, *The Royal Society of Chemistry*, 11, 2895-2897, (2001).

Yu, H. et al., "Toward New Actuating Devices: Synthesis and Electrochemical Studies of Poly (11,23-BIS [2,2'-Bithiophen]-5-YL)-26, 28-Dimethoxycalix [4] Arene-25,27- Diol)", 523-524.

Zahn, S. and Canary, J., "Electron-Induced Inversion of Helical Chirality in Copper Complexes of N,N-Dialkylethionines", *Science*, vol. 288, 1404-1407 (May 2000).

* cited by examiner

Cone     1,2-alternate     1,3-alternate     partial cone

Quaterthiophene film

Quaterthiophene/SPHE composite film

A

B

A

B

Quarterthiophene Monomer — Poly(quarterthiophene)

(a)

(b)

Swelling Mechanism

Expelling Mechanism

MOLECULAR ACTUATORS, AND METHODS OF USE THEREOF

RELATED APPLICATIONS

This application is a continuation of U.S. patent application Ser. No. 10/392,354, filed Mar. 19, 2003, now U.S. Pat. No. 7,138,075; which claims the benefit of priority to U.S. Provisional Patent Application Ser. No. 60/365,889, filed Mar. 20, 2002.

GOVERNMENT SUPPORT

This invention was made in part with support provided by the Office of Naval Research (Contract N00014-99-1-1022); therefore, the government has certain rights in the invention.

BACKGROUND OF THE INVENTION

Human skeletal muscle exhibits combined properties, in terms of active strain, active stress, active strain rate, variable stiffness, power to mass ratio and bandwidth, which classical actuator technologies do not match. Hunter I. W. and Lafontaine S., "A Comparison of Muscle with Artificial Actuators", *Technical Digest IEEE Solid State Sensors and Actuators Workshop*, pp. 178-185, 1992. On the other hand, conducting polymer materials offer properties enabling the creation of biomimetic artificial muscles. Polypyrrole-based actuators, for example, generate forces per cross-sectional area that are up to two orders of magnitude greater than human muscle (40 MPa) with higher power to mass ratios (150 W/kg). In addition, these actuators require low drive voltages and offer typically limited active strain (2%) and limited active strain rate (1%/s). Madden J. D., Madden P. G. and Hunter I. W., "Polypyrrole Actuators: Modeling and Performance", *Electroactive Polymer Actuator and Devices Conference, SPIE 8th Annual International Symposium on Smart Structures and Materials*, Newport Beach, Calif., 2001; Madden J. D., Madden P. G. and Hunter I. W., "Conducting Polymer Actuators As Engineering Materials", *Smart Structures and Materials 2002: Electroactive Polymers Actuators and Devices*, Yoseph Bar-Cohen, Editor, *Proceedings of the SPIE*, Vol. 4695, pp. 176-190, 2002.

Actuation in conducting polymers such as polypyrrole or polyanilines is based on electrochemical oxidation and a resulting diffusion and intercalation of ionic species into the polymer bulk film. Baughman R. H., Shacklette S. W., Plichta E. J. and Becht C., "Electromechanical Actuators Based on Conducting Polymers", *Molecular Electronics*, pp. 267-289, 1991. This ionic intercalation process arises to maintain electro-neutrality during the oxidation process, leading to significant volume changes. In addition, accommodation of these ions and their associated solvated species is favored by the weak polymer interchain interactions compared to the modulus along the polymer molecular backbone. As a result strains on the order of 2% are produced upon electroactivation. It is conceivable that ultimately the maximum strain achievable in these "classical" conducting polymer actuators is going to be limited by the inability of the polymer molecular backbone to significantly change length to accommodate further ions.

Molecular actuators, i.e. biological or synthetic molecular systems performing work upon consumption of energy have triggered great interest in various fields such as biology, chemistry, chemical engineering and mechanical engineering. Soong R. K., Bachand G. D., Neves H. P., Olkhovets A. G., Craighead H. G. and Montemagno C. D., "Powering an Inorganic Nanodevice with a Biomolecular Motor", *Science*, Vol. 290, pp. 1555-1558, 2000; Astumian R. D., "Making Molecules into Motors", *Scientific American*, pp. 57-64, July 2001; Ballardini R., Balzani V., Credi A., Gandolfi M. T. and Venturi M., "Artificial Molecular-Level Machines: Which Energy to Make them Work?", *Accounts of Chemical Research*, Vol. 34, pp. 445-455, 2001; Collin J. P., Dietrich-Buchecker C., Jimenez-Molero M. C. and Sauvage J. P., "Shuttles and Muscles: Linear Molecular Machines Based on Transition Metals", *Accounts of Chemical Research*, Vol. 34, pp. 477-487, 2001. Various biological machines such as the ATP synthase, or kinesins have been studied extensively; Synthetic non-conducting polymer molecules embedding metal complexes that exhibit electron-induced (redox) chirality have been created; Molecular (robotic) grippers made from resorcin[4]arene have been demonstrated, to cite just a few. Zahn S. and Canary J. W., "Electron-Induced Inversion of Helical Chirality in Copper Complexes of N,N-Dialkylmethionines", *Science*, Vol. 288, pp. 1404-1407, 2000; Yamakoshi Y., Schlitter R. R., Gimzewski J. K. and Diederich F., "Synthesis of Molecular-Gripper Type Dynamic Receptors and STM-imaging of Self-Assembled Monolayers on Gold", *Journal of Materials Chemistry*, Vol. 11, pp. 2895-2897, 2001. A possible mechanism of molecular actuation using cyclooctatetrathiophene conducting polymers has also been recently investigated by Marsella and colleagues. Marsella M. J. and Reid R. J., "Toward Molecular Muscles: Design and Synthesis of an Electrically Conducting Poly[cyclooctatetrathiophene]", *Macromolecules*, Vol. 32, pp. 5982-5984, 1999. Such materials with large contractions and great strength will lead to many useful applications.

SUMMARY OF THE INVENTION

Syntheses of thiophene-based conducting polymer molecular actuators are disclosed. It is believed that these compounds utilize π-π stacking as a driving force for actuation. Initial actuation studies of poly(quarterthiophene)/sulfated poly(β-hydroxyethers) ("poly(QT)/S-PHE") bulk films indicate that large strains are observable in these materials. Importantly, for example, such muscle-like actuators enable advances in autonomous and life-like robotics, artificial organs and prostheses, and micro/nanosystem fabrication.

A new class of molecular actuators where bulk actuation mechanisms such as ion intercalation are enhanced by controllable single molecule conformational rearrangements offers great promise to exhibit large active strains at moderate stresses. Initial activation of poly(quarterthiophene) ("poly (QT)") based molecular muscles, for example, show active strains in the order of 20%. Molecular rearrangements in these conjugated polymers are believed to be driven by the formation of π-dimers (e.g. the tendency of π orbitals to align due to Pauli's exclusion principle) upon oxidation of the material creating thermodynamically stable molecular aggregates. Such thiophene based polymers, however, suffer from being brittle and difficult to handle. Polymer composites of the active polymer with a sulfated polymeric anion were therefore created and studied to increase the mechanical robustness of the films. This additional polyelectrolyte is a Sulfated Poly-β-Hydroxy Ether (S-PHE) designed to form a supporting elastic matrix for the new contractile compounds. Co-deposition of the polyanion with the conducting polymer material provides an elastic mechanical support to the relatively stiff conjugated polymer molecules, thus reducing film brittleness. The active properties of such poly(QT)/S-PHE polymer actuator composites based on intrinsic molecular contractile units are presented and discussed.

In certain embodiments, the polymers of the present invention are represented by formula I:

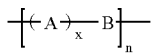   I wherein,

A represents independently for each occurrence heteroaryl;

x is independently for each occurrence an integer from 2 to 8 inclusive;

B represents independently for each occurrence a polycyclic diradical selected from the group consisting of

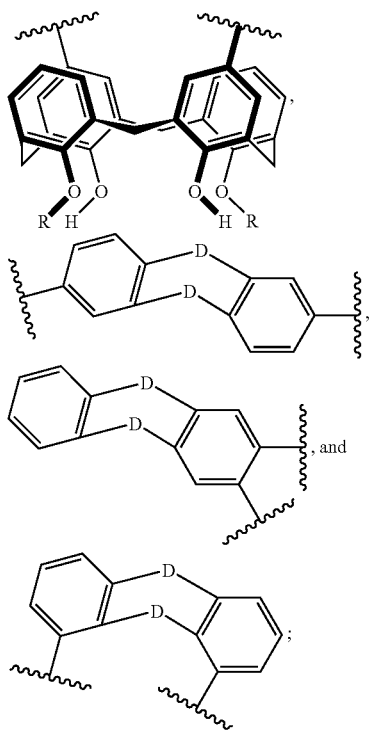

wherein

D is independently for each occurrence O, S, or N;

R represents independently for each occurrence H, alkyl, alkaryl, alkenyl, alkynyl, silyl, alkylthio, imino, amido, phosphoryl, phosphonate, phosphine, phosphonamide, carboxyl, carboxamide, keto, alkylsulfonyl, arylsulfonyl, selenoalkyl, formyl, ester, heteroalkyl, cyano, guanidine, amidine, acetal, ketal, aryl, heteroaryl, aralkyl, heteroaralkyl, epoxide, hydroxamic acid, imido, oxime, sulfonamine, sulfonamide, sulfonomate, thioamide, thiocarbamate, urea, thiourea, saturated or mono or poly unsaturated fatty acid, or —$(CH_2)_m$—$R_{80}$, or two instances of R taken together represent —$CH_2CH_2OCH_2(CH_2OCH_2)_yCH_2OCH_2CH_2$—, with the proviso that R is not methyl;

$R_{80}$ represents independently for each occurrence an aryl, cycloalkyl, cycloalkenyl, heterocyclyl, or polycyclyl group;

m is independently for each occurrence an integer in the range 0 to 8 inclusive;

y is an integer in the range 0 to 3 inclusive; and n represents an integer from 2 to about 100.

In certain embodiments the polymers of the present invention are represented by formula I and the attendant definitions, wherein R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_y$ $CH_2OCH_2CH_2$—.

In certain embodiments the polymers of the present invention are represented by formula I and the attendant definitions, wherein heteroaryl is selected independently for each occurrence from the group consisting of pyrroles, furans, thiophenes, imidazoles, oxazoles, thiazoles, triazoles, pyrazoles, pyridines, pyrazines, pyridazines, 2,3-dihydrothieno [3,4-b]-1,4-dioxins, and pyrimidines.

In certain embodiments the polymers of the present invention are represented by formula I and the attendant definitions, wherein heteroaryl is selected independently for each occurrence from the group consisting of furans, pyrroles, thiophenes, and 2,3-dihydrothieno[3,4-b]-1,4-dioxins.

In certain embodiments the polymers of the present invention are represented by formula I and the attendant definitions, wherein R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_y$ $CH_2OCH_2CH_2$—; and heteroaryl is selected independently from the group consisting of pyrroles, furans, thiophenes, imidazoles, oxazoles, thiazoles, triazoles, pyrazoles, pyridines, pyrazines, pyridazines, 2,3-dihydrothieno[3,4-b]-1,4-dioxins, and pyrimidine.

In certain embodiments the polymers of the present invention are represented by formula I and the attendant definitions, wherein R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_y$ $CH_2OCH_2CH_2$—; and heteroaryl is selected independently from each occurrence from the group consisting of furans, pyrroles, thiophenes, and 2,3-dihydrothieno[3,4-b]-1,4-dioxins.

In certain embodiments the polymers of the present invention are represented by formula I and the attendant definitions, wherein A is thiophene, x is 2, B is

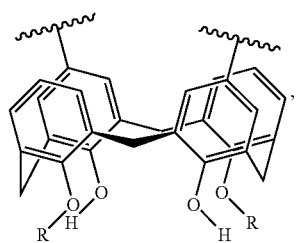

and R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In certain embodiments the polymers of the present invention are represented by formula I and the attendant definitions, wherein A is thiophene, x is 4, B is

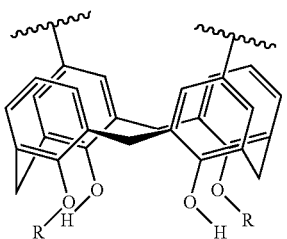

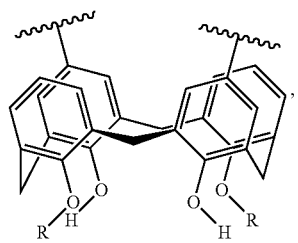

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In certain embodiments the polymers of the present invention are represented by formula I and the attendant definitions, wherein A is thiophene, x is 6, B is and R is H.

In certain embodiments the polymers of the present invention are represented by formula I and the attendant definitions, wherein A is thiophene, x is 4, B is

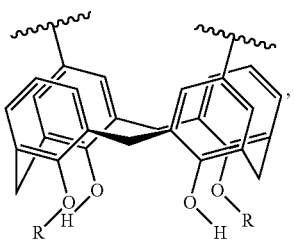

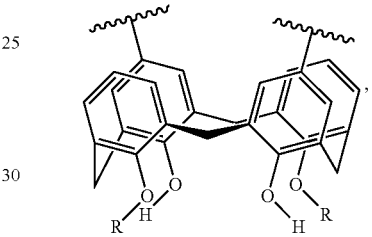

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In certain embodiments the polymers of the present invention are represented by formula I and the attendant definitions, wherein A is thiophene, x is 8, B is and R is propyl.

In certain embodiments the polymers of the present invention are represented by formula I and the attendant definitions, wherein A is 2,3-dihydrothieno[3,4-b]-1,4-dioxin, x is 2, B is

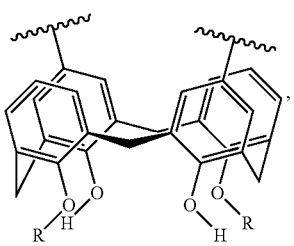

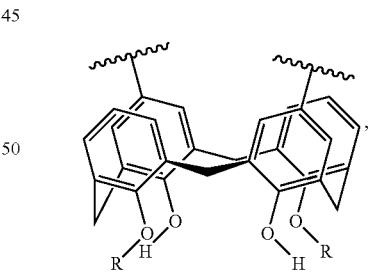

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In certain embodiments the polymers of the present invention are represented by formula I and the attendant definitions, wherein A is thiophene, x is 4, B is and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In certain embodiments the polymers of the present invention are represented by formula I and the attendant definitions, wherein A is 2,3-dihydrothieno[3,4-b]-1,4-dioxin, x is 4, B is

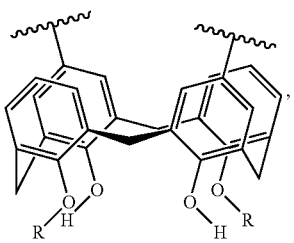

and R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In certain embodiments the polymers of the present invention are represented by formula I and the attendant definitions, wherein A is 2,3-dihydrothieno[3,4-b]-1,4-dioxin, x is 6, B is

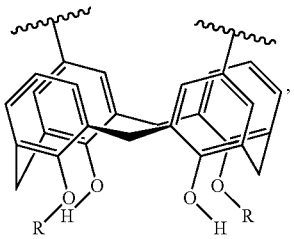

and R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In certain embodiments the polymers of the present invention are represented by formula I and the attendant definitions, wherein A is 2,3-dihydrothieno[3,4-b]-1,4-dioxin, x is 8, B is

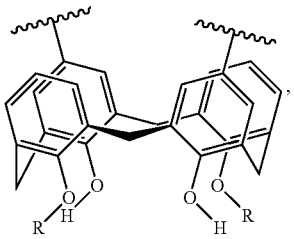

and R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In certain embodiments the polymers of the present invention are represented by formula I and the attendant definitions, wherein A is 2,3-dihydrothieno[3,4-b]-1,4-dioxin, x is 4, B is

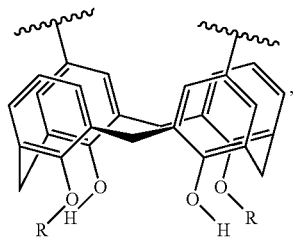

and R is H.

In certain embodiments the polymers of the present invention are represented by formula I and the attendant definitions, wherein A is 2,3-dihydrothieno[3,4-b]-1,4-dioxin, x is 4, B is

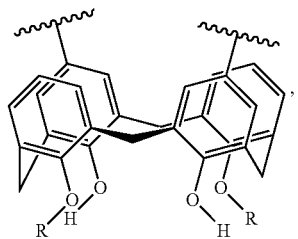

and R is propyl.

In certain embodiments the polymers of the present invention are represented by formula I and the attendant definitions, wherein A is thiophene, x is 2, and B is

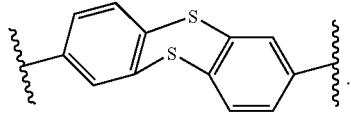

In certain embodiments the polymers of the present invention are represented by formula I and the attendant definitions, wherein A is thiophene, x is 4, and B is

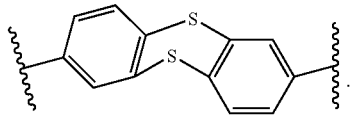

In certain embodiments the polymers of the present invention are represented by formula I and the attendant definitions, wherein A is thiophene, x is 6, and B is

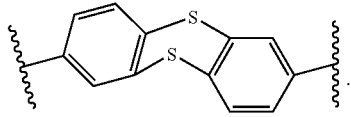

In certain embodiments the polymers of the present invention are represented by formula I and the attendant definitions, wherein A is thiophene, x is 8, and B is

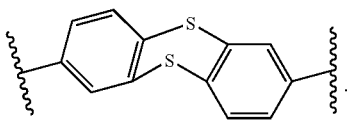

In certain embodiments the polymers of the present invention are represented by formula I and the attendant definitions, wherein A is 2,3-dihydrothieno[3,4-b]-1,4-dioxin, x is 2, and B is

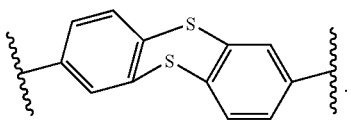

In certain embodiments the polymers of the present invention are represented by formula I and the attendant definitions, wherein A is 2,3-dihydrothieno[3,4-b]-1,4-dioxin, x is 4, and B is

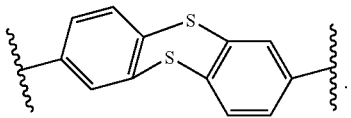

In certain embodiments the polymers of the present invention are represented by formula I and the attendant definitions, wherein A is 2,3-dihydrothieno[3,4-b]-1,4-dioxin, x is 6, and B is In certain embodiments the polymers of the present invention are represented by formula I and the attendant definitions, wherein A is 2,3-dihydrothieno[3,4-b]-1,4-dioxin, x is 8, and B is

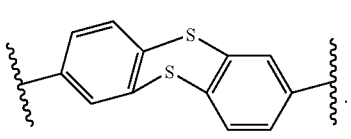

In certain embodiments the polymers of the present invention are represented by formula I and the attendant definitions, wherein A is thiophene, x is 2, and B is

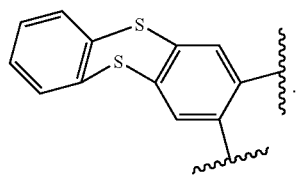

In certain embodiments the polymers of the present invention are represented by formula I and the attendant definitions, wherein A is thiophene, x is 4, and B is

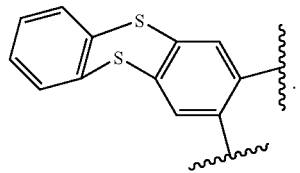

In certain embodiments the polymers of the present invention are represented by formula I and the attendant definitions, wherein A is thiophene, x is 6, and B is

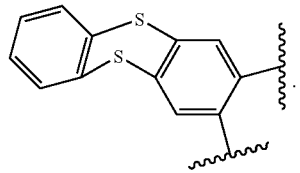

In certain embodiments the polymers of the present invention are represented by formula I and the attendant definitions, wherein A is thiophene, x is 8, and B is

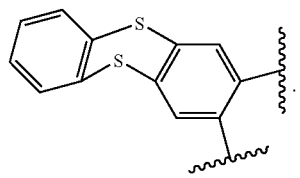

In certain embodiments the polymers of the present invention are represented by formula I and the attendant definitions, wherein A is 2,3-dihydrothieno[3,4-b]-1,4-dioxin, x is 2, and B is

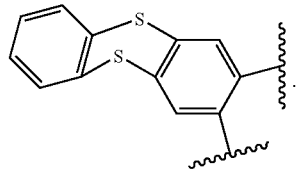

In certain embodiments the polymers of the present invention are represented by formula I and the attendant definitions, wherein A is 2,3-dihydrothieno[3,4-b]-1,4-dioxin, x is 4, and B is

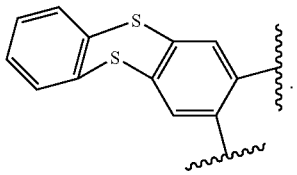

In certain embodiments the polymers of the present invention are represented by formula I and the attendant definitions, wherein A is 2,3-dihydrothieno[3,4-b]-1,4-dioxin, x is 6, and B is

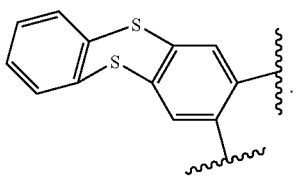

In certain embodiments the polymers of the present invention are represented by formula I and the attendant definitions, wherein A is 2,3-dihydrothieno[3,4-b]-1,4-dioxin, x is 8, and B is

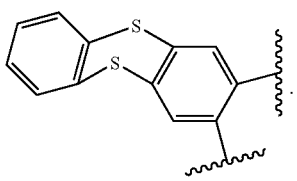

In certain embodiments the polymers of the present invention are represented by formula I and the attendant definitions, wherein A is thiophene, x is 2, and B is

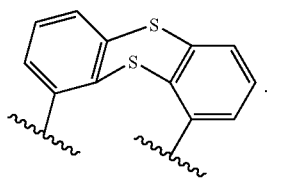

In certain embodiments the polymers of the present invention are represented by formula I and the attendant definitions, wherein A is thiophene, x is 4, and B is

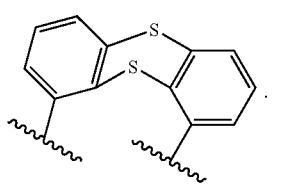

In certain embodiments the polymers of the present invention are represented by formula I and the attendant definitions, wherein A is thiophene, x is 6, and B is In certain embodiments the polymers of the present invention are represented by formula I and the attendant definitions, wherein A is thiophene, x is 8, and B is

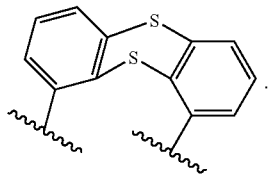

In certain embodiments the polymers of the present invention are represented by formula I and the attendant definitions, wherein A is 2,3-dihydrothieno[3,4-b]-1,4-dioxin, x is 2, and B is

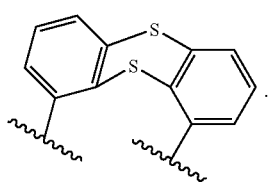

In certain embodiments the polymers of the present invention are represented by formula I and the attendant definitions, wherein A is 2,3-dihydrothieno[3,4-b]-1,4-dioxin, x is 4, and B is

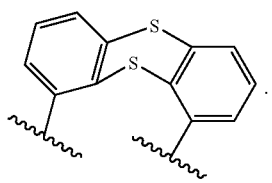

In certain embodiments the polymers of the present invention are represented by formula I and the attendant definitions, wherein A is 2,3-dihydrothieno[3,4-b]-1,4-dioxin, x is 6, and B is

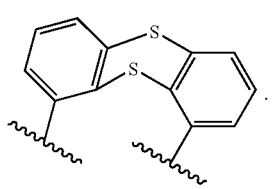

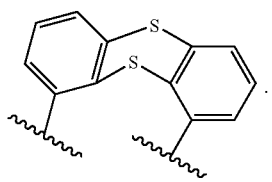

In certain embodiments the polymers of the present invention are represented by formula I and the attendant definitions, wherein A is 2,3-dihydrothieno[3,4-b]-1,4-dioxin, x is 8, and B is

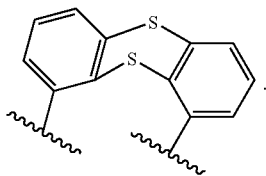

In certain embodiments, the present invention also provides a method of generating work comprising:

a) attaching a neutral polymer to a first object and attaching a different position of said polymer to a second object;

b) applying a potential to said polymer thereby oxidizing or reducing said polymer, resulting in the contraction of the polymer.

In a further embodiment, at least 1 kcal/mole of energy is generated by the contraction of the polymer.

In certain embodiments, the polymer in the method of generating work of the present invention is represented by formula I:

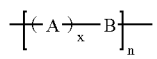

I wherein

A represents independently for each occurrence heteroaryl;

x is independently for each occurrence an integer from 2 to 8 inclusive;

B represents a bond or

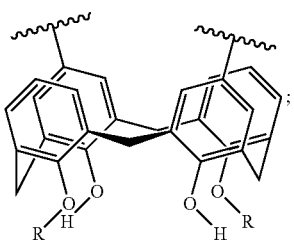

wherein

R represents independently for each occurrence H, alkyl, alkaryl, alkenyl, alkynyl, silyl, alkylthio, imino, amido, phosphoryl, phosphonate, phosphine, phosphonamide, carboxyl, carboxamide, keto, alkylsulfonyl, arylsulfonyl, selenoalkyl, formyl, ester, heteroalkyl, cyano, guanidine, amidine, acetal, ketal, aryl, heteroaryl, aralkyl, heteroaralkyl, epoxide, hydroxamic acid, imido, oxime, sulfonamine, sulfonamide, sulfonomate, thioamide, thiocarbamate, urea, thiourea, saturated or mono or poly unsaturated fatty acid, or —$(CH_2)_m$—$R_{80}$, or two instances of R taken together represent —$CH_2CH_2OCH_2(CH_2OCH_2)_yCH_2OCH_2CH_2$—, with the proviso that R is not methyl;

$R_{80}$ represents independently for each occurrence an aryl, cycloalkyl, cycloalkenyl, heterocyclyl, or polycyclyl group;

m is independently for each occurrence an integer in the range 0 to 8 inclusive; and n represents an integer from 2 to about 100.

In certain embodiments, the polymer in the method of generating work of the present invention is represented by formula I and the attendant definitions, wherein R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In certain embodiments, the polymer in the method of generating work of the present invention is represented by formula I and the attendant definitions, wherein heteroaryl is selected independently for each occurrence from the group consisting of pyrroles, furans, thiophenes, imidazoles, oxazoles, thiazoles, triazoles, pyrazoles, pyridines, pyrazines, pyridazines, 2,3-dihydrothieno[3,4-b]-1,4-dioxins, and pyrimidines.

In certain embodiments, the polymer in the method of generating work of the present invention is represented by formula I and the attendant definitions, wherein heteroaryl is selected independently for each occurrence from the group consisting of furans, pyrroles, thiophenes, and 2,3-dihydrothieno[3,4-b]-1,4-dioxins.

In certain embodiments, the polymer in the method of generating work of the present invention is represented by formula I and the attendant definitions, wherein R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—; and heteroaryl is selected independently for each occurrence from the group consisting of pyrroles, furans, thiophenes, imidazoles, oxazoles, thiazoles, triazoles, pyrazoles, pyridines, pyrazines, pyridazines, 2,3-dihydrothieno[3,4-b]-1,4-dioxins, and pyrimidines.

In certain embodiments, the polymer in the method of generating work of the present invention is represented by formula I and the attendant definitions, wherein R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—; and heteroaryl is selected independently for each occurrence from the group consisting of furans, pyrroles, thiophenes, and 2,3-dihydrothieno[3,4-b]-1,4-dioxins.

In certain embodiments, the polymer in the method of generating work of the present invention is represented by formula I and the attendant definitions, wherein A is thiophene, x is 2, B is

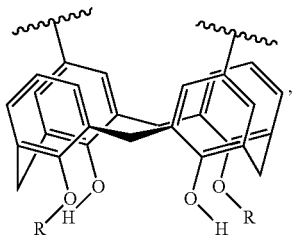

and R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In certain embodiments, the polymer in the method of generating work of the present invention is represented by formula I and the attendant definitions, wherein A is thiophene, x is 4, B is

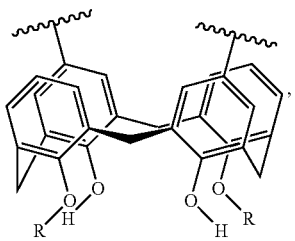

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In certain embodiments, the polymer in the method of generating work of the present invention is represented by formula I and the attendant definitions, wherein A is thiophene, x is 6, B is

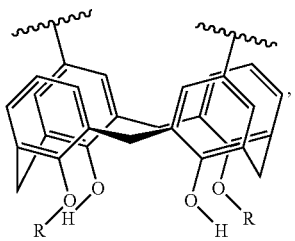

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In certain embodiments, the polymer in the method of generating work of the present invention is represented by formula I and the attendant definitions, wherein A is thiophene, x is 8, B is

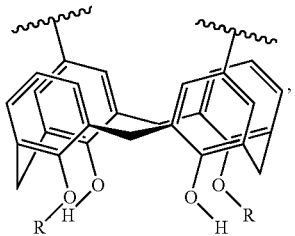

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In certain embodiments, the polymer in the method of generating work of the present invention is represented by formula I and the attendant definitions, wherein A is thiophene, x is 4, B is

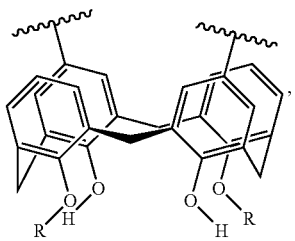

and R is H.

In certain embodiments, the polymer in the method of generating work of the present invention is represented by formula I and the attendant definitions, wherein A is thiophene, x is 4, B is

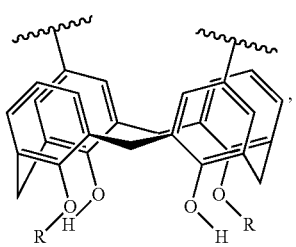

and R is propyl.

In certain embodiments, the polymer in the method of generating work of the present invention is represented by formula I and the attendant definitions, wherein A is 2,3-dihydrothieno[3,4-b]-1,4-dioxin, x is 2, B is

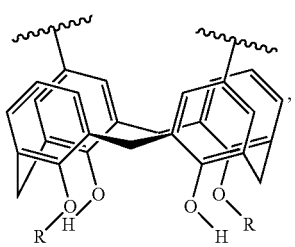

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In certain embodiments, the polymer in the method of generating work of the present invention is represented by formula I and the attendant definitions, wherein A is 2,3-dihydrothieno[3,4-b]-1,4-dioxin, x is 4, B is

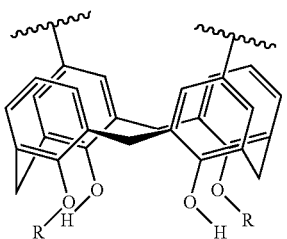

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In certain embodiments, the polymer in the method of generating work of the present invention is represented by formula I and the attendant definitions, wherein A is 2,3-dihydrothieno[3,4-b]-1,4-dioxin, x is 6, B is

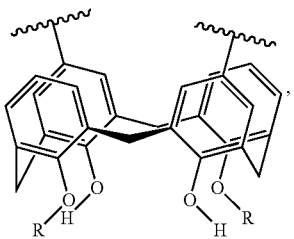

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In certain embodiments, the polymer in the method of generating work of the present invention is represented by formula I and the attendant definitions, wherein A is 2,3-dihydrothieno[3,4-b]-1,4-dioxin, x is 8, B is

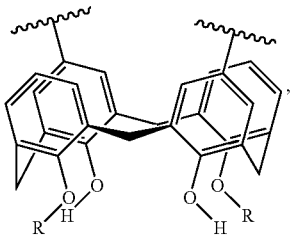

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In certain embodiments, the polymer in the method of generating work of the present invention is represented by formula I and the attendant definitions, wherein A is 2,3-dihydrothieno[3,4-b]-1,4-dioxin, x is 4, B is

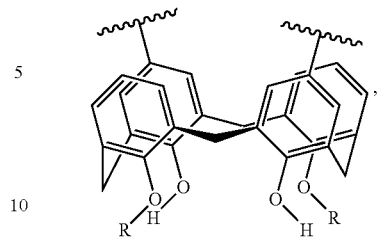

and R is H.

In certain embodiments, the polymer in the method of generating work of the present invention is represented by formula I and the attendant definitions, wherein A is 2,3-dihydrothieno[3,4-b]-1,4-dioxin, x is 4, B is

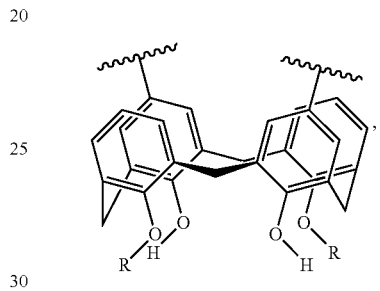

and R is propyl.

In certain embodiments, the polymer in the method of generating work of the present invention is a composite polymer.

In a further embodiment, the composite polymer in the method of generating work of the present invention comprises a polymeric anion and a polymer represented by formula I:

wherein

A represents independently for each occurrence heteroaryl;

x is independently for each occurrence an integer from 2 to 8 inclusive;

B represents a bond or

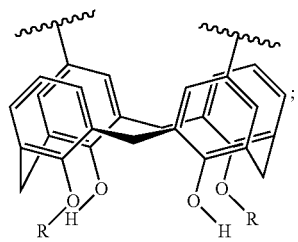

wherein

R represents independently for each occurrence H, alkyl, alkaryl, alkenyl, alkynyl, silyl, alkylthio, imino, amido, phosphoryl, phosphonate, phosphine, phosphonamide, carboxyl, carboxamide, keto, alkylsulfonyl, arylsulfonyl, selenoalkyl, formyl, ester, heteroalkyl, cyano, guanidine, amidine, acetal, ketal, aryl, heteroaryl, aralkyl, heteroaralkyl, epoxide, hydroxamic acid, imido, oxime, sulfonamine, sulfonamide, sulfonomate, thioamide, thiocarbamate, urea, thiourea, saturated or mono or poly unsaturated fatty acid, or —$(CH_2)_m$—$R_{80}$, or two instances of R taken together represent —$CH_2CH_2OCH_2(CH_2OCH_2)_yCH_2OCH_2CH_2$—;

$R_{80}$ represents independently for each occurrence an aryl, cycloalkyl, cycloalkenyl, heterocyclyl, or polycyclyl group;

m is independently for each occurrence an integer in the range 0 to 8 inclusive;

y is an integer in the range 0 to 3 inclusive; and n represents an integer from 2 to about 100.

In a further embodiment, the composite polymer in the method of generating work of the present invention comprises a polymeric anion and a polymer represented by formula I, wherein the polymeric anion is sulfated poly-β-hydroxy ether (S-PHE).

In certain embodiments, the present invention provides a polymeric composite comprised of a polymeric anion and a polymer represented by formula I:

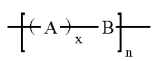

I wherein

A represents independently for each occurrence heteroaryl;

x is independently for each occurrence an integer from 2 to 8 inclusive;

B represents a bond or

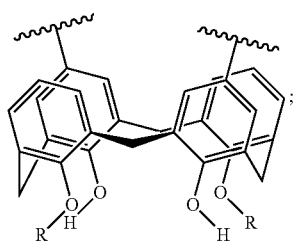

;

wherein

R represents independently for each occurrence H, alkyl, alkaryl, alkenyl, alkynyl, silyl, alkylthio, imino, amido, phosphoryl, phosphonate, phosphine, phosphonamide, carboxyl, carboxamide, keto, alkylsulfonyl, arylsulfonyl, selenoalkyl, formyl, ester, heteroalkyl, cyano, guanidine, amidine, acetal, ketal, aryl, heteroaryl, aralkyl, heteroaralkyl, epoxide, hydroxamic acid, imido, oxime, sulfonamine, sulfonamide, sulfonomate, thioamide, thiocarbamate, urea, thiourea, saturated or mono or poly unsaturated fatty acid, or —$(CH_2)_m$—$R_{80}$, or two instances of R taken together represent —$CH_2CH_2OCH_2(CH_2OCH_2)_yCH_2OCH_2CH_2$—;

$R_{80}$ represents independently for each occurrence an aryl, cycloalkyl, cycloalkenyl, heterocyclyl, or polycyclyl group;

m is independently for each occurrence an integer in the range 0 to 8 inclusive;

y is an integer in the range 0 to 3 inclusive; and n represents an integer from 2 to about 100.

In a further embodiment, the composite polymer of the present invention comprises a polymer represented by formula I and the attendant definitions and a polymeric anion, wherein the polymeric anion is sulfated poly-β-hydroxy ether (S-PHE).

In a further embodiment, the composite polymer of the present invention comprises S-PHE and a polymer represented by formula I and the attendant definitions, wherein R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In a further embodiment, the composite polymer of the present invention comprises S-PHE and a polymer represented by formula I and the attendant definitions, wherein heteroaryl is selected independently for each occurrence from the group consisting of pyrroles, furans, thiophenes, imidazoles, oxazoles, thiazoles, triazoles, pyrazoles, pyridines, pyrazines, pyridazines, 2,3-dihydrothieno[3,4-b]-1,4-dioxins, and pyrimidines.

In a further embodiment, the composite polymer of the present invention comprises S-PHE and a polymer represented by formula I and the attendant definitions, wherein the heteroaryl is selected independently for each occurrence from the group consisting of furan, pyrrole, thiophene, and 2,3-dihydrothieno[3,4-b]-1,4-dioxins.

In a further embodiment, the composite polymer of the present invention comprises S-PHE and a polymer represented by formula I and the attendant definitions, wherein R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—; and heteroaryl is selected independently for each occurrence from the group consisting of pyrroles, furans, thiophenes, imidazoles, oxazoles, thiazoles, triazoles, pyrazoles, pyridines, pyrazines, pyridazines, 2,3-dihydrothieno[3,4-b]-1,4-dioxins, and pyrimidines.

In a further embodiment, the composite polymer of the present invention comprises S-PHE and a polymer represented by formula I and the attendant definitions, wherein R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—; and heteroaryl is selected independently for each occurrence from the group consisting of furans, pyrroles, thiophenes, and 2,3-dihydrothieno[3,4-b]-1,4-dioxins.

In a further embodiment, the composite polymer of the present invention comprises S-PHE and a polymer represented by formula I and the attendant definitions, wherein A is thiophene, x is 2, B is

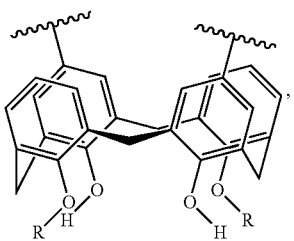

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In a further embodiment, the composite polymer of the present invention comprises S-PHE and a polymer represented by formula I and the attendant definitions, wherein A is thiophene, x is 4, B is

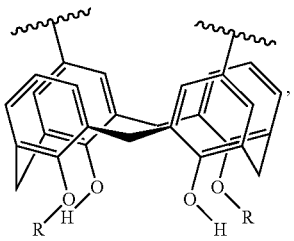

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In a further embodiment, the composite polymer of the present invention comprises S-PHE and a polymer represented by formula I and the attendant definitions, wherein A is thiophene, x is 6, B is

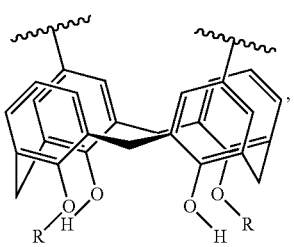

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In a further embodiment, the composite polymer of the present invention comprises S-PHE and a polymer represented by formula I and the attendant definitions, wherein A is thiophene, x is 8, B is

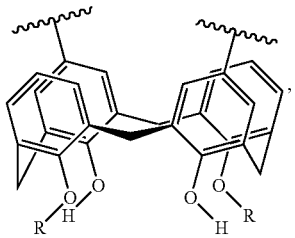

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In a further embodiment, the composite polymer of the present invention comprises S-PHE and a polymer represented by formula I and the attendant definitions, wherein A is thiophene, x is 4, B is

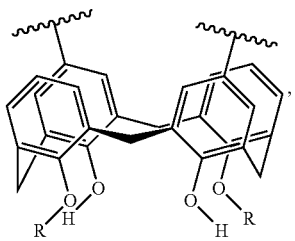

and R is H.

In a further embodiment, the composite polymer of the present invention comprises S-PHE and a polymer represented by formula I and the attendant definitions, wherein A is thiophene, x is 4, B is

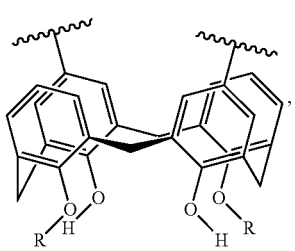

and R is propyl.

In a further embodiment, the composite polymer of the present invention comprises S-PHE and a polymer represented by formula I and the attendant definitions, wherein A is 2,3-dihydrothieno[3,4-b]-1,4-dioxin, x is 2, B is

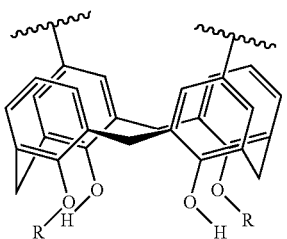

and R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In a further embodiment, the composite polymer of the present invention comprises S-PHE and a polymer represented by formula I and the attendant definitions, wherein A is 2,3-dihydrothieno[3,4-b]-1,4-dioxin, x is 4, B is

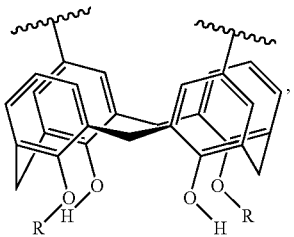

and R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In a further embodiment, the composite polymer of the present invention comprises S-PHE and a polymer represented by formula I and the attendant definitions, wherein A is 2,3-dihydrothieno[3,4-b]-1,4-dioxin, x is 6, B is

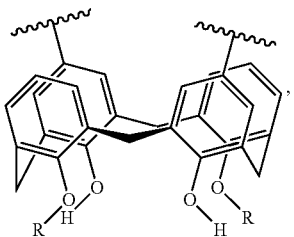

and R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In a further embodiment, the composite polymer of the present invention comprises S-PHE and a polymer represented by formula I and the attendant definitions, wherein A is 2,3-dihydrothieno[3,4-b]-1,4-dioxin, x is 8, B is

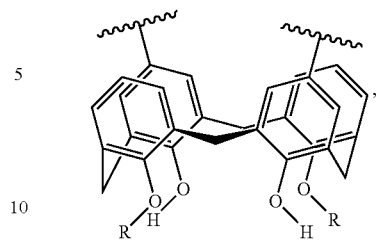

and R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In a further embodiment, the composite polymer of the present invention comprises S-PHE and a polymer represented by formula I and the attendant definitions, wherein A is 2,3-dihydrothieno[3,4-b]-1,4-dioxin, x is 4, B is

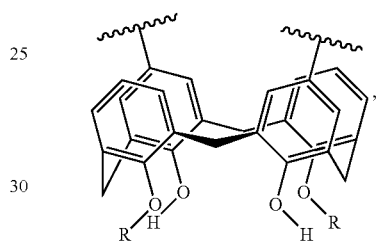

and R is H.

In a further embodiment, the composite polymer of the present invention comprises S-PHE and a polymer represented by formula I and the attendant definitions, wherein A is 2,3-dihydrothieno[3,4-b]-1,4-dioxin, x is 4, B is

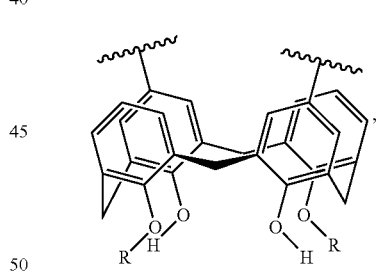

and R is propyl.

In a further embodiment, the composite polymer of the present invention comprises S-PHE and a polymer represented by formula I and the attendant definitions, wherein A is thiophene, x is 2, and B is a bond.

In a further embodiment, the composite polymer of the present invention comprises S-PHE and a polymer represented by formula I and the attendant definitions, wherein A is thiophene, x is 4, and B is a bond.

In a further embodiment, the composite polymer of the present invention comprises S-PHE and a polymer represented by formula I and the attendant definitions, wherein A is thiophene, x is 6, and B is a bond.

In a further embodiment, the composite polymer of the present invention comprises S-PHE and a polymer represented by formula I and the attendant definitions, wherein A is thiophene, x is 8, and B is a bond.

In a further embodiment, the composite polymer of the present invention comprises S-PHE and a polymer represented by formula I and the attendant definitions, wherein A is 2,3-dihydrothieno[3,4-b]-1,4-dioxin, x is 2, and B is a bond.

In a further embodiment, the composite polymer of the present invention comprises S-PHE and a polymer represented by formula I and the attendant definitions, wherein A is 2,3-dihydrothieno[3,4-b]-1,4-dioxin, x is 4, and B is a bond.

In a further embodiment, the composite polymer of the present invention comprises S-PHE and a polymer represented by formula I and the attendant definitions, wherein A is 2,3-dihydrothieno[3,4-b]-1,4-dioxin, x is 6, and B is a bond.

In a further embodiment, the composite polymer of the present invention comprises S-PHE and a polymer represented by formula I and the attendant definitions, wherein A is 2,3-dihydrothieno[3,4-b]-1,4-dioxin, x is 8, and B is a bond.

In one embodiment, the present invention provides a method of displacing an object comprising:

a) attaching a polymer to a first object and attaching a different position of said polymer to a second object;

b) applying a potential to said polymer thereby oxidizing or reducing said polymer, resulting in the displacement of said first object wherein said displacement is at least 8% of the distance between the two points of attachment on said polymer to said objects prior to oxidation or reduction of said polymer.

In a further embodiment, the displacement is due to molecular rearrangements of the polymer.

In a further embodiment, the molecular rearrangement is dimer formation or oligomer formation.

In a further embodiment, the molecular rearrangement results from π-π stacking or π-dimerization or π-oligomerization.

In a further embodiment, the π-π stacking generates the displacement of the polymer represented by formula I:

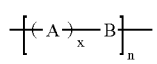
I wherein

A represents independently for each occurrence heteroaryl;

x is independently for each occurrence an integer from 2 to 8 inclusive;

B represents a bond or

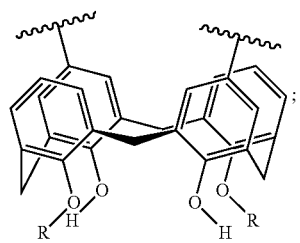
;

wherein

R represents independently for each occurrence H, alkyl, alkaryl, alkenyl, alkynyl, silyl, alkylthio, imino, amido, phosphoryl, phosphonate, phosphine, phosphonamide, carboxyl, carboxamide, keto, alkylsulfonyl, arylsulfonyl, selenoalkyl, formyl, ester, heteroalkyl, cyano, guanidine, amidine, acetal, ketal, aryl, heteroaryl, aralkyl, heteroaralkyl, epoxide, hydroxamic acid, imido, oxime, sulfonamine, sulfonamide, sulfonomate, thioamide, thiocarbamate, urea, thiourea, saturated or mono or poly unsaturated fatty acid, or —$(CH_2)_m$—$R_{80}$, or two instances of R taken together represent —$CH_2CH_2OCH_2(CH_2OCH_2)_yCH_2OCH_2CH_2$—, with the proviso that R is not methyl;

$R_{80}$ represents independently for each occurrence an aryl, cycloalkyl, cycloalkenyl, heterocyclyl, or polycyclyl group;

m is independently for each occurrence an integer in the range 0 to 8 inclusive; and n represents an integer from 2 to about 100.

In a further embodiment, the π-π stacking generates the displacement of the polymer represented by formula I and the attendant definitions, wherein R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In a further embodiment, the π-π stacking generates the displacement of the polymer represented by formula I and the attendant definitions, wherein heteroaryl is selected independently for each occurrence from the group consisting of pyrroles, furans, thiophenes, imidazoles, oxazoles, thiazoles, triazoles, pyrazoles, pyridines, pyrazines, pyridazines, 2,3-dihydrothieno[3,4-b]-1,4-dioxins, and pyrimidines.

In a further embodiment, the π-π stacking generates the displacement of the polymer represented by formula I and the attendant definitions, wherein heteroaryl is selected independently for each occurrence from the group consisting of furans, pyrroles, thiophenes, and 2,3-dihydrothieno[3,4-b]-1,4-dioxins.

In a further embodiment, the π-π stacking generates the displacement of the polymer represented by formula I and the attendant definitions, wherein R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—; and heteroaryl is selected independently for each occurrence from the group consisting of pyrroles, furans, thiophenes, imidazoles, oxazoles, thiazoles, triazoles, pyrazoles, pyridines, pyrazines, pyridazines, 2,3-dihydrothieno[3,4-b]-1,4-dioxins, and pyrimidines.

In a further embodiment, the π-π stacking generates the displacement of the polymer represented by formula I and the attendant definitions, wherein R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—; and heteroaryl is selected independently for each occurrence from the group consisting of furans, pyrroles, thiophenes, and 2,3-dihydrothieno[3,4-b]-1,4-dioxins.

In a further embodiment, the π-π stacking generates the displacement of the polymer represented by formula I and the attendant definitions, wherein A is thiophene, x is 2, B is

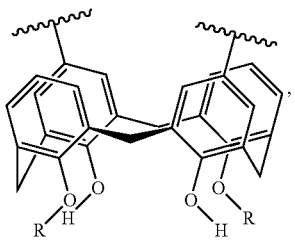

and R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In a further embodiment, the π-π stacking generates the displacement of the polymer represented by formula I and the attendant definitions, wherein A is thiophene, x is 4, B is

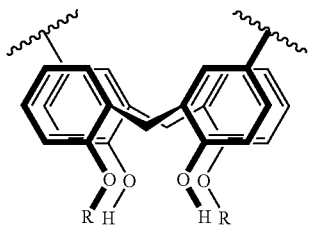

and R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In a further embodiment, the π-π stacking generates the displacement of the polymer represented by formula I and the attendant definitions, wherein A is thiophene, x is 6, B is

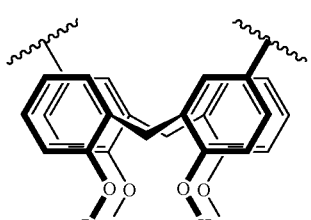

and R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In a further embodiment, the π-π stacking generates the displacement of the polymer represented by formula I and the attendant definitions, wherein A is thiophene, x is 8, B is

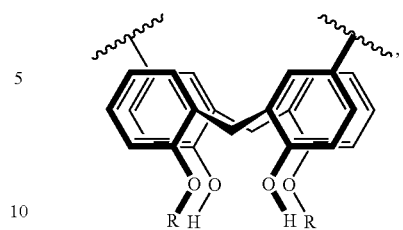

and R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

In a further embodiment, the π-π stacking generates the displacement of the polymer represented by formula I and the attendant definitions, wherein A is thiophene, x is 4, B is

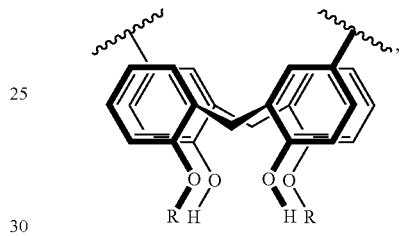

and R is H.

In a further embodiment, the π-π stacking generates the displacement of the polymer represented by formula I and the attendant definitions, wherein A is thiophene, x is 4, B is

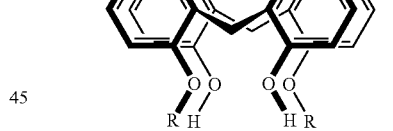

and R is propyl.

In a further embodiment, the π-π stacking generates the displacement of the polymer represented by formula I and the attendant definitions, wherein A is 2,3-dihydrothieno[3,4-b]-1,4-dioxin, x is 2, B is

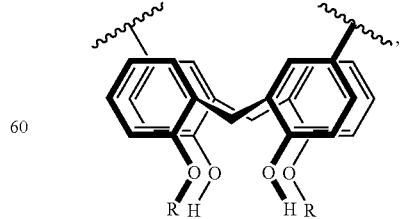

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In a further embodiment, the π-π stacking generates the displacement of the polymer represented by formula I and the attendant definitions, wherein A is 2,3-dihydrothieno[3,4-b]-1,4-dioxin, x is 4, B is

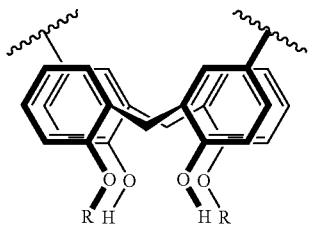

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In a further embodiment, the π-π stacking generates the displacement of the polymer represented by formula I and the attendant definitions, wherein A is 2,3-dihydrothieno[3,4-b]-1,4-dioxin, x is 6, B is

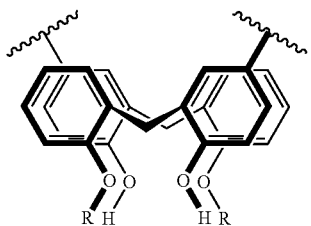

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In a further embodiment, the π-π stacking generates the displacement of the polymer represented by formula I and the attendant definitions, wherein A is 2,3-dihydrothieno[3,4-b]-1,4-dioxin, x is 8, B is

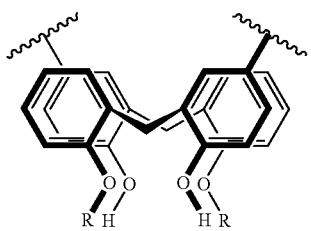

and R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

In a further embodiment, the π-π stacking generates the displacement of the polymer represented by formula I and the attendant definitions, wherein A is 2,3-dihydrothieno[3,4-b]-1,4-dioxin, x is 4, B is

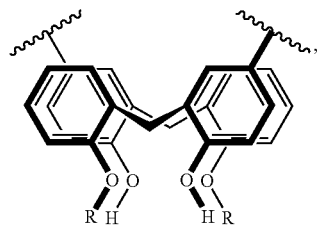

and R is H.

In a further embodiment, the π-π stacking generates the displacement of the polymer represented by formula I and the attendant definitions, wherein A is 2,3-dihydrothieno[3,4-b]-1,4-dioxin, x is 4, B is

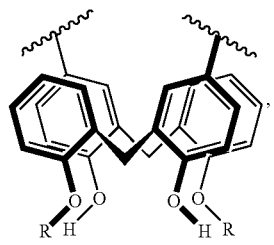

and R is propyl.

In one embodiment the method of displacement comprises molecular rearrangement of the polymer, wherein said molecular rearrangement is planarization of the polymer backbone.

In one embodiment, the planarization generates the displacement of the polymer represented by formula I:

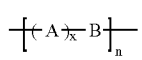

wherein

A represents independently for each occurrence heteroaryl;

x is independently for each occurrence an integer from 2 to 8 inclusive;

B represents a bond,

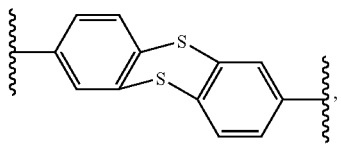

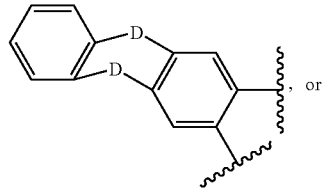, or

-continued

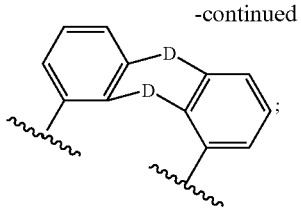

wherein

R represents independently for each occurrence H, alkyl, alkaryl, alkenyl, alkynyl, silyl, alkylthio, imino, amido, phosphoryl, phosphonate, phosphine, phosphonamide, carboxyl, carboxamide, keto, alkylsulfonyl, arylsulfonyl, selenoalkyl, formyl, ester, heteroalkyl, cyano, guanidine, amidine, acetal, ketal, aryl, heteroaryl, aralkyl, heteroaralkyl, epoxide, hydroxamic acid, imido, oxime, sulfonamine, sulfonamide, sulfonomate, thioamide, thiocarbamate, urea, thiourea, saturated or mono or poly unsaturated fatty acid, or —$(CH_2)_m$—$R_{80}$, or two instances of R taken together represent —$CH_2CH_2OCH_2(CH_2OCH_2)_yCH_2OCH_2CH_2$—, with the proviso that R is not methyl;

$R_{80}$ represents independently for each occurrence an aryl, cycloalkyl, cycloalkenyl, heterocyclyl, or polycyclyl group;

m is independently for each occurrence an integer in the range 0 to 8 inclusive; and n represents an integer from 2 to about 100.

In one embodiment, the planarization generates the displacement of the polymer represented by formula I and the attendant definitions, wherein A is thiophene, x is 2, and B is

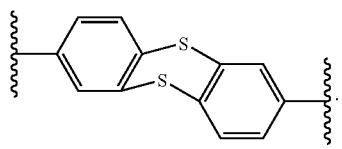

In one embodiment, the planarization generates the displacement of the polymer represented by formula I and the attendant definitions, wherein A is thiophene, x is 4, and B is

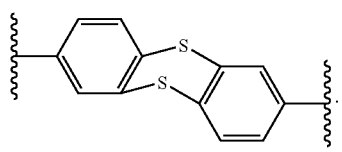

In one embodiment, the planarization generates the displacement of the polymer represented by formula I and the attendant definitions, wherein A is thiophene, x is 6, and B is

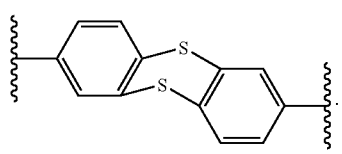

In one embodiment, the planarization generates the displacement of the polymer represented by formula I and the attendant definitions, wherein A is thiophene, x is 8, and B is

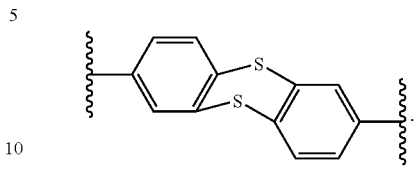

In one embodiment, the planarization generates the displacement of the polymer represented by formula I and the attendant definitions, wherein A is 2,3-dihydrothieno[3,4-b]-1,4-dioxin, x is 2, and B is

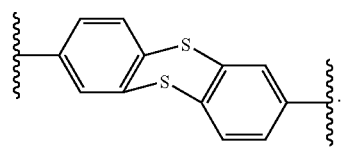

In one embodiment, the planarization generates the displacement of the polymer represented by formula I and the attendant definitions, wherein A is 2,3-dihydrothieno[3,4-b]-1,4-dioxin, x is 4, and B is

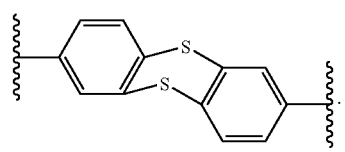

In one embodiment, the planarization generates the displacement of the polymer represented by formula I and the attendant definitions, wherein A is 2,3-dihydrothieno[3,4-b]-1,4-dioxin, x is 6, and B is

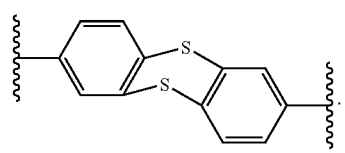

In one embodiment, the planarization generates the displacement of the polymer represented by formula I and the attendant definitions, wherein A is 2,3-dihydrothieno[3,4-b]-1,4-dioxin, x is 8, and B is

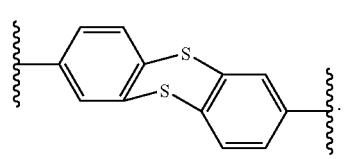

In one embodiment, the planarization generates the displacement of the polymer represented by formula I and the attendant definitions, wherein A is thiophene, x is 2, and B is

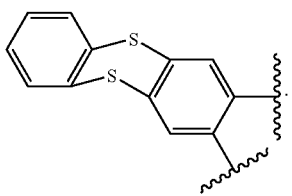

In one embodiment, the planarization generates the displacement of the polymer represented by formula I and the attendant definitions, wherein A is thiophene, x is 4, and B is

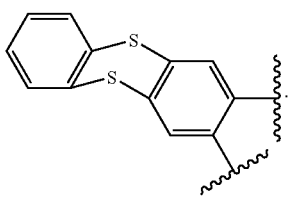

In one embodiment, the planarization generates the displacement of the polymer represented by formula I and the attendant definitions, wherein A is thiophene, x is 6, and B is

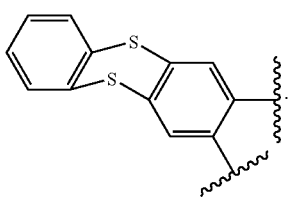

In one embodiment, the planarization generates the displacement of the polymer represented by formula I and the attendant definitions, wherein A is thiophene, x is 8, and B is

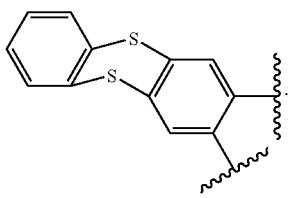

In one embodiment, the planarization generates the displacement of the polymer represented by formula I and the attendant definitions, wherein A is 2,3-dihydrothieno[3,4-b]-1,4-dioxin, x is 2, and B is

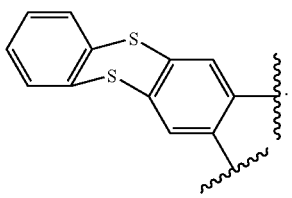

In one embodiment, the planarization generates the displacement of the polymer represented by formula I and the attendant definitions, wherein A is 2,3-dihydrothieno[3,4-b]-1,4-dioxin, x is 4, and B is

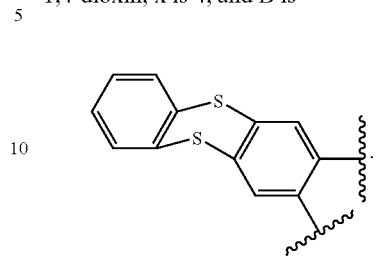

In one embodiment, the planarization generates the displacement of the polymer represented by formula I and the attendant definitions, wherein A is 2,3-dihydrothieno[3,4-b]-1,4-dioxin, x is 6, and B is

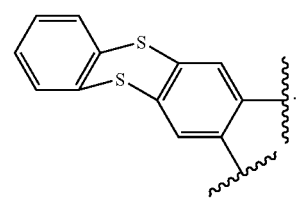

In one embodiment, the planarization generates the displacement of the polymer represented by formula I and the attendant definitions, wherein A is 2,3-dihydrothieno[3,4-b]-1,4-dioxin, x is 8, and B is

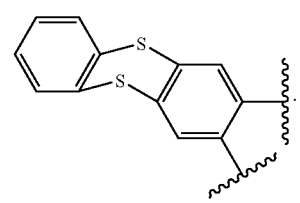

In one embodiment, the planarization generates the displacement of the polymer represented by formula I and the attendant definitions, wherein A is thiophene, x is 2, and B is

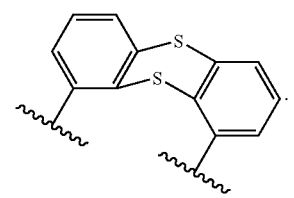

In one embodiment, the planarization generates the displacement of the polymer represented by formula I and the attendant definitions, wherein A is thiophene, x is 4, and B is

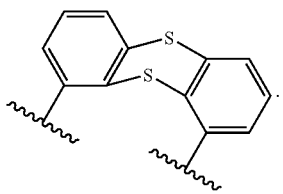

In one embodiment, the planarization generates the displacement of the polymer represented by formula I and the attendant definitions, wherein A is thiophene, x is 6, and B is

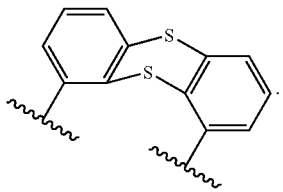

In one embodiment, the planarization generates the displacement of the polymer represented by formula I and the attendant definitions, wherein A is thiophene, x is 8, and B is

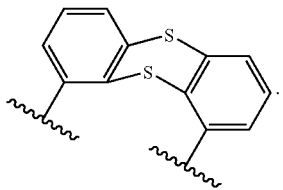

In one embodiment, the planarization generates the displacement of the polymer represented by formula I and the attendant definitions, wherein A is 2,3-dihydrothieno[3,4-b]-1,4-dioxin, x is 2, and B is

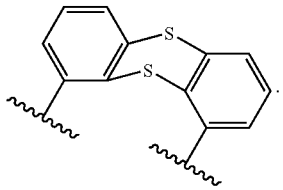

In one embodiment, the planarization generates the displacement of the polymer represented by formula I and the attendant definitions, wherein A is 2,3-dihydrothieno[3,4-b]-1,4-dioxin, x is 4, and B is

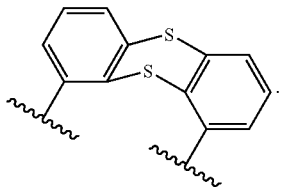

In one embodiment, the planarization generates the displacement of the polymer represented by formula I and the attendant definitions, wherein A is 2,3-dihydrothieno[3,4-b]-1,4-dioxin, x is 6, and B is

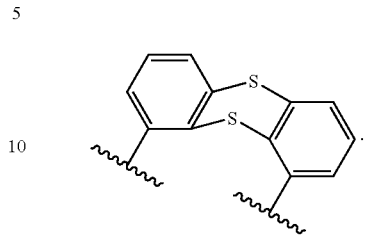

In one embodiment, the planarization generates the displacement of the polymer represented by formula I and the attendant definitions, wherein A is 2,3-dihydrothieno[3,4-b]-1,4-dioxin, x is 8, and B is

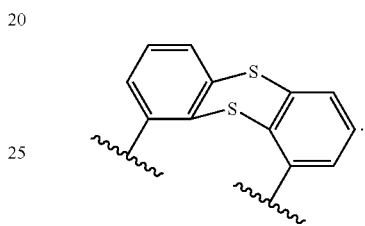

In one embodiment the present invention provides a polymer comprising a plurality of sections each consisting of no more than 10 thiophene monomers, wherein any two sections are joined together by a nonconjugated linkage, wherein said nonconjugated linkage upon oxidation or reduction is capable of bending, thereby resulting in a change of polymer length.

In one embodiment, the change in polymer length is at least 2% of the polymer's length prior to oxidation or reduction.

In one embodiment, the change in polymer length is at least 5% of the polymer's length prior to oxidation or reduction.

In one embodiment, the change in polymer length is at least 10% of the polymer's length prior to oxidation or reduction.

In one embodiment, the change in polymer length is at least 15% of the polymer's length prior to oxidation or reduction.

In a further embodiment, the polymer further comprises a polymeric anion interpenetrating the polymer.

In a further embodiment, the change in polymer length is caused by interchain bonding induced by oxidation or reduction.

DETAILED DESCRIPTION OF THE INVENTION

Figure 1:
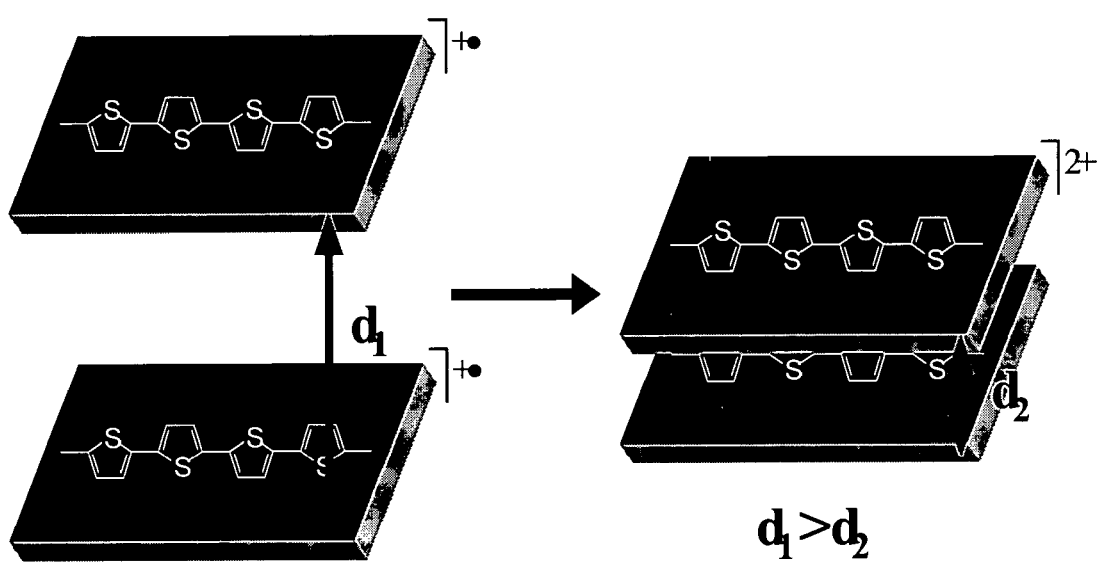
FIG. 1 depicts the mechanism for $\pi$-$\pi$ dimer formation.

One aspect of the present invention relates to a new class of materials which enable the creation of actuators (artificial muscles) with the promise to exceed the performance characteristics of the human muscle in all key figures of merit, including active strain, active stress, active strain rate, power to mass, efficiency, and stiffness variability. These novel materials based on electrically conductive polymers use motions at molecular level such as molecular expansion, molecular contraction and dimer formation as sources and driving force of actuation. New devices incorporating such materials potentially have great commercial value. For Example, new devices incorporating these materials should enable life-like robots and prostheses, and may eventually be used inside the human body to assist the heart and other organs. They may also be worn by humans as a kind of second skin that replaces clothing and augments our natural muscle power. Opposite to piezo materials, these materials have large volume change and make it easier for biomimetic device design. On the other hand, unlike swollen gel, they provide enough strength to generate devices with great force.

Nature being the source of inspiration, our powerful approach is to design conducting polymer backbones with chemically driven shape changes that translate into large alterations of their length in response to electrically induced changes in oxidation state. Vale R. D. and Milligan R. A., "The Way Things Move: Looking Under the Hood of Molecular Motor Proteins", Science, Vol. 288, pp. 88-95, 2000; Mahadevan L. and Matsudaira P., "Mobility Powered by Supramolecular Springs and Ratchets", Science, Vol. 288, pp. 95-99, 2000; Mao C., Sun W., Shen Z. and Seeman N., "A Nanomechanical Device Based on B-Z Transition of DNA", Nature, Vol. 397, pp. 144-146, 1999. Advances in synthetic organic chemistry enable the creation and manipulation of such organic molecules that mimic natural molecular mechanisms. This new approach moves away from a materials survey methodology and towards a materials designer strategy where novel materials are created by incorporating property-designed molecular building blocks. Such molecular building blocks may include shape changing, load bearing, passively deformable or hinge-like molecular elements combined with precise control of the material morphology at the nanometer scale. Our vision is that unprecedented actuating materials will be created by a bottom-up approach where specific molecular designs are incorporated into a material to achieve specific properties.

Actuating molecules are built upon novel molecular design elements for creating volume changes. Diversity in material properties and characteristics is introduced through a combination of design elements. These include molecules that distort from bent to planar structures upon electrochemical activation, materials that undergo volume changes due to stacking of redox units and molecular scaffolds that behave as "accordion-like" structures capable of being switched between an extended and a tightly folded molecular structure.

Within the framework of molecular actuation, we present herein chemically engineered units that change their molecular shape and produce force and displacement upon the application of an electrical stimulus. These materials utilize a molecular dimerization mechanism known as π-π stacking as the molecular actuation driving force. We will present this molecular actuating mechanism and show how it can be incorporated into molecular materials designs. A third compound is the based on the planarization of the Thianthrene molecule from a dihedral angle of 120 degrees to 180 degrees. We will then show initial activation results of polymer films that were synthesized in our laboratory, including beam-bending and isometric actuation characterization.

Definitions

For convenience, certain terms employed in the specification, examples, and appended claims are collected here.

The term "aliphatic" is an art-recognized term and includes linear, branched, and cyclic alkanes, alkenes, or alkynes. In certain embodiments, aliphatic groups in the present invention are linear or branched and have from 1 to about 20 carbon atoms.

The term "alkyl" is art-recognized, and includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 30 or fewer carbon atoms in its backbone (e.g., $C_1$-$C_{30}$ for straight chain, $C_3$-$C_{30}$ for branched chain), and alternatively, about 20 or fewer. Likewise, cycloalkyls have from about 3 to about 10 carbon atoms in their ring structure, and alternatively about 5, 6 or 7 carbons in the ring structure.

Unless the number of carbons is otherwise specified, "lower alkyl" refers to an alkyl group, as defined above, but having from one to ten carbons, alternatively from one to about six carbon atoms in its backbone structure. Likewise, "lower alkenyl" and "lower alkynyl" have similar chain lengths.

The term "aralkyl" is art-recognized, and includes alkyl groups substituted with an aryl group (e.g., an aromatic or heteroaromatic group).

The terms "alkenyl" and "alkynyl" are art-recognized, and include unsaturated aliphatic groups analogous in length and possible substitution to the alkyls described above, but that contain at least one double or triple bond respectively.

The abbreviation "BIS" as used herein stands for N,N'-methylenebis (acrylamide) and is used herein as a polymer cross-linker.

The term "2,3-dihydrothieno[3,4-b]-1,4-dioxin" (EDOT) is art-recognized and is represented by the following formula:

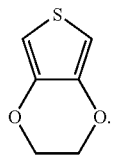

The terms "sulfated poly-β-hydroxy ether" and "(S-PHE)" are art-recognized and are represented by the following formula:

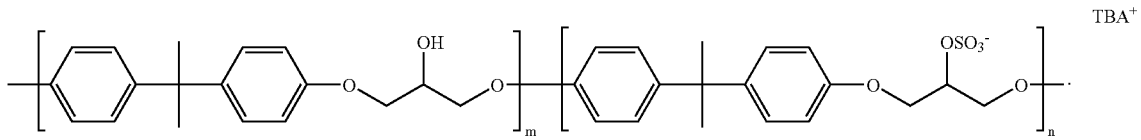

The term "TBA$^+$" is art-recognized and as used herein means tetrabutyl ammonium cation.

The term "heteroatom" is art-recognized, and includes an atom of any element other than carbon or hydrogen. Illustrative heteroatoms include boron, nitrogen, oxygen, phosphorus, sulfur and selenium, and alternatively oxygen, nitrogen or sulfur.

The term "aryl" is art-recognized, and includes 5-, 6- and 7-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine and pyrimidine, and the like. Those aryl groups having heteroatoms in the ring structure may also be referred to as "aryl heterocycles" or "heteroaromatics." The aromatic ring may be substituted at one or more ring positions with such substituents as described above, for example, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN, or the like. The term "aryl" also includes polycyclic ring systems having two or more cyclic rings in which two or more carbons are common to two adjoining rings (the rings are "fused rings") wherein at least one of the rings is aromatic, e.g., the other cyclic rings may be cycloalkyls, cycloalkenyls, cycloalkynyls, aryls and/or heterocyclyls.

The terms ortho, meta and para are art-recognized and apply to 1,2-, 1,3- and 1,4-disubstituted benzenes, respectively. For example, the names 1,2-dimethylbenzene and ortho-dimethylbenzene are synonymous.

The terms "heterocyclyl" and "heterocyclic group" are art-recognized, and include 3- to about 10-membered ring structures, such as 3- to about 7-membered rings, whose ring structures include one to four heteroatoms. Heterocycles may also be polycycles. Heterocyclyl groups include, for example, thiophene, thianthrene, furan, pyran, isobenzofuran, chromene, xanthene, phenoxathiin, pyrrole, imidazole, pyrazole, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, phenanthridine, acridine, pyrimidine, phenanthroline, phenazine, phenarsazine, phenothiazine, furazan, phenoxazine, pyrrolidine, oxolane, thiolane, oxazole, piperidine, piperazine, morpholine, lactones, lactams such as azetidinones and pyrrolidinones, sultams, sultones, and the like. The heterocyclic ring may be substituted at one or more positions with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like.

The terms "polycyclyl" and "polycyclic group" are art-recognized, and include structures with two or more rings (e.g., cycloalkyls, cycloalkenyls, cycloalkynyls, aryls and/or heterocyclyls) in which two or more carbons are common to two adjoining rings, e.g., the rings are "fused rings". Rings that are joined through non-adjacent atoms, e.g., three or more atoms are common to both rings, are termed "bridged"

rings. Each of the rings of the polycycle may be substituted with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —CF$_3$, —CN, or the like.

The term "carbocycle" is art recognized and includes an aromatic or non-aromatic ring in which each atom of the ring is carbon. The flowing art-recognized terms have the following meanings: "nitro" means —NO$_2$; the term "halogen" designates —F, —Cl, —Br or —I; the term "sulfhydryl" means —SH; the term "hydroxyl" means —OH; and the term "sulfonyl" means —SO$_2^-$.

The terms "amine" and "amino" are art-recognized and include both unsubstituted and substituted amines, e.g., a moiety that may be represented by the general formulas:

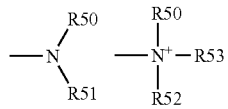

wherein R50, R51 and R52 each independently represent a hydrogen, an alkyl, an alkenyl, —(CH$_2$)$_m$—R61, or R50 and R51, taken together with the N atom to which they are attached complete a heterocycle having from 4 to 8 atoms in the ring structure; R61 represents an aryl, a cycloalkyl, a cycloalkenyl, a heterocycle or a polycycle; and m is zero or an integer in the range of 1 to 8. In certain embodiments, only one of R50 or R51 may be a carbonyl, e.g., R50, R51 and the nitrogen together do not form an imide. In other embodiments, R50 and R51 (and optionally R52) each independently represent a hydrogen, an alkyl, an alkenyl, or —(CH$_2$)$_m$—R61. Thus, the term "alkylamine" includes an amine group, as defined above, having a substituted or unsubstituted alkyl attached thereto, i.e., at least one of R50 and R51 is an alkyl group.

The term "acylamino" is art-recognized and includes a moiety that may be represented by the general formula:

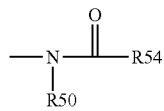

wherein R50 is as defined above, and R54 represents a hydrogen, an alkyl, an alkenyl or —(CH$_2$)$_m$—R61, where m and R61 are as defined above.

The term "amido" is art recognized as an amino-substituted carbonyl and includes a moiety that may be represented by the general formula:

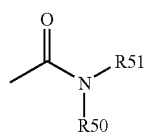

wherein R50 and R51 are as defined above. Certain embodiments of the amide in the present invention will not include imides which may be unstable.

The term "alkylthio" is art recognized and includes an alkyl group, as defined above, having a sulfur radical attached thereto. In certain embodiments, the "alkylthio" moiety is represented by one of —S-alkyl, —S-alkenyl, —S-alkynyl, and —S—(CH$_2$)$_m$—R61, wherein m and R61 are defined above. Representative alkylthio groups include methylthio, ethyl thio, and the like.

The term "carbonyl" is art recognized and includes such moieties as may be represented by the general formulas:

wherein X50 is a bond or represents an oxygen or a sulfur, and R55 represents a hydrogen, an alkyl, an alkenyl, —(CH$_2$)$_m$—R61 or a pharmaceutically acceptable salt, R56 represents a hydrogen, an alkyl, an alkenyl or —(CH$_2$)$_m$—R61, where m and R61 are defined above. Where X50 is an oxygen and R55 or R56 is not hydrogen, the formula represents an "ester". Where X50 is an oxygen, and R55 is as defined above, the moiety is referred to herein as a carboxyl group, and particularly when R55 is a hydrogen, the formula represents a "carboxylic acid". Where X50 is an oxygen, and R56 is hydrogen, the formula represents a "formate". In general, where the oxygen atom of the above formula is replaced by sulfur, the formula represents a "thiocarbonyl" group. Where X50 is a sulfur and R55 or R56 is not hydrogen, the formula represents a "thioester." Where X50 is a sulfur and R55 is hydrogen, the formula represents a "thiocarboxylic acid." Where X50 is a sulfur and R56 is hydrogen, the formula represents a "thioformate." On the other hand, where X50 is a bond, and R55 is not hydrogen, the above formula represents a "ketone" group. Where X50 is a bond, and R55 is hydrogen, the above formula represents an "aldehyde" group.

The terms "alkoxyl" or "alkoxy" are art recognized and include an alkyl group, as defined above, having an oxygen radical attached thereto. Representative alkoxyl groups include methoxy, ethoxy, propyloxy, tert-butoxy and the like. An "ether" is two hydrocarbons covalently linked by an oxygen. Accordingly, the substituent of an alkyl that renders that alkyl an ether is or resembles an alkoxyl, such as may be represented by one of —O-alkyl, —O-alkenyl, —O-alkynyl, —O—(CH$_2$)$_m$—R61, where m and R61 are described above.

The term "sulfonate" is art recognized and includes a moiety that may be represented by the general formula:

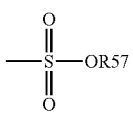

in which R57 is an electron pair, hydrogen, alkyl, cycloalkyl, or aryl.

The term "sulfate" is art recognized and includes a moiety that may be represented by the general formula:

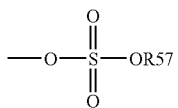

in which R57 is as defined above.

The term "sulfonamido" is art recognized and includes a moiety that may be represented by the general formula:

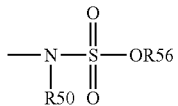

in which R50 and R56 are as defined above.

The term "sulfamoyl" is art-recognized and includes a moiety that may be represented by the general formula:

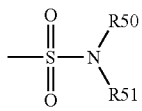

in which R50 and R51 are as defined above.

The term "sulfonyl" is art recognized and includes a moiety that may be represented by the general formula:

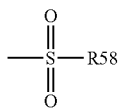

in which R58 is one of the following: hydrogen, alkyl, alkenyl, alkynyl, cycloalkyl, heterocyclyl, aryl or heteroaryl.

The term "sulfoxido" is art recognized and includes a moiety that may be represented by the general formula:

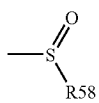

in which R58 is defined above.

The term "phosphoramidite" is art recognized and includes moieties represented by the general formulas:

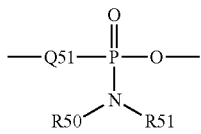 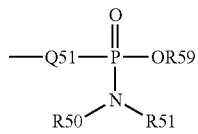

wherein Q51, R50, R51 and R59 are as defined above.

The term "phosphonamidite" is art recognized and includes moieties represented by the general formulas:

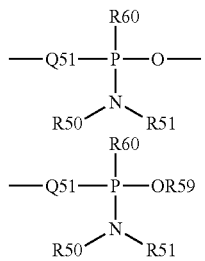

wherein Q51, R50, R51 and R59 are as defined above, and R60 represents a lower alkyl or an aryl.

Analogous substitutions may be made to alkenyl and alkynyl groups to produce, for example, aminoalkenyls, aminoalkynyls, amidoalkenyls, amidoalkynyls, iminoalkenyls, iminoalkynyls, thioalkenyls, thioalkynyls, carbonyl-substituted alkenyls or alkynyls. The definition of each expression, e.g. alkyl, m, n, etc., when it occurs more than once in any structure, is intended to be independent of its definition elsewhere in the same structure unless otherwise indicated expressly or by the context.

For purposes of this invention, the chemical elements are identified in accordance with the Periodic Table of the Elements, CAS version, Handbook of Chemistry and Physics, 67th Ed., 1986-87, inside cover.

π-π Stacking Interactions

A new class of materials is created utilizing reversible molecular conformational transitions to generate controllable displacement and work. The physical effect leading to such molecular rearrangement is dimer formation such as π-dimers (π-π stacking effect) upon oxidation of the material. Such an effect is, for example, implemented using thiophene based conducting polymers synthesized by anodic electrochemical polymerization, including poly(QT) and poly(terthiophene) ("poly(TT)"). Upon electrochemical oxidation of these thiophene based molecular actuators, it is energetically more favorable for two adjacent quarterthiophene (or terthiophene) units to have their π-orbital overlap and rearrange in π-dimers, (e.g., the tendency of π orbitals to align due to Pauli's exclusion principle). See FIG. 1. π-π Stacking interactions between aromatic units in supramolecular structures help to create robust macroscopic conglomerates leading to large molecular conformational changes. Such π-dimerization is easily observable by means of electrochemical methods, like cyclic voltammetry or AC voltammetry as well as by in situ conductivity and EPR measurement.

Figure 2:
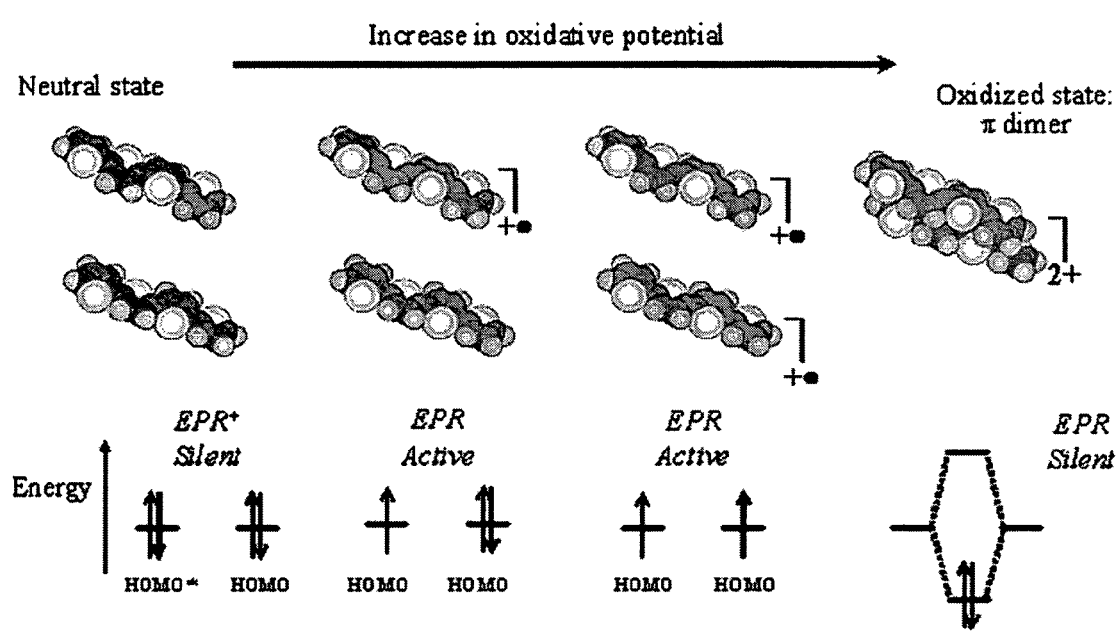
FIG. 2 depicts the mechanism for $\pi$-$\pi$ dimer formation via oxidation and the corresponding molecular orbital observed by means of EPR.
Figure 7:
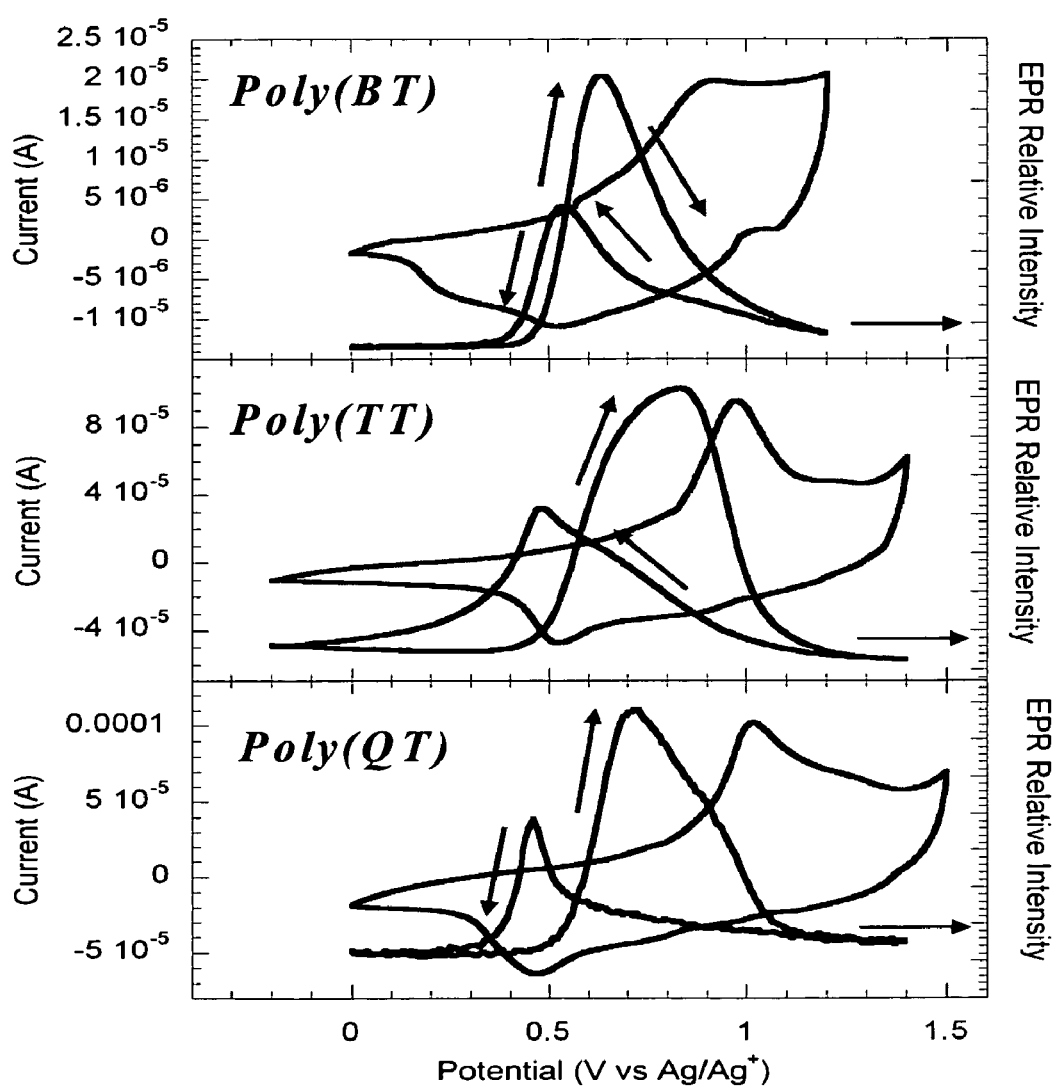
FIG. 7 depicts the difference of the EPR signal during a 100 mV/s swept cyclic potential (0V to 1.5V vs. Ag/Ag+) for polymers polymerized from bis-thiophene: poly (bithiophene) ("poly(BT)"), terthiophene: poly(ter-thiophene) ("poly(TT)") and quarterthiophene: poly(QT).

The π-stacked structure is typical of oxidized thiophene oligomers and has been studied experimentally by means of X-ray diffraction, Scanning Tunneling Microscopy (STM), Electron Paramagnetic Resonance Spectroscopy (EPR), as well as theoretical calculation; Kingsborough R. P. and Swager T. M., "Polythiophene Hybrids of Transition-Metal Bis(salicylidenimine)s: Correlation between Structure and Electronic Properties", *Journal of the American Chemical Society*, Vol. 121, (38): pp. 8825-8834, (1999); Graf D. D., Campbell J. P., Miller L. L. and Mann K. R., "Single-Crystal X-ray Structure of the Cation Radical of 3',4'-Dibutyl-2,5"-diphenyl-2,2'-terthiophene: Definitive Evidence for π-Stacked Oxidized Oligothiophenes", *Journal of the American Chemical Society*, Vol. 118, pp. 5480-5481, (1996); Azumi R., Goetz G. and Baeuerle P., "Self-Assembly of Alkylsubstituted Oligothiophenes", *Synthetic Metals*, Vol. 101, pp. 569-572, (1999); Sirringhaus H., Brown P. J., Friend R. H., Nielsen M. M., Bechgaard K., Langeveld-Voss B. M. W., Spierling A. J. H., Janssen R. A. J., Meijer E. W., Herwing P. and de Leeuw D. M., "Two-Dimensional Charge Transport in Self-Organized, High-Mobility Conjugated Polymers", *Nature*, Vol. 401, pp. 685-689, (1999); Brocks G., "π-dimers of oligothiophene cations", *Journal of Chemical Physics*, Vol. 112, (12): pp. 5353-5363, (2000). As shown in FIG. 1 and FIG. 2, oxidation of two adjacent quarterthiophene molecules creates two radical cations with partially occupied Highest Occupied Molecular Orbitals (HOMO). This state is observable by means of EPR spectroscopy as it exhibits an unpaired electron in the π-system of the oxidized thiophenes (EPR active). With further oxidation, both HOMO orbitals mix to produce a new doubly occupied molecular orbital at lower energy. The formation of this new molecular orbital provides stabilization of the π-dimer as the electronic energy of the charged quarterthiophene groups has been lowered. Unlike the singly occupied molecular orbitals, the π-stacked structure is EPR silent due to the electron spin pairing. This process is reversible and described by $$QT^{\cdot+} + QT^{\cdot+} \Leftrightarrow (QT)_2^{2+} \quad (1)$$

where QT describes a quarterthiophene molecule. As stated above, evidence of a reversible transformation between π-stacked and un-stacked conformations as oxidation state is obtained using EPR spectroscopy and is shown later. FIG. 7 shows an EPR signal recorded during a 100 mV/s swept cyclic potential (0V to 1.5V vs. Ag/Ag$^+$) for the poly(QT). Notice the hysteresis obtained during the cathodic sweep (from 1.5V back to 0V) to revert the signal from EPR silent to EPR active. Such a large hysteresis indicates that more energy is required to switch poly(QT) from its oxidized state to its reduced state and vice versa, giving strong evidence that a more stable structure (possibly the π-dimer) has been formed as a result of the initial anodic potential sweep in which the quarterthiophene groups were oxidized.

In addition, similar hysteresis effects resulting from π-dimerization are observed from in-situ conductivity measurement. Interdigitated microelectrodes (Abtech Scientific, www.abtechsci.com) allow measuring film conductivity in-situ as a function of oxidation state. Films of poly(QT) were cycled at 10 mV/s at potentials between 0V and 1V vs. Ag/Ag+ and their conductivity measured against a bias of 40 mV (FIG. 7). Notice in FIG. 7 that switching the relative conductivity of poly(QT) from conducting to insulating requires ~0.5 V of reverse potential, indicating that the π-dimer aggregated state is harder to reduce and thus confirming its higher stability. Note that such a behavior is unlikely to be attributed to electrochemical kinetic limitations such as electron transport or ion diffusion as the films relative conductivity is high over the entire potential range of the reduction sweep.

Additionally, theoretical and experimental studies on quarterthiophene dimers in solution show that the barrier of dislocation of π-stacks is quite high: $1.3 \cdot 10^{-19}$ J (i.e., 0.8 eV or 18.5 kcal/mol), classifying the π-dimer as an electro-reversible chemical bond; Brocks G, "Charged Oligothiophene Dimers and π-stacks: the Bipolaron Revisited", *Synthetic Metals*, Vol. 119, pp. 253-254, (2001); Yamamoto T., Kamarudin D., Arai M., Lee B.-L., Suganuma H., Asakawa N., Inoue Y., Kubota K., Sasaki S., Fukuda T. and Matsuda H., "Extensive Studies of π Stacking of Poly(3-alkylthiophene-2,5-diyl)s and Poly(4-alkylthiazole-2,5-diyl)s by Optical Spectroscopy, NMR Analysis, Light Scattering Analysis, and X-ray Crystallography", *Journal of the American Chemical Society*, Vol. 120, pp. 2047-2058, (1998). Notice that this energy value is an order of magnitude larger than the Van der Waals bonding energy and thirty one times bigger than $k_BT$ (where $k_B$ is Boltzmann's constant and T is the absolute temperature; at room temperature 1 $k_BT$ is $4.1 \cdot 10^{-21}$ J); Israelachvili J. Intermolecular and surface forces. 2nd ed, p. 88 ed. London, San Diego: Academic Press; 1991. xxi, 450 p.

Thiophene-Based Molecular Actuators

Figure 6:
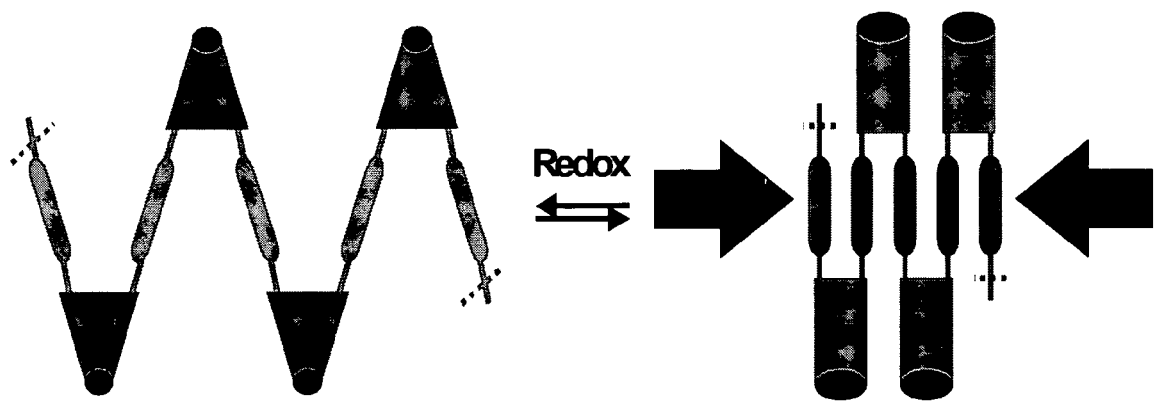
FIG. 6 depicts an actuating material utilizing a molecular conformational change as a contraction and reversible expansion mechanism.
Figure 16:
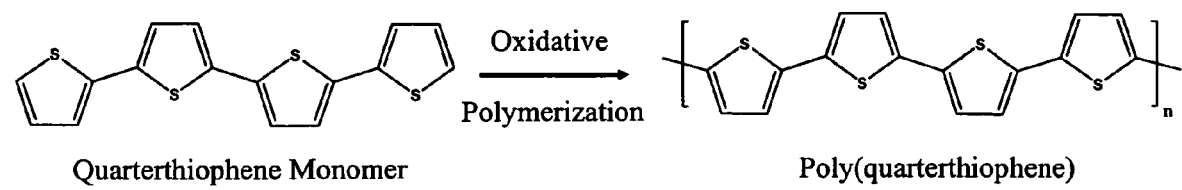
FIG. 16 depicts the oxidative polymerization of quarterthiophene monomer leading to poly(QT).

The first thiophene-based molecular actuator candidate, poly(calix[4]arene-bis-bithiophene) ("poly(calixBBT)"), shown below in Scheme 1, employs hinge molecules (calix [4]arene) interconnected by rigid rods (quarterthiophene). Oxidative polymerization of the monomer leads to poly (calixBBT). The rods attract one another in the oxidized state, contracting the material. This actuation characteristic results from π-π stacking of thiophene oligomers upon oxidation, producing a reversible molecular displacement. See FIG. 6. Kingsborough R. P. and Swager T. M., "Polythiophene Hybrids of Transition-Metal Bis(salicylidenimine)s: Correlation between Structure and Electronic Properties", *Journal of the American Chemical Society*, Vol. 121, (38): pp. 8825-8834, 1999. The second candidate, shown below in Scheme 2, is poly(QT), a system used to study the πstacking effect of the oxidized thiophene oligomers upon oxidation. In other words, this latter candidate is a non-hinged version of the poly(calixBBT) molecule. FIG. 16 shows the mechanism of polymerization for poly(QT).

Scheme 1.
Structure of poly(calix[4]arene-bis-bithiophene): poly(calixBBT).

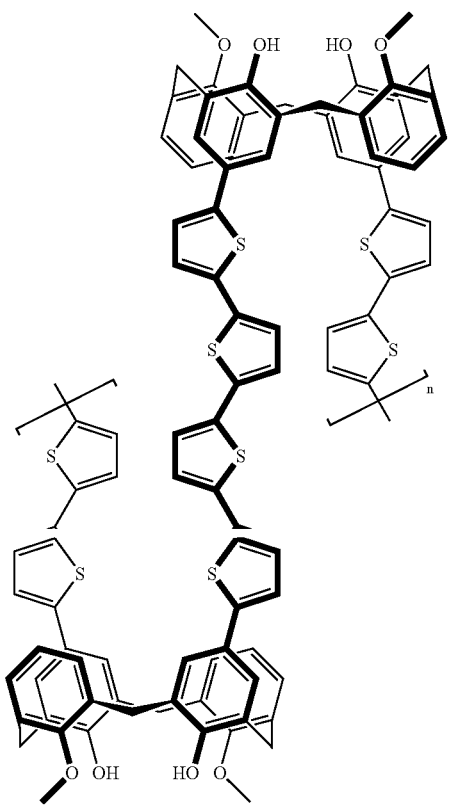

Scheme 2.
Structure of poly(QT).

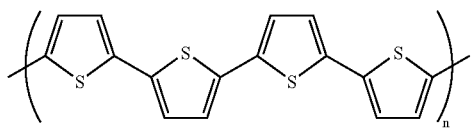

Figure 3:
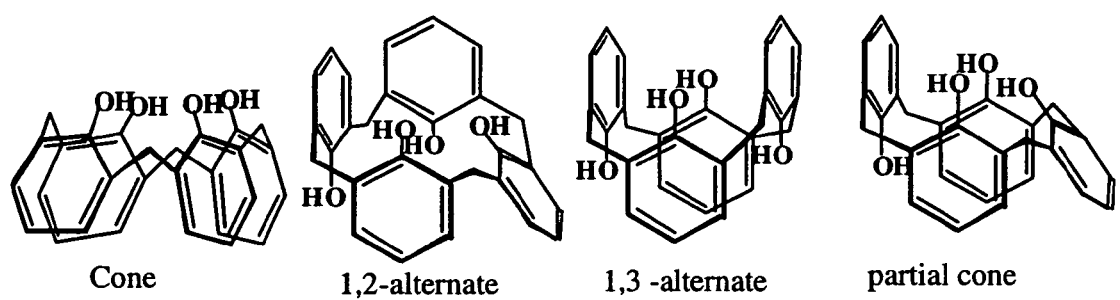
FIG. 3 depicts a number of different conformations of the calix[4]arene scaffold which are often in thermal equilibrium labeled as the cone, 1,2-alternate, 1,3-alternate, and partial cone.

Rigid 3-dimensional structures with significant amounts of free internal volume are ideal prospects for the formation of novel materials capable of unprecedented volume changes. Calix[4]arene is a particularly attractive building block to incorporate into an actuator polymer. It is well known that calixarenes have the property of producing well-defined binding sites and have a large versatility for functionalization. Fu D., Xu B. and Swager T. M., "3-Methylcalix[4]arene: A New Versatile Precursor to Inherently Chiral Calix[4]arenes", *Journal of Organic Chemistry*, Vol. 61, pp. 802-804, 1996. Furthermore, the calix[4]arene scaffold has the ability to exist in a number of different conformations which are often in thermal equilibrium labeled as the cone, 1,2-alternate, 1,3-alternate, and partial cone (FIG. 3). The calix[4] arene scaffold is a hinge structure introducing many possibilities for the formation of materials with novel architectures and shape changing ability.

Various conformations of the calix[4]arene scaffold can be synthesized by alkylation of the phenolic groups. In particular the addition of n-propyl groups is effective at restricting the calix[4]arene core from equilibrating between different conformations, producing primarily the cone conformation. Xu B., Miao Y. J. and Swager T. M., "Palladium Couplings on a Metalocalix[4]arene: An Efficient Synthesis of New Functionalized Cavities", *Journal of Organic Chemistry*, Vol. 63, pp. 8561-8564, 1998. This scaffold is then chemically combined with bis-thiophene groups to form a C-shaped molecule. Synthesis of poly(calixBBT) has been reported elsewhere. Yu H.-h., Pullen A. E. and Swager T. M., "Toward New Actuating Devices: Synthesis and Electrochemical Studies of Poly(11,23-bis[2,2'-bis-thiophene]-5-yl)-26,28-dimethoxycalix[4]arene-25,27-diol)", *Polymer Science Material Engineering*, Vol. 83, (523): 2000.

Oxidation under either electrochemical or chemical conditions leads to poly(calixBBT) which has a pinched cone conformation based upon the conformational preferences of the monomer (as determined by NMR spectroscopy). The cone conformation of the calix[4]arene scaffold allows generation of an accordion-like molecule upon polymerization.

Figure 4:
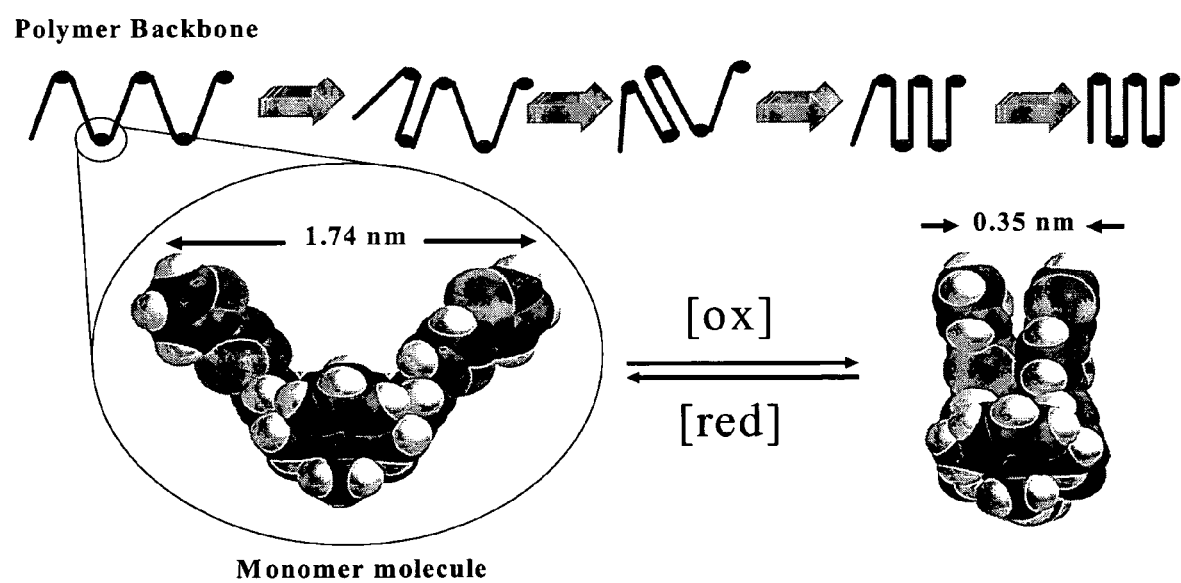
FIG. 4 depicts the proposed actuation mechanism and a 3-dimensional space-filling model showing the collapse of a monomer.

Poly(calixBBT) is a promising actuating material. Key features of this material include the deformable calix[4]arene scaffold and the redox active quarterthiophene units. The proposed actuation mechanism and a 3-dimensional space-filling model showing the collapse of a monomer are represented conceptually in FIG. 4. The initial polymer displays an equilibrium conformation that has the quarterthiophene groups in a non-aggregated state. Upon oxidation the quarterthiophene groups have a strong tendency to aggregate into a π-stacked structure. Kingsborough R. P. and Swager T. M., "Polythiophene Hybrids of Transition-Metal Bis(salicylidenimine)s: Correlation between Structure and Electronic Properties", *Journal of the American Chemical Society*, Vol. 121, (38): pp. 8825-8834, 1999. Inspection of the space-filling model in FIG. 4 suggests that one dimensional changes of as large as a factor of 5 are possible for poly(calixBBT).

Poly(QT) is a non-hinged version of poly(calixBBT), where molecular contracting elements are freely dispersed in the polymer film. Similarly as for poly(calixBBT), the quarterthiophene groups have a strong tendency to attract each other and form a π-stacked structure upon oxidation.

Figure 5:
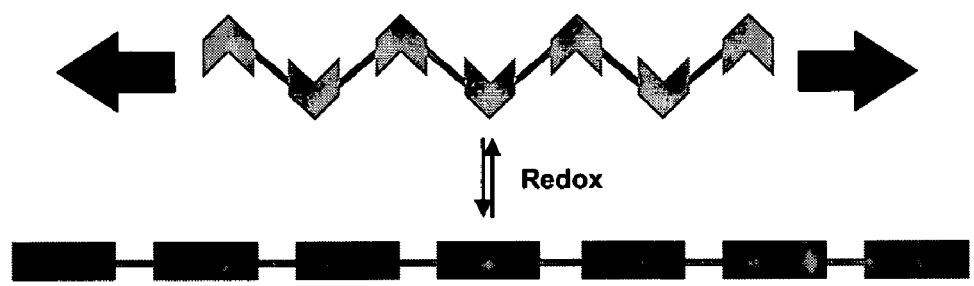
FIG. 5 depicts an actuating material utilizing a molecular conformational change as expansion mechanism.

Monomer Synthesis: Thianthrene-Based Conducting Polymers for Actuating Materials Utilizing a Molecular Conformational Change as Expansion Mechanism Conducting polymers with thianthrene backbone are synthesized to form actuating materials utilizing a molecular conformational change as expansion mechanism (See FIG. 5). Thiophene functional groups are introduced to the 2,7- (1), 2,3- (2), and 1,9- (3) positions of the thianthrene molecule (Scheme 3). Polymers are then synthesized through anodic electrochemical deposition. The thianthrene molecule exists in a bent form in the neutral state with the dihedral angle of the two benzene rings ranging from 120° to 130°. Planarization of the molecule occurs through oxidation. This molecular conformational change which rearranges the polymer backbone is used to generate motion and work. Incorporation of this thianthrene based expansion unit in the polymer backbone creates a new type of material for actuation based on molecular conformational change.

Scheme 3

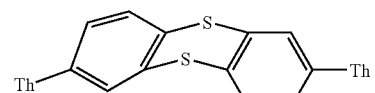

2,7-

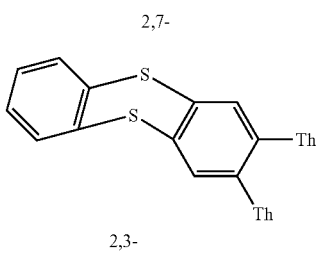

2,3-

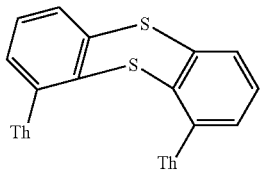

1,9-

Th = 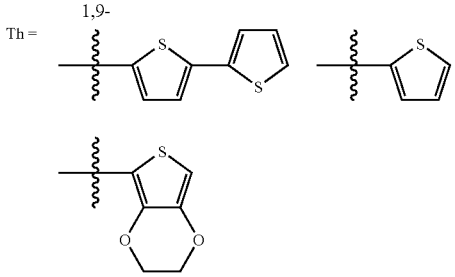

Syntheses of 2,3-, 1,9- and 2,7-Disubstituted Monomers

Syntheses of 2,3- and 1,9-disubstituted-thianthrene are summarized in Schemes 4 and 5. Synthesis of 2,7 disubstituted monomers is summarized in Scheme 6. 2,3-Dibromothianthrene (1a) was synthesized by an addition-elimination reaction between 1,2-benzenedithiol and 1,2-difluoro-4,5-dibromobenzne in the presence of base. Gold, E. H.; Piotrowski, V.; Weiner, B. Z. *J. Org. Chem.* 1977, 42, 554. 1,9-dibromothianthrene (1b) was synthesized following procedures developed by Joule and coworkers. Lovell, J. M.; Beddoes, R. L.; Joule, J. A. *Tetrahedron* 1996, 52, 4745. The key intermediate 4 was synthesized selectively via a directed metalation of the 5-thianthrene oxide (3). As outlined in Scheme 5, the incorporation of thiophene groups was accomplished using Stille cross-coupling reactions. Tsuji, J. *Palladium Reagents and Cataysts—Innovations in Organic Synthesis*; John Wiley & Sons: New York, 1995.

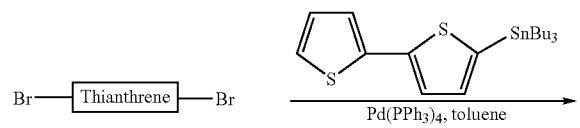

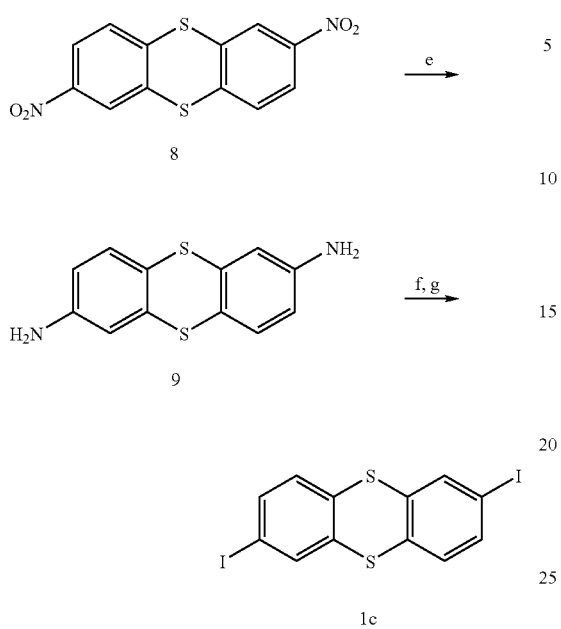

a) NaNO₂, HCl.
b) CuSCN, KSCN, 42% (over 2 steps).
c) NaBH₄, H₃O⁺.
d) Et₃N, DMF, 60% (over 2 steps).
e) NH₂NH₂, graphite, EtOH.
f) NaNO₂, HCl.
g) KI, 63% (over 3 steps).

2-Chloro-5-nitroaniline undergoes a Sandmeyer reaction to yield corresponding thiocyanate (6), which was reduced to the thiophenol (7). The product was then dimerized to construct the desired 2,7-disubstituted thianthrene. In the reduction of 2,7-dinitrothianthrene (8) to diaminothianthrene (9) we deviated from the literature method and find hydrazine gave the best yield and easiest workup. A Sandmeyer reaction then produces 2,7-diiodothianthrene (1c). Clive, D. L. J.; Angoh, A. G.; Bennett, S. M. *J. Org. Chem.* 1987, 52, 1339. A significant advantage of these syntheses is simple workup procedures using recrystallization and sublimation. Additionally, the reactions are easily scaled up and this synthesis is readily begun with 90 g of 2-chloro-5-nitroaniline.

Monomer Synthesis: Calix[4]arene-Based Conducting Polymers for Actuating Materials Utilizing a Molecular Conformational Chance as Contraction Mechanism Calix[4]arene scaffold is combined with conducting polymers to form zigzag shaped molecular backbones. Thiophene groups are introduced to the opposite benzene rings in calix[4]arene molecule to form new monomers (1). (Scheme 7) Polymers are then synthesized from this monomer through anodic electrochemical deposition. Upon oxidation of the polymer material, the zigzag structure collapses onto itself, thus producing a huge molecular deformation. This molecular contraction (and reversibly expansion) is accompanied by large change in volume of the bulk material, thus creating a new class of active contractile material based on the molecular rearrangement of a polymer molecular backbone. See FIG. 6.

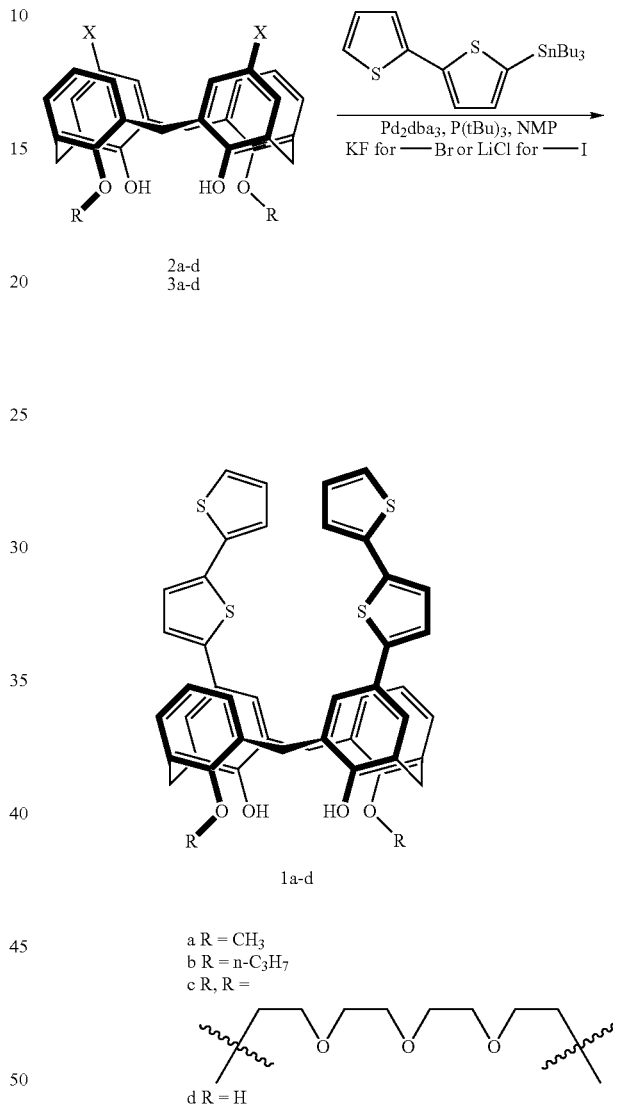

Segmented polymers, Poly(1a-d), based upon a calix[4]arene scaffold, are reported. The cone conformation of the calix[4]arenes creates a zigzag orientation of the polymer segments (Scheme 8). These dynamic and porous materials are attractive candidates for the design of sensing and actuating materials. McQuade, D. T.; Pullen, A. E.; Swager, T. M. *Chem. Rev.* 2000, 100, 2537; Swager, T. M. *Acc. Chem. Res.* 1998, 31, 201; *Polymer Sensors and Actuators*; Osada, Y., DeRossi, D. E., Eds.; Springer: Berlin, Germany, 2000.

Scheme 8.
Zig-Zag polymers based on calix[4]arene backbone.

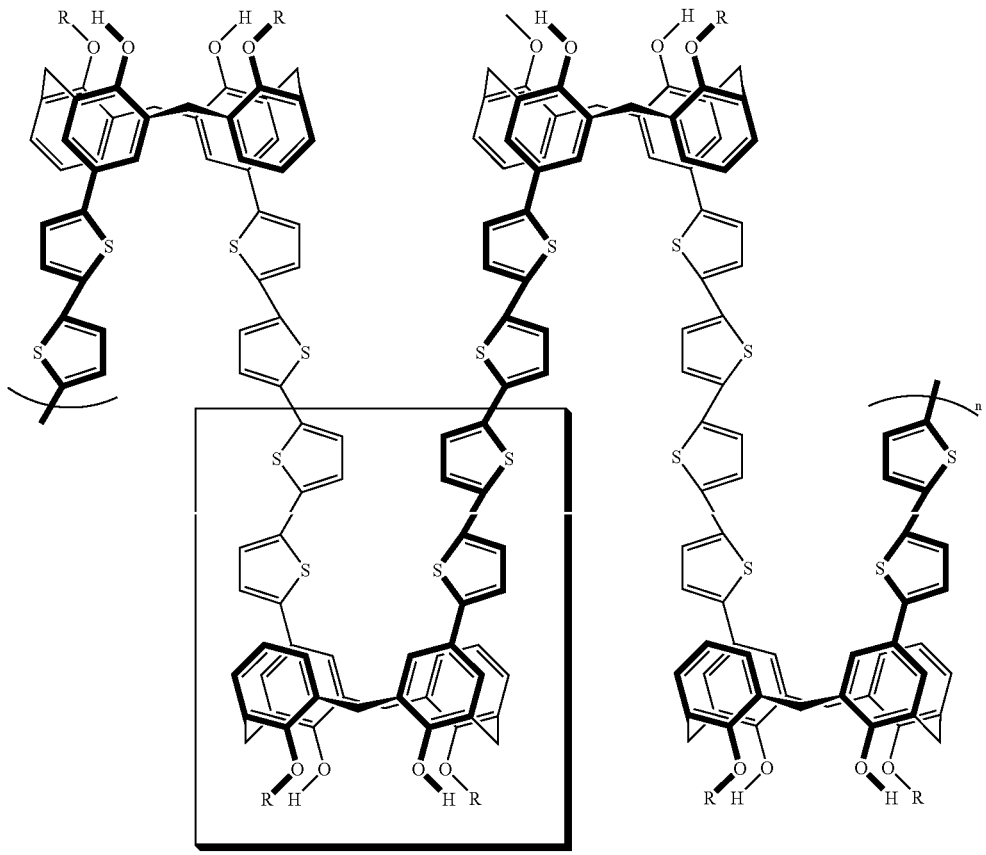

Poly(1a) R = CH
Poly(1b) R = n-C$_3$H$_7$
Poly(1c) R, R =

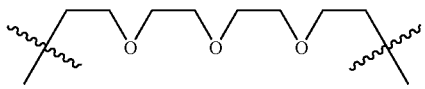

Poly(1d) R = H

Syntheses of Monomers

Syntheses of monomers are summarized in Schemes 9 and 10. As shown in Scheme 9, compounds 2 and 3 were synthesized following the route developed by Reinhoudt and coworkers. Dijkstra, P. J.; Brunink, J. A. J.; Bugge, K. E.; Reinhoudt, D. N.; Harkema, S.; Ungaro, R.; Ugozzoli, F.; Ghidini, E. *J. Am. Chem. Soc.* 1989, 111, 7567; Ghidini, E.; Ugozzoli, F.; Ungaro, R.; Harkema, S.; Abuelfadl, A.; Reinhoudt, D. N. *J. Am. Chem. Soc.* 1990, 112, 6979; Vanloon, J. D.; Arduini, A.; Coppi, L.; Verboom, W.; Pochini, A.; Ungaro, R.; Harkema, S.; Reinhoudt, D. N. *J. Org. Chem.* 1990, 55, 5639; Ungaro, R.; Casnati, A.; Ugozzoli, F.; Pochini, A.; Dozol, J. F.; Hill, C.; Rouquette, H. *Angew. Chem. Int. Ed.* 1994, 33, 1506; Casnati, A.; Pochini, A.; Ungaro, R.; Ugozzoli, F.; Arnaud, F.; Fanni, S.; Schwing, M. J.; Egberink, R. J. M.; Dejong, F.; Reinhoudt, D. N. *J. Am. Chem. Soc.* 1995, 117, 2767; Casnati, A.; Pochini, A.; Ungaro, R.; Bocchi, C.; Ugozzoli, F.; Egberink, R. J. M.; Struijk, H.; Lugtenberg, R.; deJong, F.; Reinhoudt, D. N. *Chem. Eur. J.* 1996, 2, 436. Alkylation of calix[4]arene, which was synthesized as previously reported, was selectively carried out on the opposite phenol rings. *Macrocycle Synthesis: A Practical Approach*; Parker, D., Ed.; The Oxford Press: Oxford, U.K., 1996; Gutsche, C. D.; Iqbal, M. *Org. Synth.*, Coll. Vol. 1993, 8, 75; Vanloon, J. D.; Arduini, A.; Coppi, L.; Verboom, W.; Pochini, A.; Ungaro, R.; Harkema, S.; Reinhoudt, D. N. *J. Org. Chem.* 1990, 55, 5639. Halogenation was then performed on the two remaining free —OH phenol rings to obtain 2a, 2b, and 3a. Demethylation of 2a and 3a with BBr$_3$ yielded 2d and 3d. Vigalok, A.; Swager, T. M. *Adv. Mater.* 2002, 14, 368. Calix[4]arenecrown-5 was synthesized following similar route utilizing Cs$_2$CO$_3$ as template for the formation of the tertaethyleneoxo bridge at the lower rim. Casnati, A.; Pochini, A.; Ungaro, R.; Bocchi, C.; Ugozzoli, F.; Egberink, R. J. M.; Struijk, H.; Lugtenberg, R.; deJong, F.; Reinhoudt, D. N. *Chem. Eur. J.* 1996, 2, 436.

Scheme 9.
Monomer synthesis.

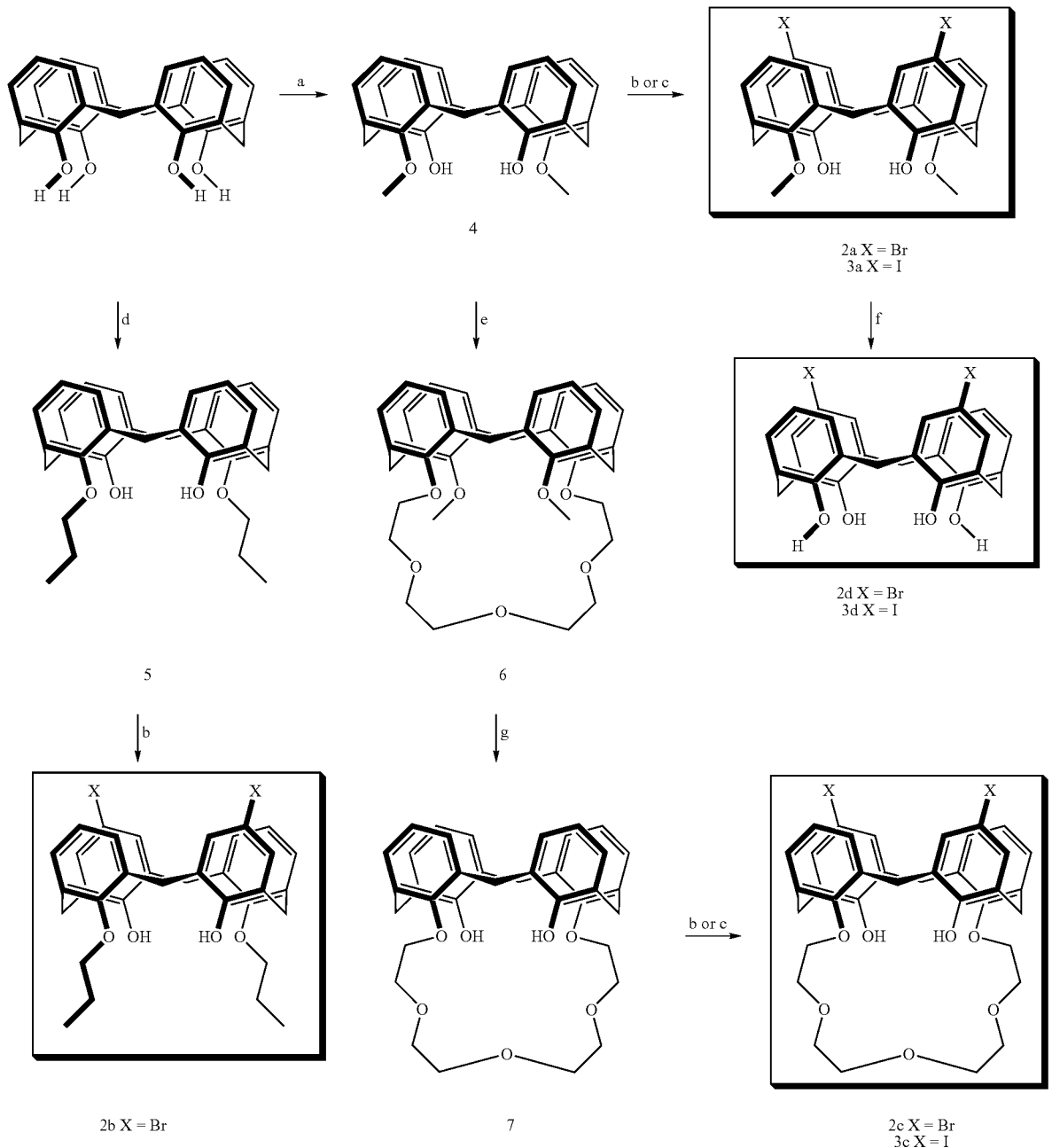

a). MeOTs, K$_2$CO$_3$, CH$_3$CN, 98%.
b). Br$_2$, CHCl$_3$, > 98%.
c). Hg(CF$_3$COO)$_2$, CHCl$_3$, then I$_2$, CH$_3$CN, 85% (dimethoxy), 89% (crown).
d). PrI, CH$_3$CN, 98%.
e). TsOCH$_2$(CH$_2$OCH$_2$)$_3$CH$_2$OTs, Cs$_2$CO$_3$, CH$_3$CN, 70%.
f). BBr$_3$, CH$_2$Cl$_2$, 72%.
g). TMSI, CHCl$_3$, 70%.

Efficient cross-coupling reactions between halo-phenols (2 and 3) and 5-tributylstannyl-2,2'-bis-thiophene in formation of monomers 1a-d proved to be challenging. Reactions performed under common Pd(PPh$_3$)$_4$ conditions were slow (4 to 5 days), poor yielding (less than 40%), and gave large amounts of the homocoupling byproduct, quarterthiophene. Juneja, R. K.; Robinson, K. R.; Johnson, C. P.; Atwood, J. L. *J. Am. Chem. Soc.* 1993, 115, 3818; Xu, B.; Miao, Y. J.; Swager, T. M. *J. Org. Chem.* 1998, 63, 8561. Attempts to protect the phenol with acyl or trimethylsilyl groups prior to coupling reaction resulted in either mixtures of conformational isomers or poor yields due to steric crowding at the lower rim. Takahashi, K.; Gunji, A.; Guillaumont, D.; Pichierri, F.; Nakamura, S. *Angew. Chem. Int. Ed.* 2000, 39, 2925. Optimized cross-coupling reaction conditions were eventually accomplished by utilizing new synthetic methods developed by Fu and coworkers as shown in Scheme 7. Littke, A. F.; Fu, G. C. *Angew. Chem. Int. Ed.* 2002, 41, 4176; Littke, A. F.; Schwarz, L.; Fu, G. C. *J. Am. Chem. Soc.* 2002, 124, 6343. Catalytic Pd$_2$dba$_3$/P(tBu)$_3$ in the presence of inorganic salts (KF for —Br and LiCl for —I) afforded monomers 1a-d in improved yields (64-90%) and reduced reaction times (1 to 2 days). Smith, M. J.; Fu, G. C., unpublished results. One noticeable exception is the coupling reaction of 4a in the presence of KF, where low yields are most likely due to the large binding constant between the calix[4]arnecrown-5 with K$^+$. Casnati, A.; Pochini, A.; Ungaro, R.; Bocchi, C.; Ugozzoli, F.; Egberink, R. J. M.; Struijk, H.; Lugtenberg, R.; deJong, F.; Reinhoudt, D. N. *Chem. Eur. J.* 1996, 2, 436. This binding seemed to diminish the effect of the inorganic salt so the reaction did not proceed as expected. Experimental results of this modified Stille coupling reaction are summarized in Table 1.

Scheme 10. Modified Stille coupling reaction.

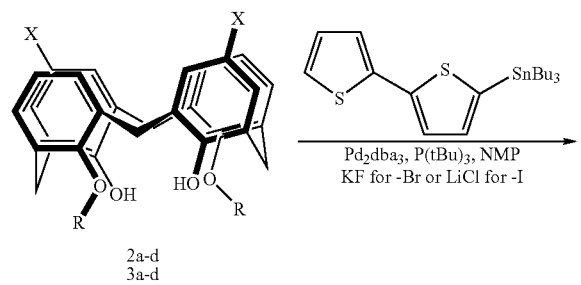

2a-d
3a-d a R = CH$_3$
b R = n-C$_3$H$_7$
c R, R =

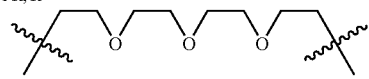

d R = H

TABLE 1

Syntheses of monomers from the modified Stille coupling reaction.[a]

| Compounds | R        | X  | Inorganic Salt | Product | Yields (%)[b] |
|-----------|----------|----|----------------|---------|---------------|
| 2b        | n-C$_3$H$_7$ | Br | KF             | 1b      | 64            |
| 2c        | crown[c] | Br | KF             | 1c      | Low           |
| 2d        | H        | Br | KF             | 1d      | 45            |
| 3a        | CH$_3$   | I  | LiCl           | 1a      | 88            |
| 3c        | crown[c] | I  | LiCl           | 1c      | 90            |
| 3d        | H        | I  | LiCl           | 1d      | 72            |

[a]The reaction was carried out with 3% Pd$_2$dba$_3$, 6.6% P(tBu)$_3$ and 4 equivalent of the inorganic salt in 1-methyl-2-pyrrolidinone (NMP).
[b]Isolated yields.
[c]Crown indicates the two opposite phenol rings are connected through CH$_2$(CH$_2$OCH$_2$)$_3$CH$_2$ bridge.

The two free phenol groups within monomers 1a-d lead to the desired cone conformation of the calix[4]arene scaffold via intramolecular hydrogen bonding. Also, the free phenols play a critical role on the electropolymerization of monomers 1a-d as will discussed later. Another way to lock in the desired cone conformation is to attach four bulky groups at lower rim free —OH. Tetrapropylation of calix[4]arene in DMF yielded 9 in desired cone conformation (Scheme 11). Dondoni, A.; Marra, A.; Scherrmann, M. C.; Casnati, A.; Sansone, F.; Ungaro, R. *Chem. Eur. J.* 1997, 3, 1774. Bromination of the opposite phenyl rings can then be achieved. Wosnick, J.; Swager, T. M., unpublished results. Since there was no free phenol in this system, Stille cross-coupling reaction was accomplished by traditional Pd(PPh$_3$)$_4$ conditions. Larsen, M.; Jørgensen, M. *J. Org. Chem.* 1997, 62, 4171.

Scheme 11. Synthesis of tetrapropoxy substituted calix[4]arene.

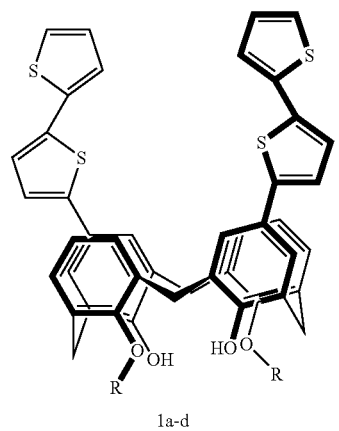

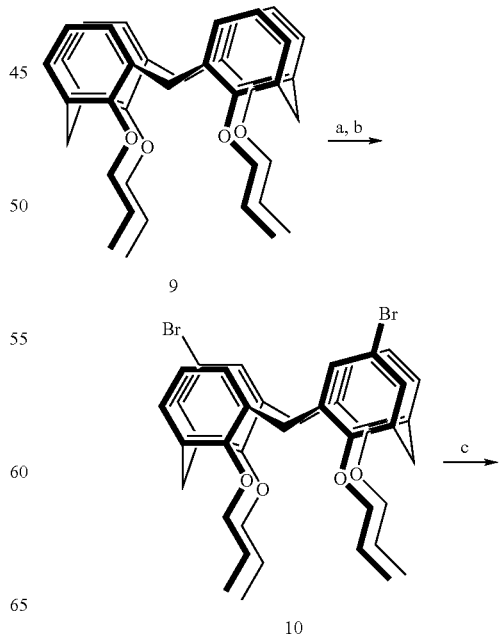

Characterization of the Cone Conformation

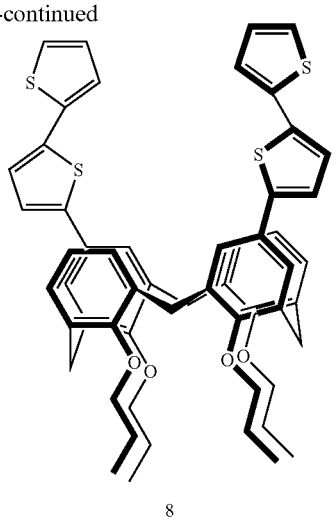

a). $Br_2$, $CHCl_3$. b). 2 eq. nBuLi, then $H_3O^+$.
c). $Pd(PPh_3)_4$, 5-tributylstannyl-2,2'-bithiophene, DMF.

Figure 22:
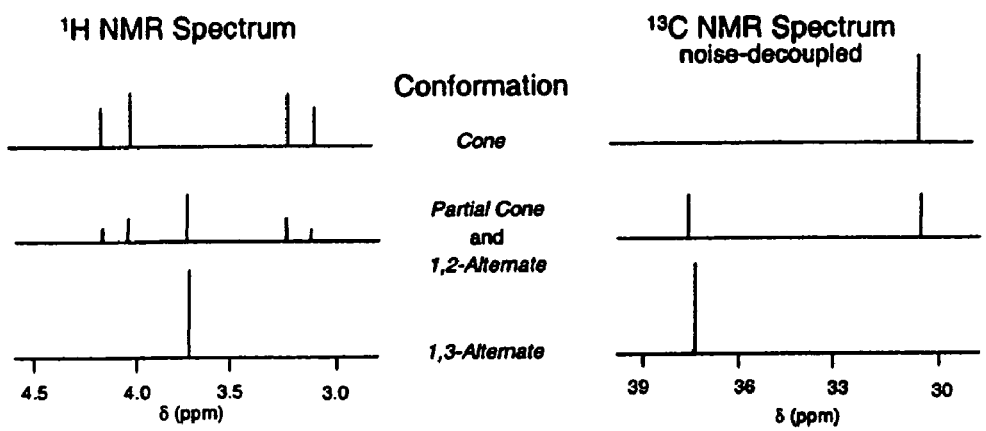
FIG. 22 depicts (a) Patterns of the signal in the $^1H$ and $^{13}C$ NMR spectra of the four conformational isomers of calix[4] arenes. (Reprinted from ref. 4) (b) Conformational dependence of the chemical shift ($\Delta\delta$) between the high- and low-pairs of resonances of the methylene protons in the calix[4] arenes.
Figure 22:
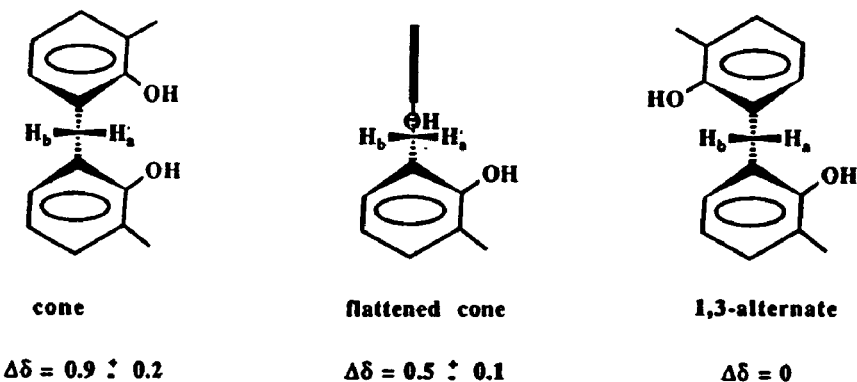

Conformations of calix[4]arenes can be easily identified through their proton and carbon NMR spectra. Gutsche, C. D., Calixarenes, *Monographs in Supramolecular Chemistry*; Stoddart, J. F., Ed.; The Royal Society of Chemistry: Cambridge, U.K., 1989; *Calixarenes in Action*; Mandolini, L., Ungaro, R., Eds.; Imperial College Press: London, U.K., 2000. NMR spectroscopy are used to identify the conformation of calix[4]arene. A pair of doublets between 3.0 and 4.5 ppm in proton NMR one carbon NMR signal at 31 ppm is consistent with calix[4]arenes in the cone conformation as shown in FIG. 22(a). *Calixarenes in Action*; Mandolini, L., Ungaro, R., Eds.; Imperial College Press: London, U.K., 2000. The NMR signals of the bridge methylenes (Ar—$CH_2$—Ar) exhibit a geminal-coupling of ca. 13 Hz in the cone conformation because the proton pointing to the center of the calix[4]arene molecule ($H_a$ in FIG. 22(b)) has a different chemical surroundings with the other proton ($H_b$ in FIG. 22(b)). The difference between the high and low pairs of resonance ($\Delta\delta$) is generally ca. 0.9 ppm for calix[4]arenes with a cone conformation and 0 ppm for the 1,3-alternate conformational species. The $\Delta\delta$ values provide an indication of the degree of which the systems depart from true cone or 1,3-alternate conformation (FIG. 22(b)). Gutsche, C. D., *Calixarenes, Monographs in Supramolecular Chemistry*; Stoddart, J. F., Ed.; The Royal Society of Chemistry: Cambridge, U.K., 1989.

As summarized in Table 2, all of the monomers 1a-c and 8 exhibit the desired cone conformation. Monomer 1d exhibits less steric hindrance on the lower rim of the calix[4]arene and hence, the gemini protons of the bridged methylene groups undergo exchange between exo and endo positions. However, the cone is still the most stable conformation of 1d because at room temperature, the proton NMR spectrum consists two pairs of doublets for the methylene bridges even though both pairs are broadened. Gutsche, C. D.; Bauer, L. J. *J. Am. Chem. Soc.* 1985, 107, 6052.

TABLE 2

Proton and carbon NMR of bridge —$CH_2$— in 1a-d and 8.

| Compounds | Proton NMR | $\Delta\delta^a$ | Carbon NMR |
|---|---|---|---|
| 1a | 3.46, 4.33 | 0.87 | 31.6 |
| 1b | 3.43, 4.34 | 0.91 | 31.9 |
| 1c | 3.42, 4.46 | 1.04 | 31.1 |
| 1d | 3.58, 4.29[b] | 0.71 | 31.7 |
| 8 | 3.20, 4.49 | 1.29 | 30.9 |

[a]The difference between the high and low pairs of resonances.
[b]broad doublets.

Utilization of an Ionic Polymer Matrix as a Backbone Enhancing the Molecular Conformational Transition of Molecular Actuators To develop artificial muscle technology for applications in life-like robotics, active prostheses or medical devices it is necessary to obtain the contractile material in bulk form. However, early films of the novel thiophene based monomers that were grown have been brittle and difficult to handle. Polymer composites of the active polymer with a sulfated polymeric anion were therefore created to increase the mechanical robustness of the films, following the example of Wallace et al. in polypyrrole. Ding J., Price W. E., Ralph S. F. and Wallace G. G., "Synthesis and properties of a mechanically strong poly(bis-thiophene) composite polymer containing a polyelectrolyte dopant", *Synthetic Metals*, Vol. 110, pp. 123-132, 2000. This additional polyelectrolyte is Sulfated Poly-β-Hydroxy Ether (S-PHE). It is designed to form a supporting elastic matrix for the new contractile compounds. Notice that the S-PHE polymer is a large molecule, its molecular weight exceeding 30,000 g/mol. The polyelectrolyte is added to the deposition solution during electrochemical polymerization and hence replaces typical salts used, such as tetraethylammonium hexafluorophosphate for example. The structure of the S-PHE is shown below in Scheme 12. The Molar Ratio (MR) of sulfate groups (n) to hydroxyl groups (m) is also referred as the sulfation ratio and is computed as follows: MR=n/(n+m).

Scheme 12. Structure of the S-PHE polyelectrolyte.

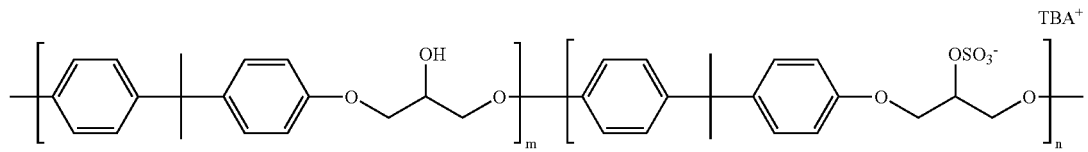

Two different polymers incorporated within the same material will typically phase separate. The sulfate group in the S-PHE, however, enhances the coulombic interaction between each phase of the composite resulting in the minimization of the phase separation between conducting and insulating polymer. Incorporation of the polyanion into the polymer film has the following consequences: first, it provides an elastic mechanical support to the polymer molecules, reducing film brittleness. Second, the lack of polyanion mobility has the effect that charge compensation during oxidation or reduction is mainly achieved by diffusion of cationic species into the polymer composite. Comparing to 3% maximum strain change of other conducting polymers, films from composite materials of poly(QT) and s-PHE (sulfonated poly(bisphenol A-co-epichlorohydrin) show 16-23% strain change. In addition, the ionic-polymer matrix enhances the mechanical properties of free standing films made of these conducing polymer molecular actuator materials. In traditional single phase conducting polymer actuators such as polypyrrole, both ionic species diffuse into and out of the polymer during oxidation and reduction with rates that are size and geometry dependent. The larger the ion, the more likely it is to be immobilized via entanglement. Polyanions such as S-PHE are large enough that they are effectively locked in place.

Poly(QT) and (Poly(QT))/S-PHE Composite Material

The synthesis of composite materials was performed by electrodeposition using galvanostatic methods onto gold-coated poly(ethylene terephthalate) (PET) films (200 nm thickness) and using a copper sheet as the counter electrode ($Ag/Ag^+$ redox couple is used as the reference electrode). Conducting polymer films were grown from a saturated $CH_3CN$ solution of quarterthiophene (QT) monomer, 0.1 M $Et_4NPF_6$ (TEAP) and S-PHE with diverse concentrations (0.02%, 0.2%, 0.5%, 1% and 2% by weight) with different MR values. Depositions by galvanostatic methods were conducted at 25° C. with current densities of 1.25 A/m$^2$ for 5 hours, resulting in film thickness between 120 and 150 µm (temperature is a critical factor of electropolymerization, see Madden, J. D.; Cush, R. A.; Kanigan, T. S.; Brenan, C. J.; Hunter, I. W. *Synth. Met.* 1999, 105, 61). The resulting films of Poly(QT)/S-PHE were then peeled off the working electrode, rinsed in $CH_3CN$ and allowed to dry for 24 hours. Poly(QT)/S-PHE films exhibited conductivities of $10^{-1}$ $S·m^{-1}$, (Conductivities were measured by four-point probe method) the dry films had densities of between 550 and 750 kg m$^{-3}$ and tensile strengths of 20 MPa. The tensile strength decreased to 1.3 MPa when soaked in $CH_3CN$.

Figure 10:
FIG. 10 depicts the effect on poly(QT) polymer film strength of blending with the S-PHE polyanion.
Figure 10:
Figure 10:

As shown in FIG. 10, Poly(QT) synthesized in the absence of S-PHE formed brittle (powder like) material with no mechanical strength. In contrast, the Poly(QT)/S-PHE composite films are easily separated from the electrode surface and exhibit a much greater tensile strength.

Calix[4]arene-Based Conducting Polymer/S-PHE Composite Materials

Similar experiments were carried out to synthesize calix [4]arene-based conducting polymer/S-PHE composite materials. The polymer used was poly(bis-(bithiophene-5-yl) dipropoxycalix[4]arene.

Figure 23:
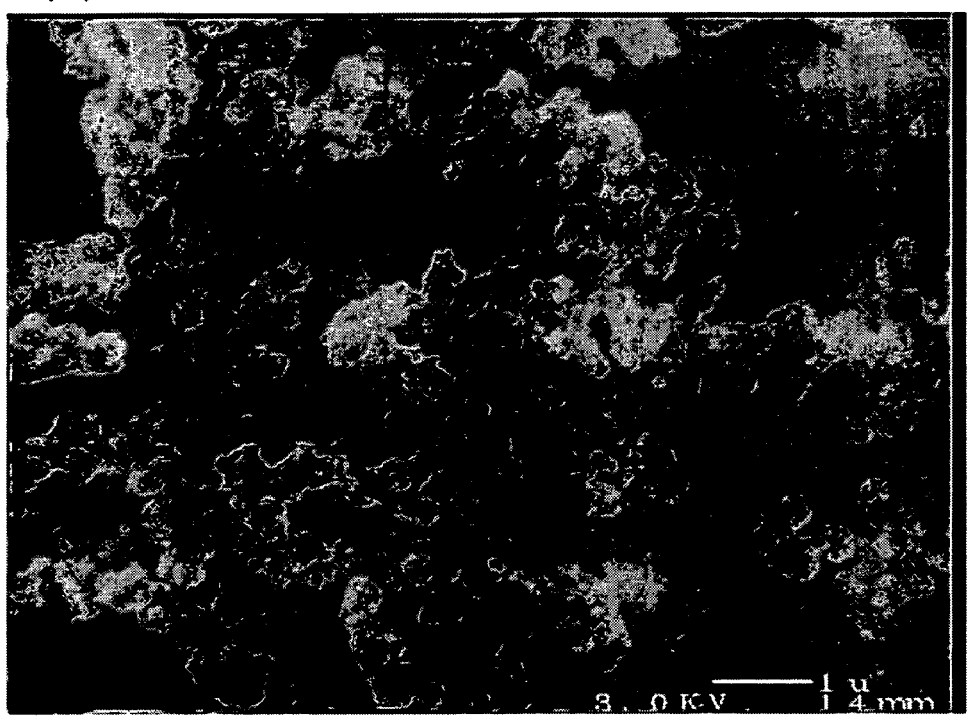
FIG. 23 depicts SEM images of (a) Poly(calix[4]arene-bis-bithiophene) ("poly(calixBBT)") film and (b) Poly(calix-BBT)/S-PHE film.
Figure 23:
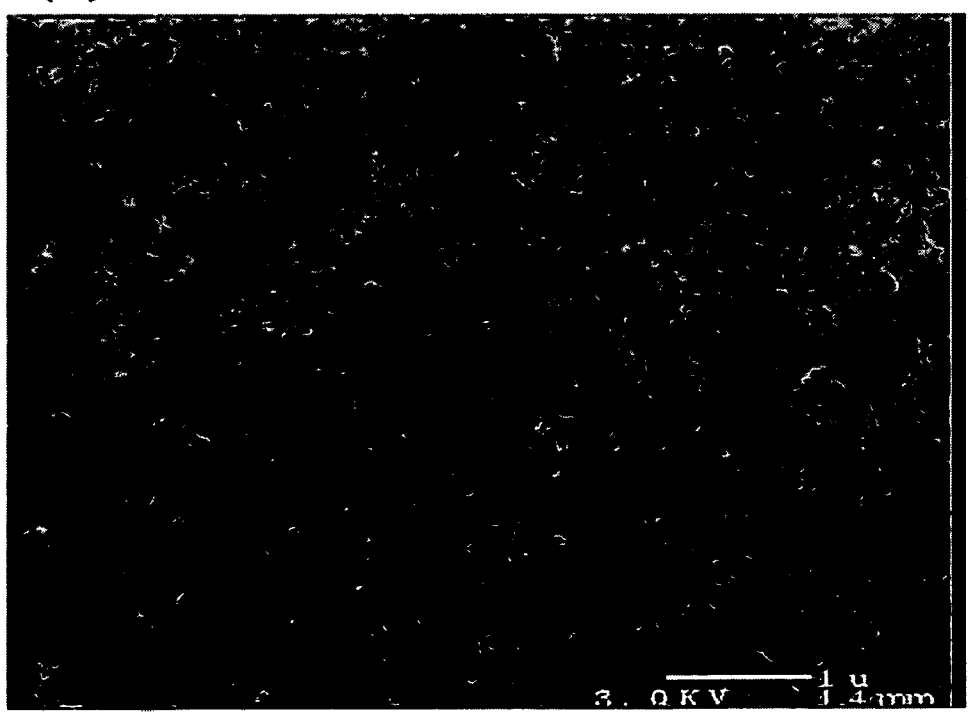

Due to the insolubility of the calix[4]arene(BT) monomer in $CH_3CN$, bulk synthesis of this composite material was conducted in $CH_2Cl_2$. The initial test results of this material revealed several problems involving low conductivity of the deposited films and the moderate solubility of S-PHE in $CH_2Cl_2$. From viewing the SEM images, it was observed that the existence of S-PHE made the material more amorphous as opposed to the more crystalline film we observed in the pure Poly(calixBBT) film as shown in FIG. 23. However, the conditions of the electropolymerization need to be optimized and different microscopic techniques such as TEM and AFM need to examine more about this material at the molecular level.

Electrochemical Studies and Actuation Principle

Evidence of a reversible transformation between π-stacked and un-stacked conformations as oxidation state is altered is obtained using EPR spectroscopy. FIG. 7 shows the difference of the EPR signal during a 100 mV/s swept cyclic potential (0V to 1.5V vs. Ag/Ag+) for polymers polymerized from bithiophene, poly(BT), terthiophene, poly(TT), and quarterthiophene, poly(QT). Interestingly, the degree of πstack stability in polythiophene is a function of the type of thiophene monomer used for polymerization. Notice the degree of the hysteresis needed during the reverse sweep (from 1.5V back to 0V) to revert the signal from EPR silent to EPR active. Such hysteresis is barely observed for poly(BT), whereas it spans 0.6V for poly(QT).

Figure 8:
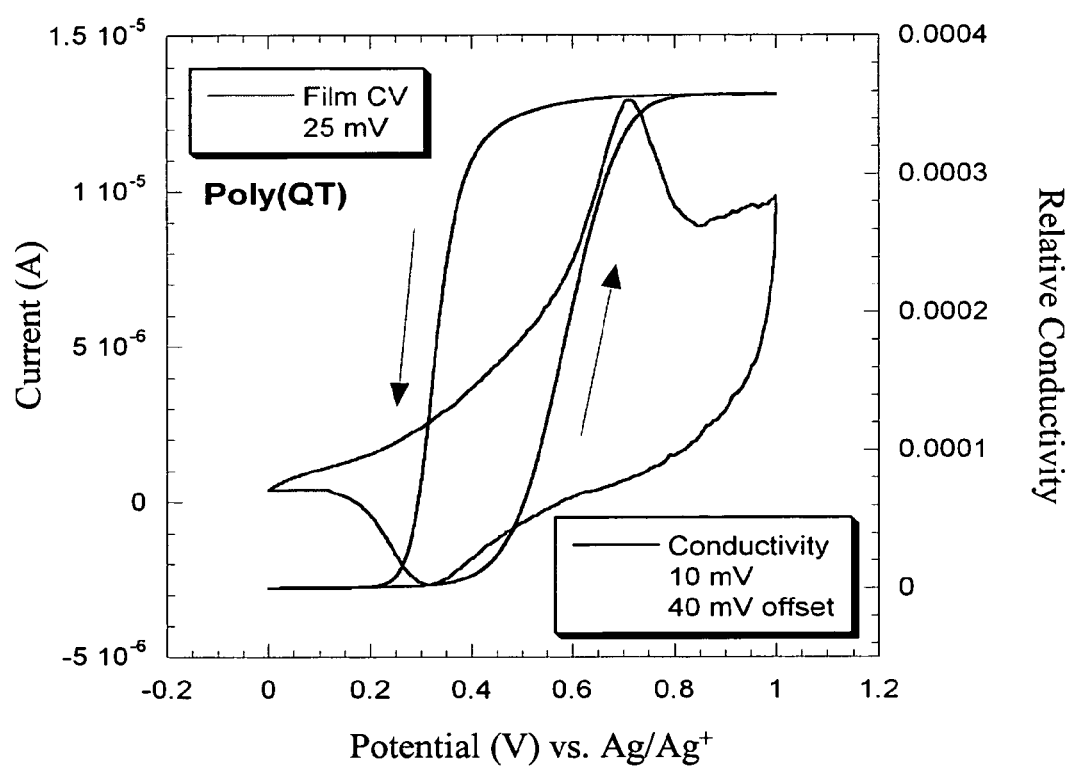
FIG. 8 depicts the relative conductivity of a poly(QT) film vs. oxidation potential, overlaid with a cyclic voltamogram.

In situ conductivity measurements allow probing polymer film conductivity as function of oxidation state hence giving an insight into electrochemical processes taking place at the molecular level. Films of poly(QT) prepared as described in Section 4, were cycled at 25 mV/s at potentials between 0 V and 1 V vs. Ag/Ag$^+$ and their conductivity measured against a bias of 40 mV using interdigitated microelectrodes. FIG. 8 shows the relative conductivity of a poly(QT) film vs. oxidation potential, overlaid with a cyclic voltamogram. Notice the large relative conductivity hysteresis in FIG. 8, where a potential difference of 0.6 V is required to revert the relative conductivity of poly(QT) from conducting to insulating during the reverse sweep.

Such hysteresis effects during π-dimerization are also easily observable by combined means of electrochemical cyclic voltammetry and in situ conductivity measurements. Interdigitated microelectrodes allow the measurement of film conductivity in situ as a function of oxidation state. Films were cycled at 5 mV/s and 25 mV/s at potentials between 0V and 1V vs. Ag/Ag+ and their conductivity measured against a bias of 40 mV. Notice the increase in relative conductivity hysteresis in FIG. 8 as a function of number of thiophenes used in the monomer prior to polymerization. Hysteresis to revert the relative conductivity of poly(BT) from conducting to insulating requires 0.37V whereas it requires almost twice as much to revert poly(QT) (0.6V).

Such a large hysteresis indicates that more energy is required to switch poly(QT) from its oxidized state to its reduced state and vice versa, giving strong evidence that a more stable structure (possibly the π-dimer) has been formed as a result to the initial anodic potential sweep in which the quarterthiophene groups were oxidized. In other words, the higher stability of the π-dimer in poly(QT) makes the aggregated state harder to reduce, causing the large hysteresis in the current voltammogram. On the other hand, such a behavior could be also attributed to electrochemical kinetic limitations such as electron transport or ion diffusion. However film relative conductivity is high over the entire potential range of the reduction sweep, indicating that such kinetic limitations do not take place.

Assuming that π-π stacking of quarterthiophenes redox units is the driving force for actuation, how much energy can be produced during such a contraction? From theoretical and experimental studies on quarterthiophene dimers in solution, the barrier of dissociation of π-stacks is found to be 1.3·10$^{-19}$ J (0.8 eV or 18.5 kcal/mol). Brocks G, "Charged Oligothiophene Dimers and π-stacks: the Bipolaron Revisited", *Syn-* thetic Metals, Vol. 119, pp. 253-254, (2001); and Yamamoto T., Kamarudin D., Arai M., Lee B.-L., Suganuma H., Asakawa N., Inoue Y., Kubota K., Sasaki S., Fukuda T. and Matsuda H., "Extensive Studies of π Stacking of Poly(3-alkylthiophene-2,5-diyl)s and Poly(4-alkylthiazole-2,5-diyl)s by Optical Spectroscopy, NMR Analasis, Light Scattering Analysis, and X-ray Crystallography", *Journal of the American Chemical Society*, Vol. 120, pp. 2047-2058, (1998). Notably, this energy value is an order of magnitude larger then the Van der Waals bonding energy. It is also equivalent to 31 $k_B T$ (where $k_B$ is Boltzmann's constant and T is the absolute temperature; at room temperature, 1 $k_B T$ is $4.1 \cdot 10^{-21}$ J). Hence, the π-dimer is considered to be an electro-reversible chemical bond. Interestingly, molecular actuators found in nature operate within the same energy range. For example, ATP synthase—which is a 10 nm rotational ATP synthesizing molecular motor found in mitochondria, bacteria and chloroplasts—produces 20 $k_B T$ of work per ATP synthesized (⅓ of rotation). Elston T., Wang H. and Oster G., "Energy Transduction in ATP Synthase", *Nature*, Vol. 391, pp. 510-513, (1998). Similarly, single actin-filament/myosin-head interaction in human skeletal muscle produces between 3 and 15 $k_B T$ of work.

Previous AM1 (Austin Model 1) molecular simulations show that two arms of the poly(calix[4]arene-bis-thiophene) molecular actuator can theoretically contract by 1.39 nm upon oxidation. Yu H.-h., Pullen A. E. and Swager T. M., "Toward New Actuating Devices: Synthesis and Electrochemical Studies of Poly(11,23-bis[2,2'-bis-thiophene]-5-yl)-26,28-dimethoxycalix[4]arene-25,27-iol)", Polymer Science Material Engineering, Vol. 83, (523): (2000). Dividing the amount of work generated per monomer unit of $1.28 \cdot 10^{-19}$ J by the active molecular displacement, it is estimated that a single molecule of calix[4]arene-quarterthiophene will produce at most 92 pN of average active force.

Turning to the theoretical maximal efficiency of such a molecular actuator, as each QT arm needs to be oxidized to form a π-stack we can assume that the removal of 2 electrons per calix[4]arene-quarterthiophene unit is required to achieve π-stacking. From the poly(QT) film electroactivation cyclic voltamogram, we observe that there is a potential difference of 0.6 V between the oxidation and reduction wave. Therefore the electrical energy that is brought into the system during oxidation of a single poly(calixBBT) molecule is $1.92 \cdot 10^{-19}$ J. Thus, the proportion of energy converted to work (the electromechanical coupling efficiency) of poly(calixBBT) as molecular actuator is potentially as high as 66.7%.

Generally, stress times strain is the work per unit volume. The novel molecular muscle materials are designed with the goal of achieving 20% strain contraction on average. Considering the poly(calixBBT) as a bulk material, and assuming a bulk density of 1300 kg/m$^3$, a molecular weight of 781 g/mole and an energy for π-π stacking of 18.5 kcal/mol, the maximal average stress is found to be 321 Mpa.

General Synthetic Procedures

Key feature in synthesizing usable artificial muscles is to be able to create mechanically stable freestanding films. The polymer synthesis route taken is mainly electrochemical. An ionic polymer matrix (such as poly(β-hydroxyether)) is added during synthesis to enhance the mechanical properties of films made of our novel molecular muscle materials.

Conducting polymers are easily polymerized onto a conducting electrode in an electrochemical cell. The working electrode materials that can be used for example are glassy carbon or gold-coated PET films. Poly(QT) films, for example are synthesized with 0.1 M tetraethylammonium hexafluorophosphate and a certain percentage (by mass) of a polymeric anion such as sulfonated poly(bisphenol A-co-epichlorohydrin) (s-PHE) in acetonitrile under galvanostatic conditions (constant current at 0.125 mA/cm$^2$, for example) or cyclic voltammetry. Our experiments showed that films that contained at least 2% s-PHE outperformed films with lower concentrations of s-PHE.

Polymer Synthesis Results

Figure 14:
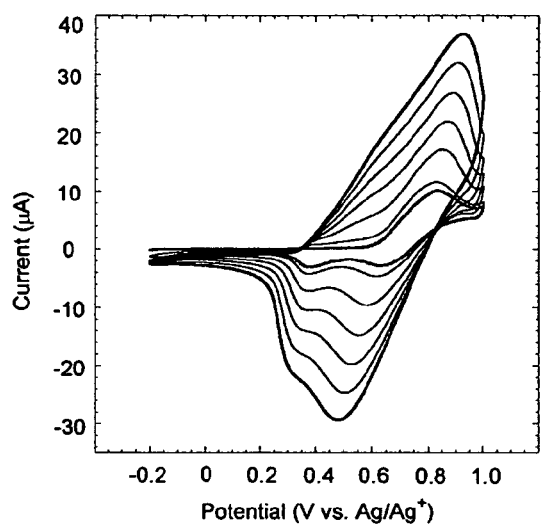
FIG. 14 depicts the cyclic voltamograms for A) poly (crown-bis-thiophene) ("poly(crowncalixBBT)") polymerization via cyclic voltametry (100 mV/s scan rate) and B) poly(calixBBT) polymerization via cyclic voltametry (100 mV/s scan rate).
Figure 14:
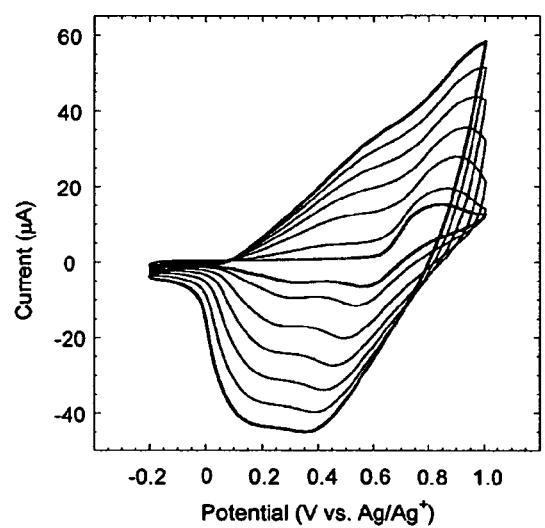

Poly(calixBBT) films were synthesized with 0.1M TEAP in dichloromethane under galvanostatic conditions (1.25 A/m$^2$, (0.125 mA/cm$^2$)). A typical cyclic voltamogram (100 mV/s) of the deposition process is shown in FIG. 14. Note the oxidation voltage versus Ag/Ag$^+$. Additionally, the increase in current after each potential scan shows that material is being added to the working electrode.

Figure 15:
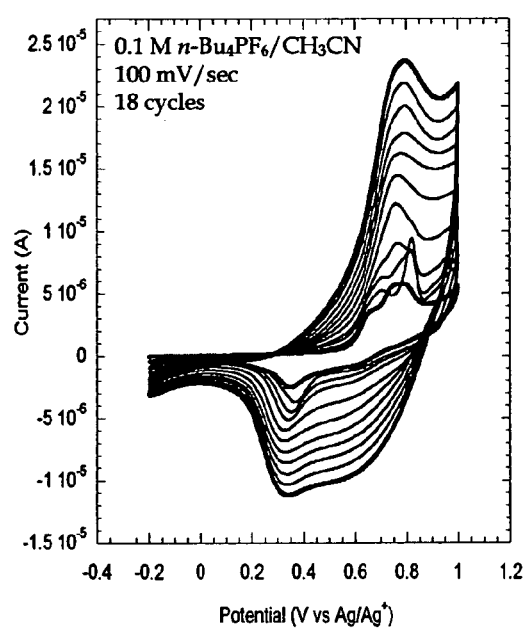
FIG. 15 depicts the cyclic voltamograms for A) poly(QT) polymerization via cyclic voltametry (100 mV/s scan rate) and B) poly(QT) film property as a function of scan rate.
Figure 15:
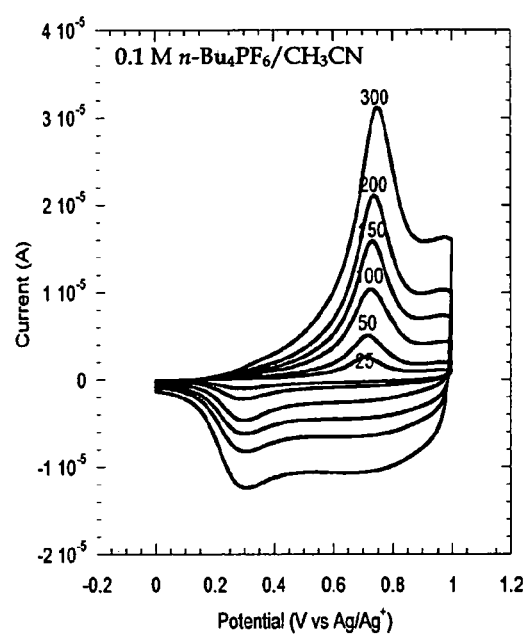

Similarly, poly(QT) films used for in-situ conductivity measurements were synthesized with 0.1M TBAP in acetonitrile under galvanostatic conditions (1.25 A/cm$^2$). A typical cyclic voltamogram (100 mV/s) obtained during the deposition process is shown in FIG. 15.

Poly(calixBBT)/S-PHE free standing composite films were grown galvanostatically (1.25 A/m$^2$) from a solution containing 5 mM calix[4]arene-bis-thiophene, 2% weight S-PHE (MR=1) and 0.1M of TEAP in acetonitrile. Similarly, poly(QT)/S-PHE free standing composite films were grown galvanostatically (1.25 A/m$^2$) from a solution containing 5 mM QT, 2% weight S-PHE (MR=1) and 0.1M of TEAP in acetonitrile. FIG. 10 compares the morphologically superior characteristics of a poly(QT)/S-PHE polymer composite film with a simple QT film. Notice that the simple QT film has the form of a brittle (powder like) material with absolutely no mechanical strength. On the other hand the QT/S-PHE composite exhibits a tensile strength of 20 MPa (dry).

General Method of Actuation

Figure 9:
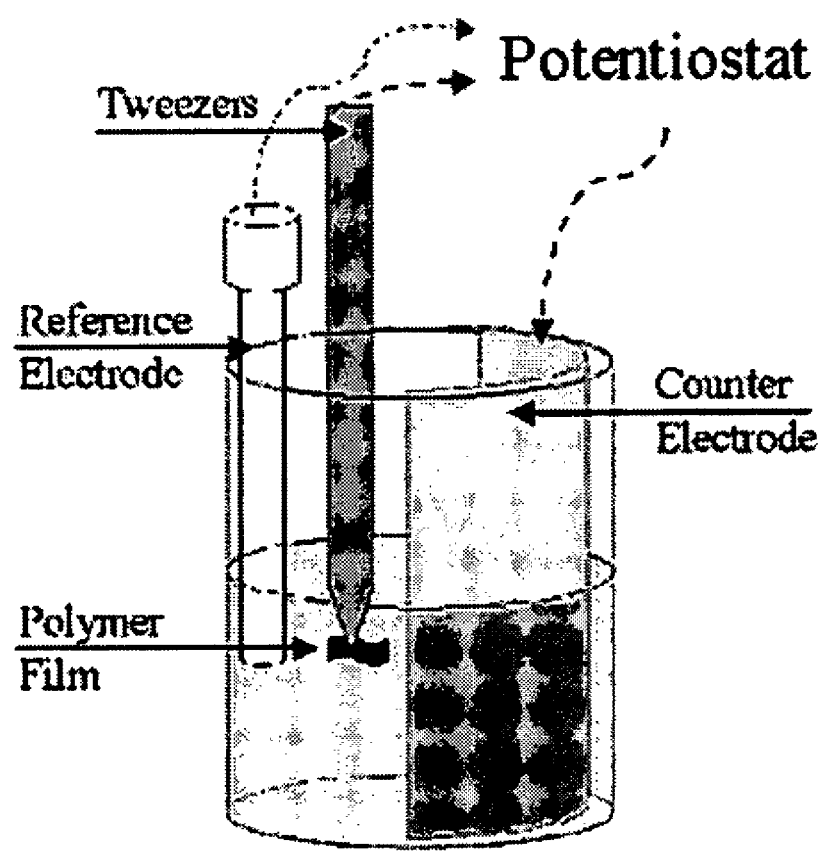
FIG. 9 depicts the setup for electrochemical actuation.

Electrochemical: Freestanding films made of novel molecular actuators can be activated and controlled using electrochemical methods. For example, an electrochemical cell made of the film (acting as working electrode), a reference electrode and a counter electrode, all connected to a potentiostat offer a way to actuate the contractile film (see FIG. 9).

Chemical: A chemical stimuli, such as introduction of Nitric Oxide (NO) or a pH change can be used as a mean to activate molecular conformational change. Using energy in a chemical form offers very significant advantages both in terms of power/mass and energy/mass ratios and in terms of long term energy storage. In essence, it is desirable to utilize an energy source similar to the way living organisms use ATP (adenosine triphosphate) to function.

Photochemical: Light can also be used as a mean to activate molecular conformational changes, showing that we are not limited to an electrical stimulus.

Synthesis of Poly(QT)/S-PHE Free Standing Films

The novel monomers presented herein are designed and synthesized from scratch. Synthesis conditions have to be optimized towards highly conductive and mechanically strong materials. The freestanding mechanical properties of the active films are very important for building actuators as they determine both the active (contractile) and the passive (load bearing) performance. Material conductivity is important because it affects the speed at which the material can be activated (i.e. expanded or contracted).

The use of an elastomeric polyelectrolyte such as the S-PHE presented in Section 2.4 enables the creation of mechanically robust materials. This method, however significantly reduces polymer film conductivity as the S-PHE is an insulating polymer (~$10^{-7}$ S/m). Studies to be published by Anquetil and Zimet as well as studies by Ding et al. of polypyrrole/S-PHE show how the addition of S-PHE to a highly conductive polymer such as polypyrrole significantly reduces its conductivity; Ding J., Price W. E., Ralph S. F. and Wallace G. G., "Electrochemical Behavior of polypyrrole/sulfated poly($\beta$-hydroxyether) composites", *Synthetic Metals*, Vol. 129, (67-71): (2002). Similarly, the conductivity of poly(QT)/S-PHE films is affected by the addition of the S-PHE polyanion.

Figure 17:
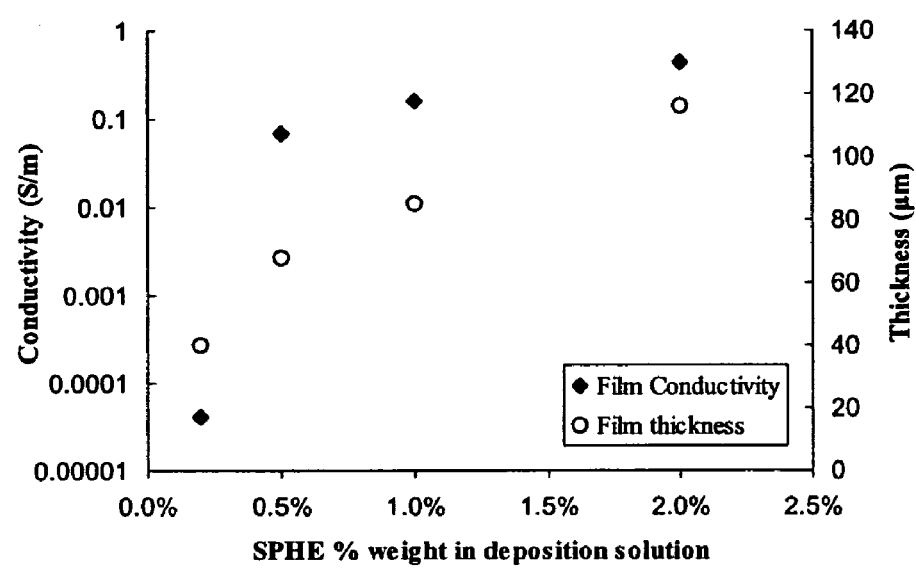
FIG. 17 depicts poly(QT)/S-PHE sample conductivity (diamonds) and sample thickness (circles) as a function S-PHE % weight in the electropolymerization solution for 2.5 hours deposition at 1.25 A/m$^2$.

The films presented in FIG. 17 were synthesized from an acetonitrile solution containing 5 mM QT, 0.1 TEAP and where the concentration of the S-PHE polyanion (MR=1) was varied from 0.5% weight to 2% weight. All films were deposited for the same amount of time (2.5 hours) under constant current conditions (1.25 A/$m^2$). Conductivity of the films ranged from $4.2 \cdot 10^{-5}$ S/m to 0.16 S/m. It was found that conductivity increased as a function of S-PHE present in the deposition solution. We believe that a larger concentration of S-PHE enhances polymer growth. The S-PHE is a negatively charged polymer and co-deposits with QT at the positive working electrode. A larger S-PHE concentration in the deposition solution thus translates into more molecules that will assemble on the substrate, forming an elastomeric matrix onto which the deposited polymer can graft. This hypothesis is supported by the increase of material thickness as a function of S-PHE concentration while deposition time (2.5 hrs) and deposition current density (1.25 A/$m^2$) remained constant (circles in FIG. 17). In addition the charge on the S-PHE is partially responsible for polymer doping along with $PF_6^-$ ions. On the other hand thiophenes have been reported in the literature to reach conductivities of $2 \cdot 10^4$ S/m; Roncali J., "Synthetic Principles for Bandgap Control in $\pi$-Conjugated Systems", *Chemical Reviews*, Vol. 97, (1): (1997). This significant decrease in conductivity could be explained by a combination of low QT polymer molecular weights and impaired interchain charge hopping due to the large size of the S-PHE backbone (~40,000 molecular weight); Roth S., "One-Dimensional Metals Physics and Material Science", VCH, Weinheim; New York; Basel; Cambridge; Tokyo, pp. 111-148, (1995).

Actuator Passive Mechanical Properties

Films of poly(QT) were prepared as described below in the Exemplification section Passive mechanical testing of the poly(QT)/S-PHE was conducted using a Perkin Elmer Dynamic Mechanical Analyzer (DMA 7e) (www.instruments.perkinelmer.com). It allows tensile tests to be performed on polymer films in or out of solution and at a controlled temperature. This apparatus was used to study the response of poly(QT)/S-PHE samples as a function stress. It was also used to study the mechanical properties of S-PHE films alone.

Based on the conductivity study presented above (Section 4.1), films of poly(QT)/S-PHE were synthesized such that selected synthesis parameters would lead to films with the highest conductivity. Films were synthesized from a solution of acetonitrile containing 5 mM QT, 0.1 M TEAP and 2% weight S-PHE (MR=1) at room temperature. Polymerization at 1.25 A/$m^2$ for 4.5 hours led to a 100 µm thick film. The polymers were then peeled off the electrode material and their passive as well as active mechanical properties studied. The active mechanical properties are presented in Section 4.3.

Figure 18:
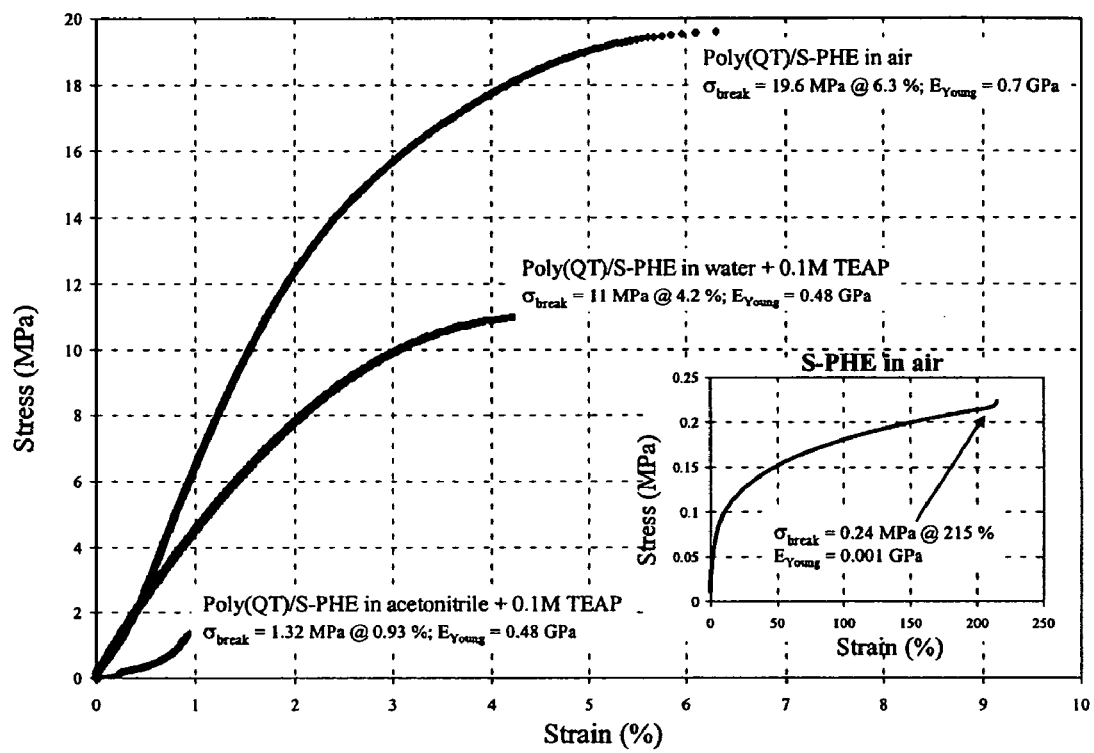
FIG. 18 depicts the passive mechanical response of the poly(QT)/S-PHE composite (dry, in 0.05 M TEAP in distilled water, in 0.1 M TEAP in acetonitrile and of standalone dry S-PHE).

FIG. 18 shows the mechanical response of a poly(QT)/S-PHE sample as a function of applied stress. Note that the mechanical passive response varies depending on the sample environment (dry, in 0.05 M TEAP in distilled water, in 0.1 M TEAP in acetonitrile). The tensile strength of dry poly(QT)/S-PHE composites peaks at 19.6 MPa, while it decreased to 11 MPa when the samples were placed in 0.05 M TEAP in water and further decreased to only 1.32 MPa when placed in 0.1 M TEAP in acetonitrile. Note on the other-hand that the tensile strength of the S-PHE alone is 0.22 MPa and it is very elastic (elongation to break ~215%). It is speculated that the poor mechanical properties of poly(QT)/S-PHE composites are due in part to the re-dissolution of the elastomeric S-PHE once placed back into acetonitrile.

The passive mechanical properties of poly(QT)/S-PHE range from tensile strength between 19.6 and 1.32 MPa with elastic moduli between 0.7 and 0.48 GPa depending on the environment, which corresponds to strong mechanical properties for a conducting polymer. Such properties are useful for building actuators.

Bilayer Beam Bending Testing

Figure 11:
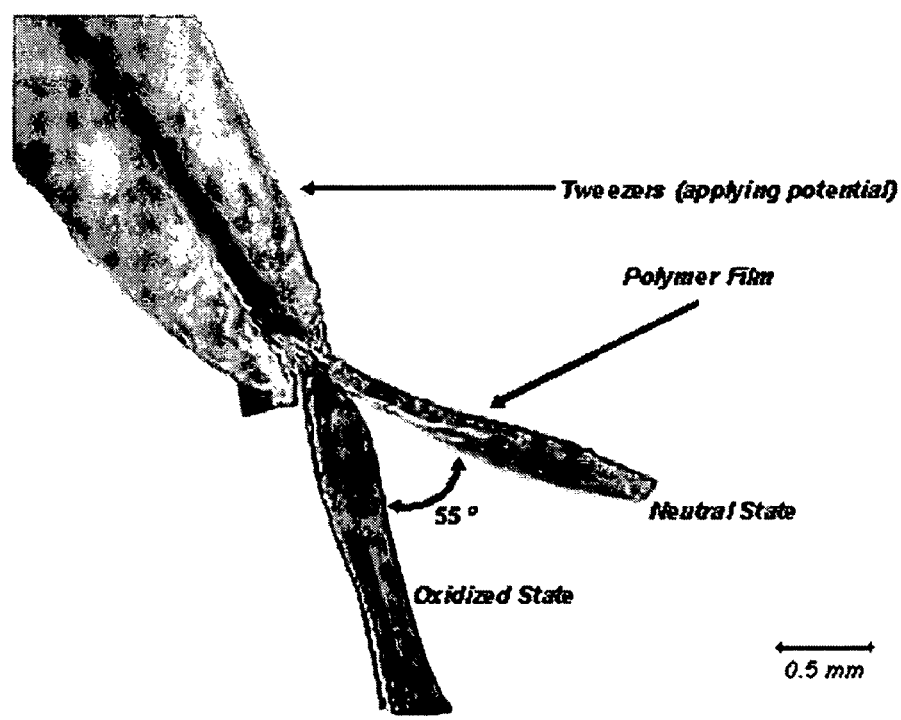
FIG. 11 depicts a poly(QT) film in actuation electrochemical cell setup as seen under the microscope. The film is held by a pair of stainless steel tweezers which also act as a working electrode. The micrograph shows the oxized state (contracted) and expanded state (expanded) overlaid on the same frame.
Figure 19:
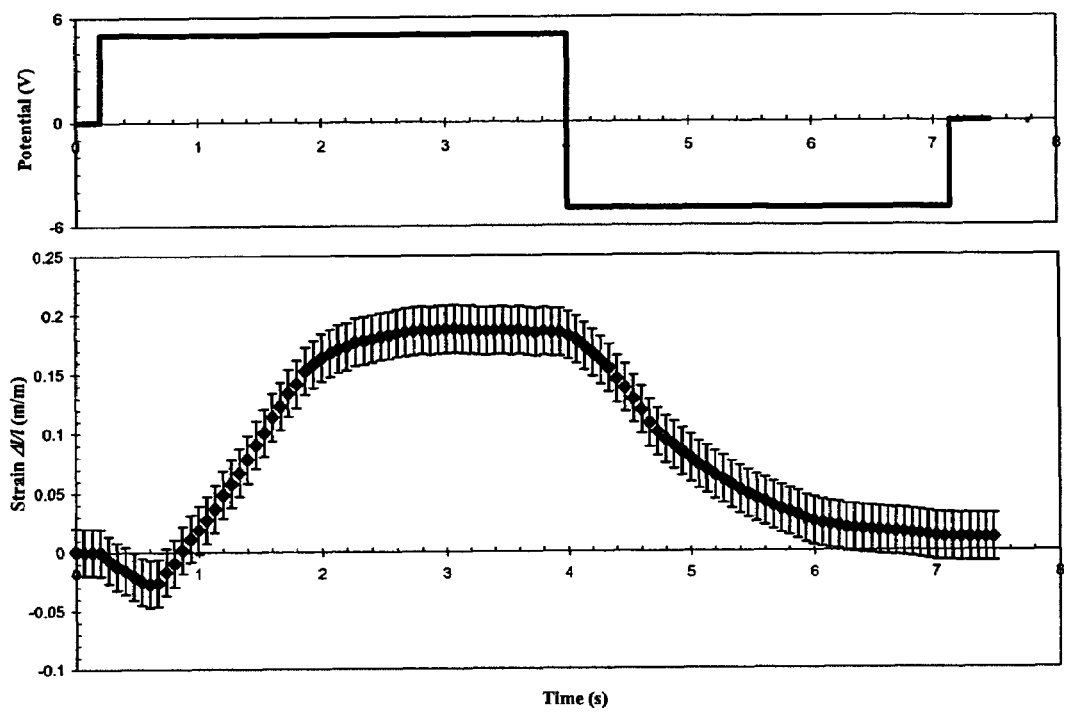
FIG. 19 depicts the active strain generated by the poly(QT)/S-PHE system in the bilayer beam-bending configuration.

Following the method of Pei et al., initial electromechanical testing was conducted using the bilayer beam-bending method; Pei Q. and Inganas O., "Electrochemical Application of the Bending Beam Method. 1. Mass Transport and Volume Changes in Polypyrrole during Redox", *The Journal of Physical Chemistry*, Vol. 96, (25): pp. 10507-10514, (1992). The displacement of a 80 µm thick poly(QT)/S-PHE bilayer was observed under a Zeiss Stemi SV-8 binocular microscope (www.zeiss.com) and recorded using a DFW-S300 digital Sony video camera (www.sony.com) under IEEE 1394 transfer protocol. Inspection of the video micrographs reveals that the part of the bilayer that bends has a length of $l_o$=0.15 mm (total length of the bilayer is 2.25 mm). The bilayer bending angle $\theta$ is related to strain ($\Delta l/l_o$) via, $$\frac{\Delta l}{l_o} = \frac{d}{2l_o} \cdot \theta,$$

where d is the thickness of the bilayer; Takashina W., Kaneko M., Kaneto K. and MacDiarmid A. G., "The Electrochemical Actuator Using Electrochemically-Deposited Poly-aniline", *Synthetic Metals*, Vol. 71, pp. 2265-2266, (1995). Potentials of ±5V vs. Ag/$Ag^+$ were applied manually to the polymer bilayer for less than 4 seconds in an electrochemical cell containing 0.1M TEAP in acetonitrile and a stainless steel counter electrode and the bilayer angle recorded via video microscopy. FIG. 11 shows a Poly(QT) film in the actuation electrochemical cell test setup as seen under the microscope. The film is held by a pair of stainless steel tweezers which also act as a working electrode. The micrograph shows the oxidized state (contracted) and expanded state (expanded) overlaid on the same frame. FIG. 19 shows the calculated active strain performed by the poly(QT)/S-PHE bilayer. Notice that the poly(QT)/S-PHE samples used for this study were from the same batch as the ones characterized for passive mechanical properties as shown in the Exemplification section. Total strains as high as 21.4% strains were recorded during these experiments and the best result is presented in FIG. 19. Recoverable strain was 17.7% and maximum strain rate 15.4%/s.

However, while 94.1% of the high strain exhibited by the poly(QT)/S-PHE system is recoverable and repeatable for several samples, we were not able to observe such high strains for more than one cycle. It is speculated that the high potentials applied to the system caused electrochemical destruction of the polymer. Notice also these high strains are observed close to the charge injection point into the bilayer, bending the polymer at a small bending radius. We believe that low film conductivity prohibits contractions far away for the point of electrical contact.

While this result does not describe the ability of the system to perform work it serves the purpose of demonstrating that poly(QT)/S-PHE can be successfully electro-chemo-mechanically activated. In the next Section we will describe isometric experiments showing that the system can produce a force against a load.

Low Frequency Isometric Actuator Testing

To demonstrate that poly(QT)/S-PHE can produce a force against a load, isometric (constant length) electroactive mechanical testing at low frequencies was conducted using a custom built isometric electromechanical testing apparatus. Notice that no commercial tensile testing device exists that adequately combines mechanical testing with electrochemical excitation and monitoring.

In this apparatus a sample is held at constant length by a copper alligator clip clamped at each end of the polymer film and immersed horizontally into a 138 mm, 56 mm and 30 mm deep Nylon 6/6 bath filled with an electrochemical solution; Madden J. D., Cush R. A., Kanigan T. S. and Hunter I. W., "Fast Contracting Polypyrrole Actuators", *Synthetic Metals*, Vol. 113, pp. 185-192, (2000). These copper clips also serve as electrical contacts/charge injection points to the polymer. Note that while these clips are inserted into the electrochemical solution, their outside is electrically insulated by a Mylar tape. An aluminum rod connects the sample clamp to a linear translation stage powered by a stepper motor (Parker Automation CompuMotor (www.compumotor.com)). In series with the clamp is a load cell (Entran ELFS-T3E-10N load cell (www.entran.com) with Vishay 2311 Signal Conditioning Amplifier (www.vishay.com)), allowing one to record the applied force. The whole testing setup is under computer control via a PCI data acquisition board (Allios 16-bit A/D, D/A, 50 kHz sampling (bioinstrumenation.mit.edu)). A graphical user interface designed in Microsoft Visual Basic 6.0 (www.microsoft.com) allows the application of a certain displacement to the polymer sample, while acquiring passive and active stress generated by the material as well as electrochemical activity.

A sample of poly(QT)/S-PHE (length=12 mm, width=3.5 mm, thickness=100 μm) was attached between the two copper alligator clips and held at constant length under a 1 MPa initial load. The electrochemical solution for this study was a 0.05 M TBAP in distilled water. The electrochemical cell circuit was composed of the polymer sample and a stainless steel counter electrode. Potentials of the cell were controlled by an Amel potentiostat via a Calomel reference electrode. In order to assure rapid double-layer charging at the polymer working electrode while not reaching overoxidation a shaped potential following the methods of Madden et al. was programmed in the testing algorithm; Madden J. D., Cush R. A., Kanigan T. S., and Hunter I. W., "Fast Contracting Polypyrrole Actuators", *Synthetic Metals*, Vol. 113, pp. 185-192, (2000). Starting with a polymer equilibrium voltage of −0.5 V vs. Calomel, the samples were cycled at 0.27 mHz (1 hour period) during 8 hours between −1.5 V and +0.5 V vs. Calomel with allowable potential peaks of ±1 V vs. polymer equilibrium potential for the fast double-layer charging.

Figure 20:
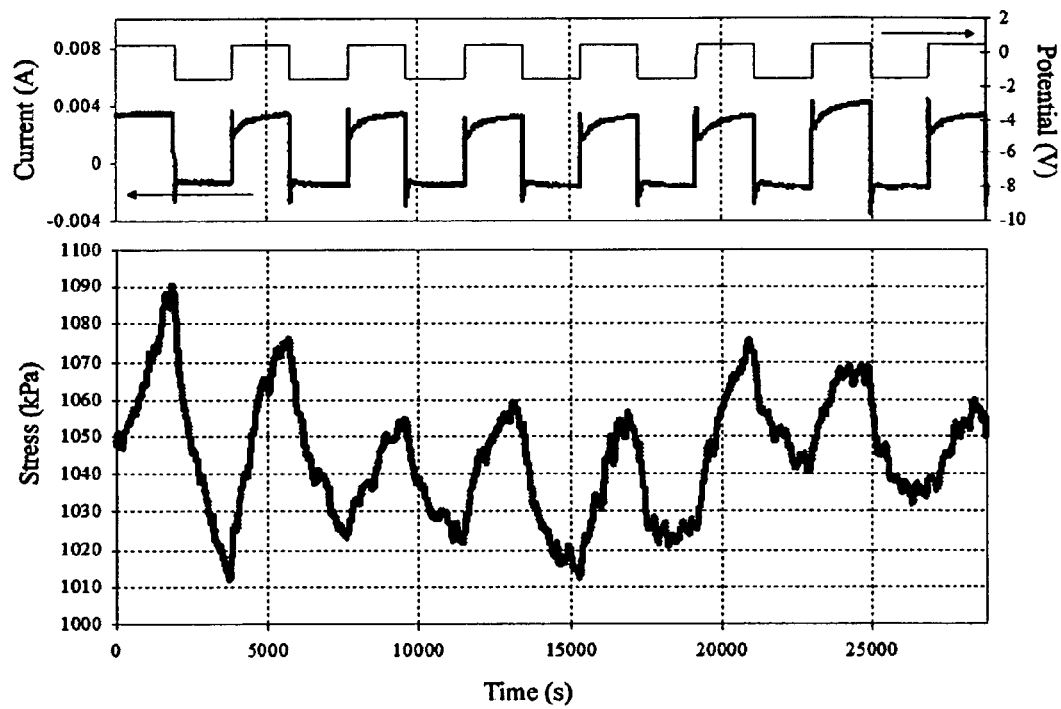
FIG. 20 depicts an isometric active mechanical test of poly(QT)/S-PHE composites.
Figure 21:
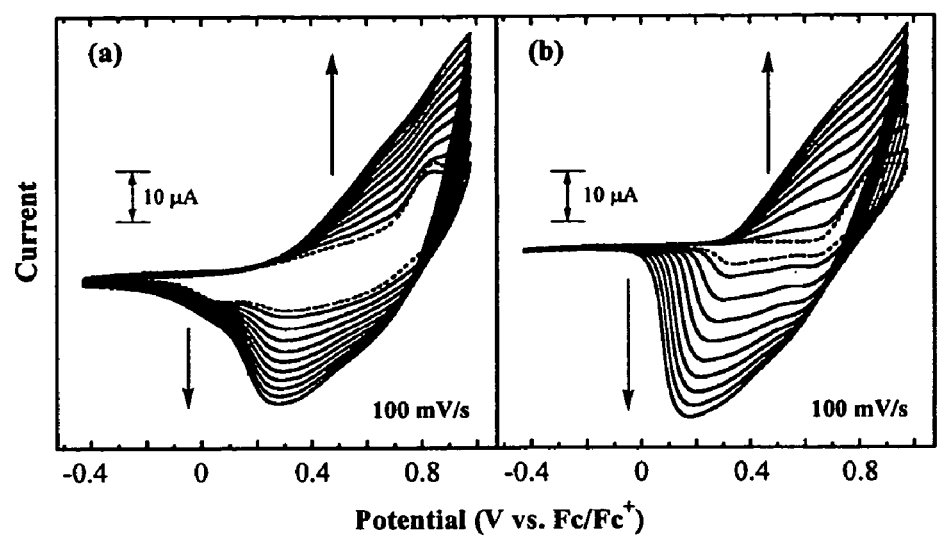
FIG. 21 depicts the electropolymerization of 1 mM (a) 2b and (b) 2a solutions in $CH_2Cl_2$ containing 0.1 M $(nBu)_4NPF_6$ as the supporting electrolyte. The dashed lines represent the first scans.

FIG. 20 shows a characteristic run under the conditions described above. Notice that peak stress generated attained 80 kPa and went as low as 35 kPa, showing that poly(QT)/S-PHE composites can produce a force against a load. It is speculated that low film conductivity prohibits stress generation far away from the points of electrical contact, thus only contracting the material close to its clamping edges. Table 3 below summarizes the properties of the poly(QT)/S-PHE actuator and compares it with mammalian skeletal muscle. While initial studies based on the beam-bending method showed strain in levels of 20%, these active material properties need to be measured in a linear configuration. To this effect a custom-made Electrochemical Dynamic Mechanical Analyzer (E-DMA) has been built in our laboratory that allows testing of samples under isotonic conditions; Anquetil P., Yu H.-h., Madden J. D., Madden P. G., Rinderknecht D., Swager T. and Hunter I., "Characterization of Novel Thiophene-Based Molecular Actuators", *Proceedings of the first biomimetics world congress*; Dec. 9-11, 2002, Albuquerque, N. Mex., USA; in press. Key parameters to be measured as a function of applied load with this instrument include maximum active strain, power to mass, stored energy density, efficiency and cycle life. In addition methods typically used in muscle physiology such as the work-loop method or force velocity curves can also be employed to allow comparison of our artificial actuator technology with nature's muscle under common conditions; Full R. J. and Meijer K., "Metrics of Natural Muscle Function", *Electroactive Polymers [EAP] Actuators as Artificial Muscles—Reality, Potential, and Challenges*, Bar Cohen Y. Editor, SPIE Press, pp. 67-83, (2001).

TABLE 3

Comparison of poly(QT)/S-PHE actuator with mammalian skeletal muscle; Hunter I. W. and Lafontaine S., "A Comparison of Muscle with Artificial Actuators", Technical Digest IEEE Solid State Sensors and Actuators Workshop, pp. 178-185, (1992).

| Property | Mammalian Skeletal Muscle | Achieved in Poly(QT) |
|---|---|---|
| Displacement (Strain) | 20% | 21.4% max. (bilayer) 17.7% recoverable (bilayer) |
| Active Stress (Load) | 350 kPa | 80 kPa @ 1 MPa (isometric) |
| Velocity (Strain Rate) | 100%/s | 15.4%/s (bilayer) |
| Power to mass | 50-100 W/kg | — |
| Efficiency | 30-35% | — |
| Stiffness (wet) | 0.3 to 80 MPa (contracted) | 0.48 GPa |
| Tensile Strength (wet) | 0.3 MPa | 1.4 to 11 MPa |
| Conductivity | — | 0.16 S/m |

Rationalization of the Actuation

Figure 24:
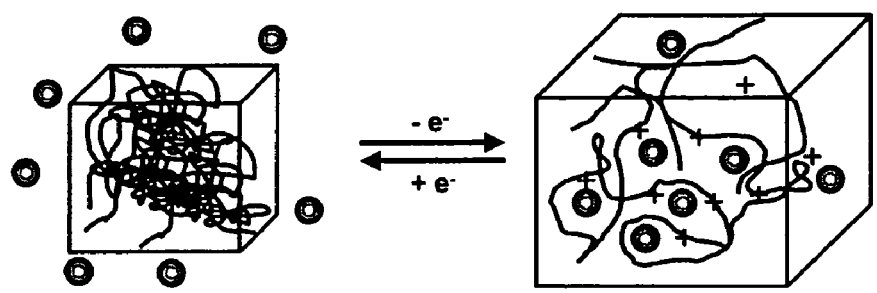
FIG. 24 depicts a plausible mechanism for actuation involving the contraction of the polymer film resulting from the expelling of cations.
Figure 24:
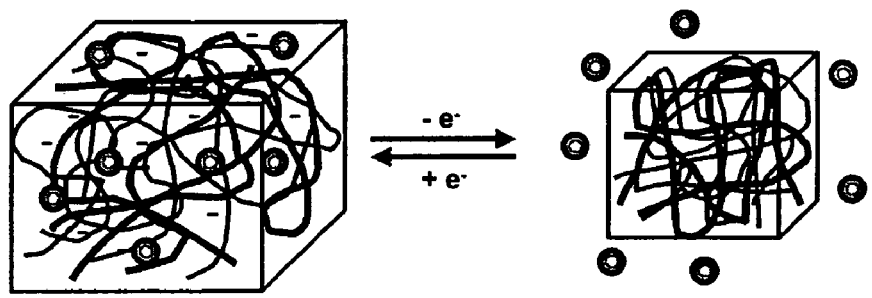

A plausible mechanism for this actuation involves the combination of two different effects. The first one is the contraction of the polymer film resulting from the expelling of cations as shown in FIG. 24. This is opposite to the swelling observed in traditional conducting polymer actuators. Otero, T. F.; Sansiñena, J. M. *Adv. Mater.* 1998, 10, 491. Due to the existence of polyanionic polymer, there are cations in the undoped films. Once the polymer is oxidized, there are extra positive charges in the polymer composite film so the extra cations are expelled to the solution, and the film contracts.

Figure 25:
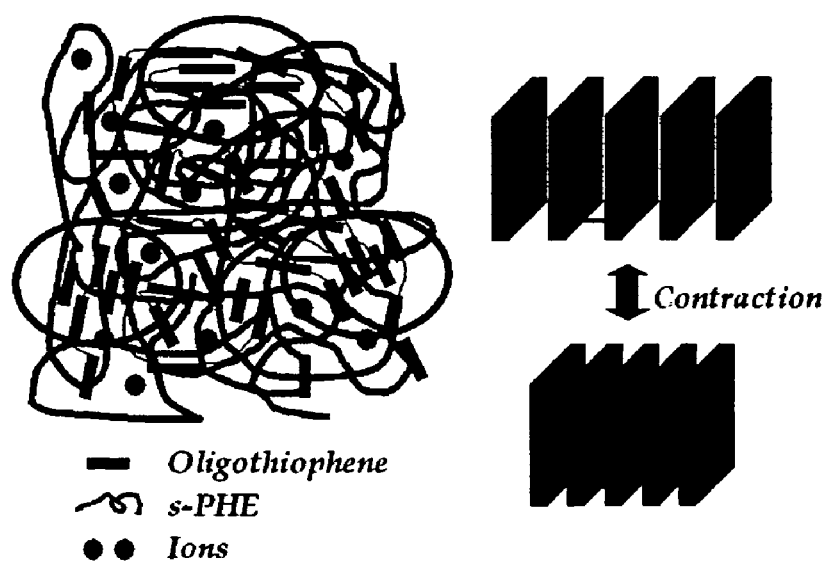
FIG. 25 depicts how localized regularity provides the proper geometries for the formation of π-aggregates to generate contractions.

Typical conducting polymers display strains with oxidation of ca. 3~10%. Hunter, I. W.; Lafontaine, S., *A Comparison of Muscle with Artificial Actuators in Technical Digest IEEE Solid State Sensors and Actuators Workshop,* 1992, 178. Since the present results show much greater strains, there should be other factors involved. Poly(QT) forms π-dimers upon the formation of radical cations. It has been proposed that portions of the deformation obtained upon the oxidation of Poly(QT)/S-PHE results from the formation of π-dimers. Miller, L. L.; Mann, K. R. *Acc. Chem. Res.* 1996, 29, 417; Brocks, G. *J. Chem. Phys.* 2000, 112, 5353. As shown in FIG. 25, localized regularity provides the proper geometries for the formation of π-aggregates to generate the contraction even though the polymer chain is not highly ordered throughout the whole film. In this new class of material, the effects stated above add up and result in larger deformations. From this postulation, increases of the anisotropicity should improve the actuator properties and lead to greater contractions.

Single Molecular Muscle Actuator Testing

While in situ conductivity measurements combined with electrochemical potential sweep technique provide indirect evidence for electrically triggered molecular conformational of the backbone of poly(calixBBT) and poly(QT), direct evidence of molecular actuation is difficult to obtain from bulk film actuation experiments. Ultimately, knowing the force and stress generated by a single conducting polymer molecular chain or by a thin polymer fiber will give tremendous insights into the nano and the macro scale mechanical behavior of polymer molecular actuators.

Such direct measurements of the mechanical properties of a single molecular chain or a thin polymer fiber could be achieved by using optical tweezers or single molecule AFM techniques. Omori R., Kobayashi T. and Suzuki A., "Observation of a Single Beam Gradient-Force Optical Trap for Dielectric Particles in Air", *Optical Letters,* Vol. 22, pp. 816-818, 1997; Zlatanbva J., Lindsay S. M. and Leuba S. H., "Single Molecule Force Spectroscopy in Biology using the Atomic Force Microscope", *Progress in Biophysics and Molecular Biology,* Vol. 74, pp. 37-61, 2000.

Figure 12:
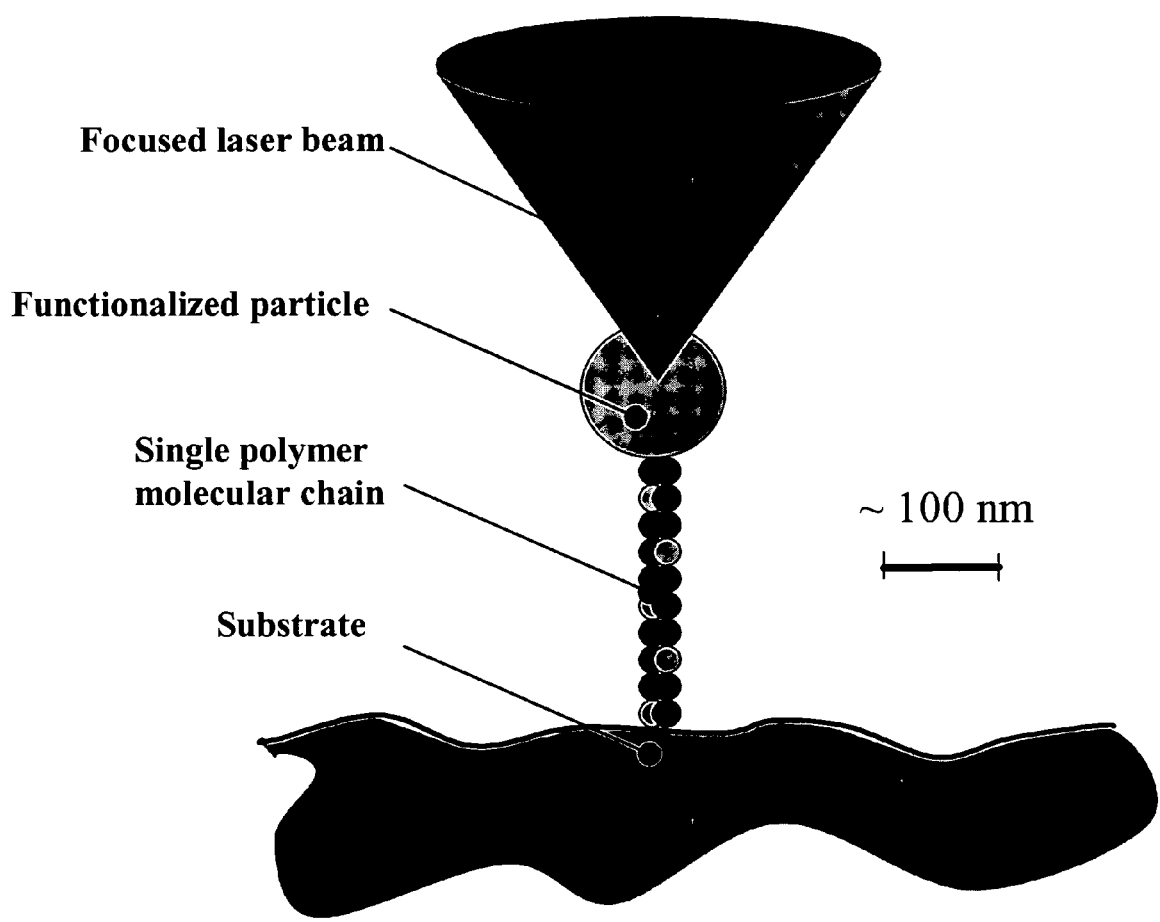
FIG. 12 depicts a single molecular muscle actuator testing apparatus using optical tweezers.

In the case of optical tweezers, a single polymer chain is attached to a functionalized sub-micrometer sized dielectric particle trapped in a 3 dimensional force field produced by a laser beam (FIG. 12). By modulating the intensity of the laser beam and using system identification, the stiffness of the optical trap is easily and accurately determined, thus making this instrument a sensitive force sensor ($0.2$ pN/Hz$^{1/2}$). Meiners J. C. and Quake S. R., "Direct Measurement of Hydrodynamic Cross Correlations between Two Particles in an External Potential", *Physical Review Letters,* Vol. 82, (10): pp. 2211-2213, 1999. In addition, mechanical forces over a large dynamic range ($1$-$10^4$ pN) and a microsecond time scale can be generated and monitored by using this instrument. D'Helon C., Dearden E. W. and Rubinszteindunlop H., "Measurement of the Optical Force and Trapping Range of a Single-Beam Gradient Optical Trap for Micron Sized Latex Spheres", *Journal of Modern Optics,* Vol. 41, (3): pp. 595-601, 1994. We estimated that a single molecule of calix[4]arene-quarterthiophene will produce at most 92 pN of average active force, making optical tweezers ideal to monitor contractions of poly(calixBBT).

Figure 13:
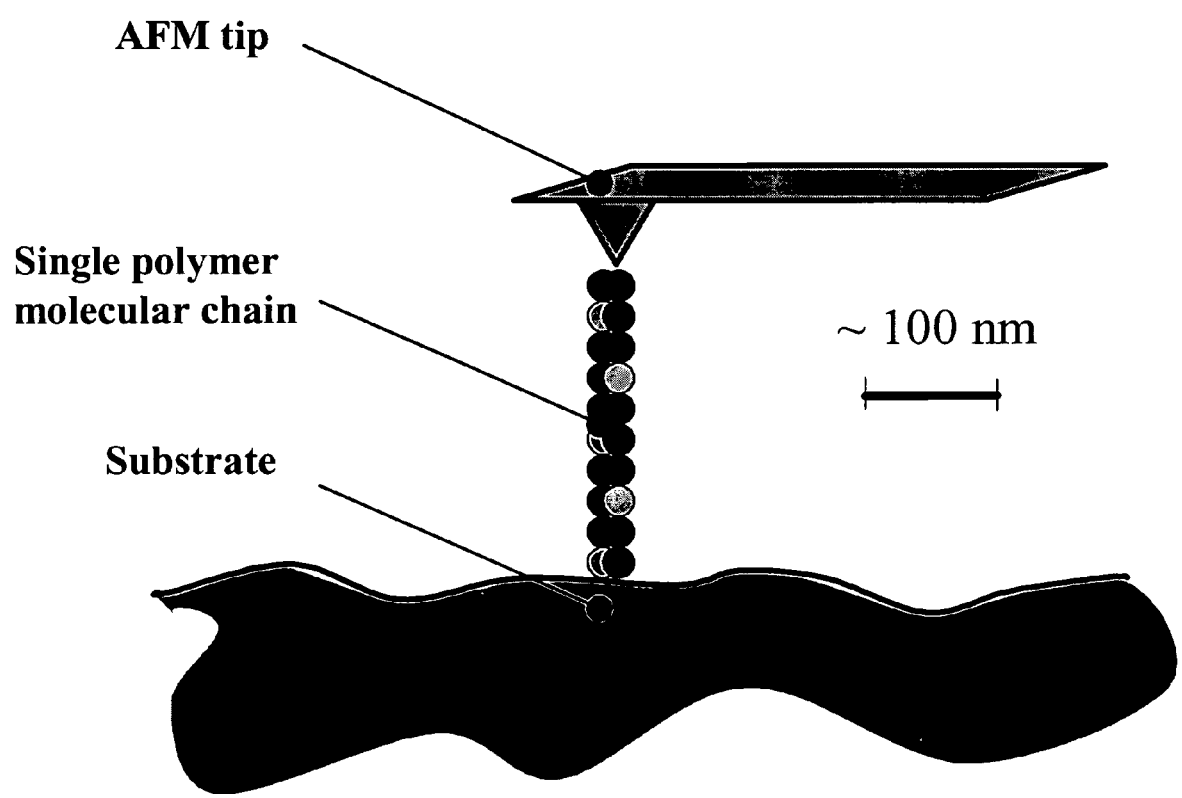
FIG. 13 depicts a single molecular muscle actuator testing apparatus using an AFM.

Similarly, an Atomic Force Microscope (AFM) can be used to carry single molecule actuator characterization (FIG. 13). A single conducting polymer molecule is attached both to a substrate and an AFM cantilever tip by means of functionalized receptor/ligand interactions such as biotin/streptavidin or covalent bonding resulting from thiol/gold interactions. Soft AFM cantilevers typically have a spring constant of 0.01 N/m. Considering that a single hinged dimer unit of poly(calixBBT) is expected to contract by 1.39 nm, the minimum force that is required to bend the cantilever to monitor a full contraction is 13.9 pN, which is below the average maximal force produced by a hinged dimer of poly(calixBBT). The key advantage of AFM techniques, however lies in the fact that rigid molecule/cantilever coupling (compared to soft coupling in optical tweezers) allows high frequency probing of the single polymer molecule. In other words the AFM can be considered a single molecule dynamic mechanical analyzer (M-DMA). Optical tweezers on the other hand are better suited to probe low force, low frequency regimes.

EXEMPLIFICATION

The invention now being generally described, it will be more readily understood by reference to the following examples, which are included merely for purposes of illustration of certain aspects and embodiments of the present invention, and are not intended to limit the invention.

Example 1

Reagents

Calix[4]arene-bis-thiophene and quarterthiophene (QT) monomers were designed and synthesized in our laboratory according to synthesis techniques presented elsewhere and their structure verified by NMR. Yu H.-h., Pullen A. E. and Swager T. M., "Toward New Actuating Devices: Synthesis and Electrochemical Studies of Poly(11,23-bis[2,2'-bis-thiophene]-5-yl)-26,28-dimethoxycalix[4]arene-25,27-diol)", *Polymer Science Material Engineering,* Vol. 83, (523): 2000. Tetraethylammonium hexafluorophosphate (TEAP), Tetrabutylammonium hexafluorophosphate (TBAP), dichloromethane and acetonitrile were obtained from Aldrich. Several Sulfated Poly(β-HydroxyEther) (S-PHE) polyanions candidates with different MR sulfation ratio were synthesized according to the method of Wernet. Wernet W. and Stoffer J., U.S. Pat. No. 5,061,401, 1991. Ag/Ag+ reference electrodes (BAS Bioanalytical Systems) were constructed from 0.1 M TEAP and 0.01 M AgN0$_3$ in acetonitrile and referenced versus the Fc/Fc+ redox couple (Aldrich).

Example 2

Preparation of Thienyl Substituted calix[4]arenes

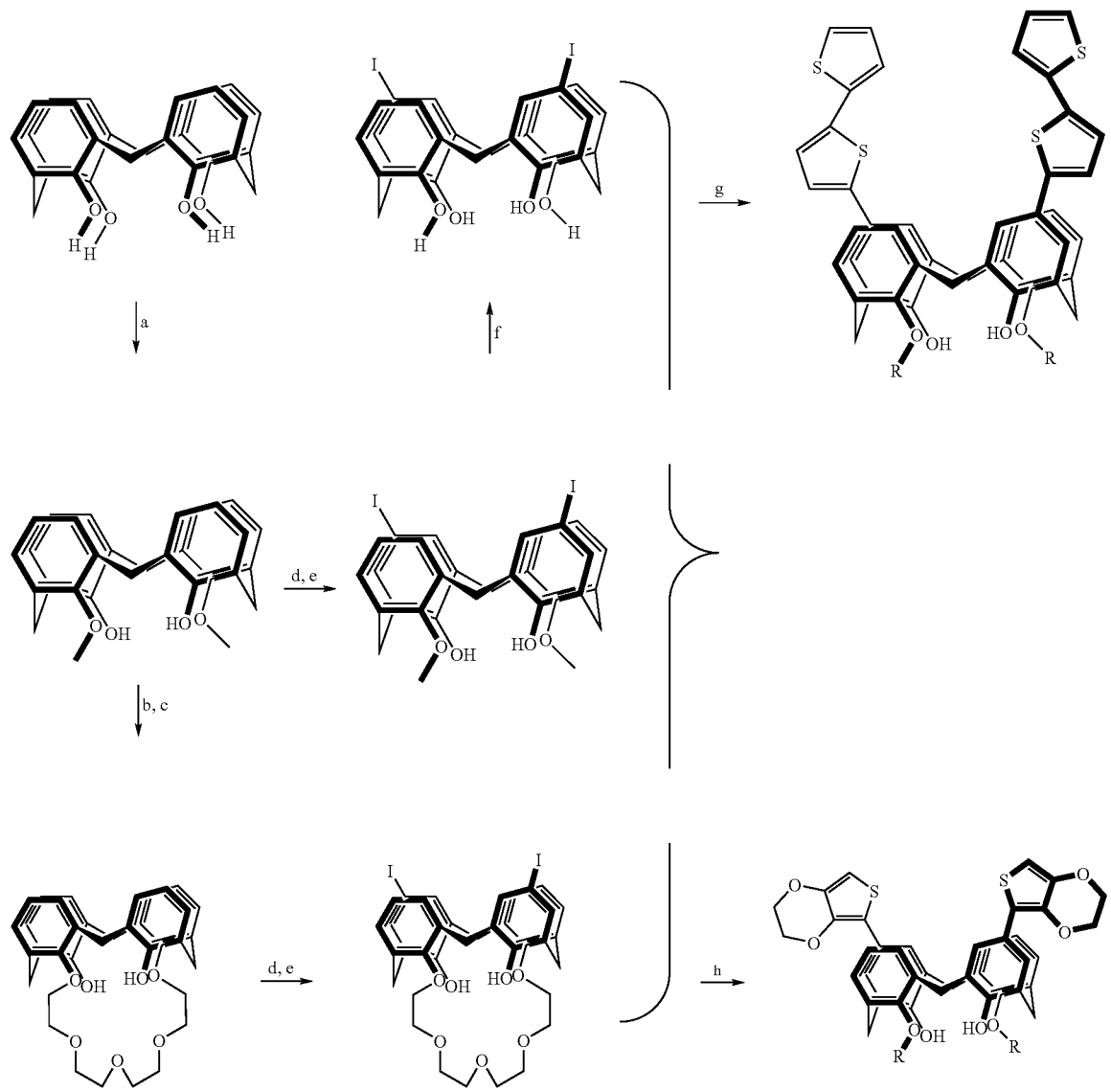

a). MeOTs, K$_2$CO$_3$, CH$_3$CN, 98%. b). TsOCH$_2$(CH$_2$OCH$_2$)$_3$CH$_2$OTs, Cs$_2$CO$_3$, CH$_3$CN, 70%.
c). TMSI, CHCl$_3$, 70%. d). Hg(CF$_3$COO)$_2$, CHCl$_3$. e). I$_2$, CH$_3$CN, 85% (dimethoxy), 89% (crown).
f). BBr$_3$, CH$_2$Cl$_2$, 72%. g). Pd$_2$dba$_3$, P(tBu)$_3$, LiCl, 5-tributylstannyl-2,2'-bithiophene, NMP.
h). Pd$_2$dba$_3$, P(tBu)$_3$, LiCl, 5-tributylstannyl-EDOT, NMP.
Methods a, d, and e were carried out according to procedures set forth in *Reinhoudt, D. N. et al., J. Org. Chem. 1990, 55, 5639*, incorporated in its entirety herein by reference.
Methods b and c were carried out according to procedures set forth in *Reinhoudt, D. N. et al., J. Am. Chem. Soc. 1995, 117, 2767*, incorporated in its entirety herein by reference.

Preparation of 26,28-dimethoxycalix[4]arene-25,27-diol (Method a)

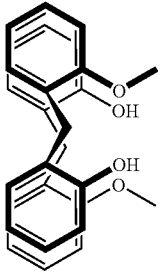

A suspension of calix[4]arene (17.0 g, 40 mmole), anhydrous potassium carbonate (6.08 g, 44 mmole), and methyl tosylate (14.9 g, 80 mmole) were refluxed in $CH_3CN$ (500 mL) overnight. After evaporation of the solvent, the mixture was taken up in $CH_2Cl_2$ and washed with 1 N HCl and brine. The organic layer was dried with $MgSO_4$ and the solvent was removed in vacuo to afford the product. It was recrystallized from $CH_3Cl/MeOH$ to yield white crystals (18.1 g, 98%). mp>300° C. dec. $^1H$ NMR (500 MHz, $CDCl_3$) δ: 7.76 (s, 2H), 7.08 (d, 4H, J=7.5 Hz), 6.88 (d, 4H, J=7.5 Hz), 6.73 (t, 2H, J=7.5 Hz), 6.68 (t, 2H, J=7.5 Hz), 4.31 (d, 4H, J=13.0 Hz), 3.99 (s, 6H), 3.41 (d, 4H, J=13.0 Hz). $^{13}C$ NMR (125 MHz, $CDCl_3$) δ: 153.2, 153.1, 132.9, 129.0, 128.5, 128.1, 125.3, 119.1, 63.7, 31.1.

Preparation of 25,27-dimethoxycalix[4]arenecrown-5 (Method b)

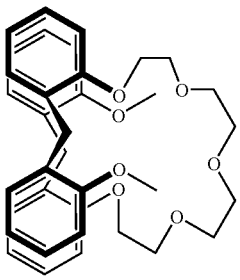

26,28-dimethoxycalix[4]arene-25,27-diol (9.05 g, 20.0 mmole) was dissolved in $CH_3CN$ (3 L) and added to an excess of $Cs_2CO_3$ (58.0 g, 180 mmole) and tetraethylene glycol di-p-toluenesulfonate (11.0 g, 22.0 mmole) under nitrogen. The reaction mixture was refluxed for two days. $CH_3CN$ was evaporated and the residue was dissolved in $CH_2Cl_2$. The organic layer was extracted with 1 N HCl and dried with $MgSO_4$. Solvent was then removed in vacuo and the product was re-precipitated by $CH_3Cl/MeOH$ to yield white powder (8.64 g, 70%). mp 223° C. (lit. 220~221° C.). $^1H$ NMR (500 MHz, $CDCl_3$) δ: 7.12 (d, 4H, J=7.0 Hz), 6.89 (t, 2H, J=7.0 Hz), 6.52 (d, 4H, J=7.5 Hz), 6.42 (t, 2H, J=7.5 Hz), 4.42 (d, 4H, J=12.5 Hz), 4.13 (s, 6H), 3.99 (bd, 4H), 3.92 (bd, 4H), 3.75 (bt, 4H), 3.56 (bd, 4H), 3.19 (d, 4H, J=12.5 Hz). $^{13}C$ NMR (125 MHz, $CDCl_3$) δ: 159.2, 155.3, 136.7, 133.5, 128.3, 127.6, 122.5, 122.4, 72.9, 71.5, 71.0, 70.8, 61.2, 31.1.

Preparation of 25,27-dihydroxycalix[4]arenecrown-5 (Method c)

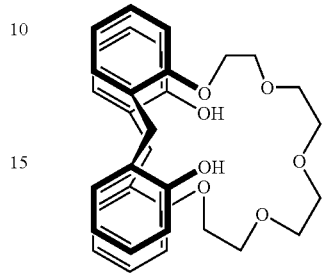

To a solution of 25,27-dimethoxy-calix[4]arenecrown-5 (6.1 g, 10 mmole) in anhydrous $CH_3Cl$ (500 mL), iodotrimethylsilane (3.0 mL, 21 mmole) was added under argon. The reaction mixture was refluxed for 5 hrs, then quenched with 1 N HCl and transferred to a separatory funnel. The organic phase was separated, washed with a saturated aqueous solution of $Na_2S_2O_3$ and with water. Solvent was removed under reduced pressure and the product crystallized from MeOH to yield white powder (4.07 g, 70%). mp 273~274° C. (lit. 279~281° C.). $^1H$ NMR (500 MHz, $CDCl_3$) δ: 7.76 (s, 2H), 7.07 (d, 4H, J=7.5 Hz), 6.87 (d, 2H, J=7.0 Hz), 6.72 (t, 2H, J=7.5 Hz), 6.67 (t, 2H, J=7.5 Hz), 4.43 (d, 4H, J=13.0 Hz), 4.10 (s, 4H), 3.96 (t, 4H, J=5.5 Hz), 3.86 (t, 4H, J=5.5 Hz), 3.37 (d, 4H, J=13.0 Hz). $^{13}C$ NMR (125 MHz, $CDCl_3$) δ: 153.4, 151.9, 133.1, 128.9, 128.4, 128.0, 125.3, 118.8, 76.8, 71.1, 71.0, 70.1, 31.0.

Preparation of Dimercury Adduct of 26,28-dimethoxycalix[4]arene-25,27-diol (Method d)

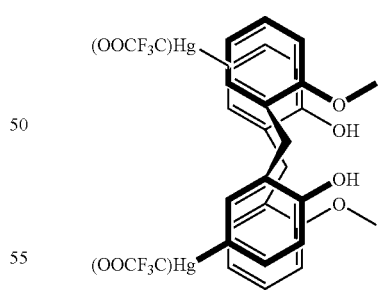

A mixture of 26,28-dimethoxycalix[4]arene-25,27-diol (4.52 g, 10.0 mmole) and mercury trifluoroacatate (8.75 g, 20.5 mmole) in $CH_3Cl$ (250 mL) was stirred overnight to afford a heterogeneous mixture. Evaporation of the solvent gave a light gray solid and was submitted to the next step without further purification. $^1H$ NMR (300 MHz, $d^6$-acetone) δ: 7.56 (s, 2H), 7.16 (s, 4H), 6.88 (d, 4H, J=7.5 Hz), 6.81 (t, 2H, J=7.5 Hz), 4.22 (d, 4H, J=13.0 Hz), 3.82 (s, 6H), 3.44 (d, 4H, J=13.0 Hz). $^{19}F$ NMR (300 MHz, $d^6$-acetone) δ: 104.0.

Preparation of 11,23-diiodo-26,28-dimethoxycalix[4]arene-25,27-diol (Method e)

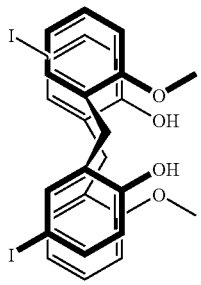

A solution of the dimercury adduct (1.08 g, 1 mmole) from the previous step and iodine (0.56 g, 2.2 mmole) in CH$_3$CN (100 mL) was stirred at room temperature for 1 hr. CH$_2$Cl$_2$ (100 mL) was then added to the reaction mixture and the mixture passed through a short column packing with silica gel. Solvent was then removed without quenching the excess iodine. The solid was then dissolved in CH$_2$Cl$_2$ and decolorized by activated carbon. Repeat it several times until the solution is colorless and the compound was re-precipitated by using CH$_3$Cl/MeOH to yield pure white powder (0.61 g, 85%). mp>300° C. (sublime). $^1$H NMR (500 MHz, CDCl$_3$) δ: 7.86 (s, 2H), 7.37 (s, 4H), 6.88 (d, 4H, J=7.5 Hz), 6.79 (t, 2H, J=7.5 Hz), 4.22 (d, 4H, J=13.0 Hz), 3.96 (s, 6H), 3.34 (d, 4H, J=13.0 Hz). $^{13}$C NMR (125 MHz, CDCl$_3$) δ: 153.0, 153.0, 136.8, 132.1, 130.6, 129.3, 125.5, 80.7, 63.8, 30.7. HR-MS (FAB): calcd. for C$_{30}$H$_{26}$O$_4$I$_2$ 703.9920 [M$^+$]. Found 703.9937.

Preparation of diiodocalix[4]arene (Method f)

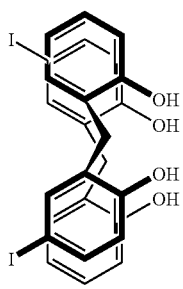

To a solution of dimethoxydiiodocalix[4]arene (704 mg, 1 mmole) in CH$_2$Cl$_2$ (20 mL) was added BBr$_3$ (1.89 mL, 20 mmole) with continued stirring under Ar at 0° C. The reaction mixture was then warmed up to room temperature and stirred for over night. The reaction mixture was poured on ice and collect the organic layer. The organic layer was dried by MgSO$_4$ and the solvent was removed in vacuo. Recrystallization from CHCl$_3$/MeOH yield white solids (490 mg, 72%).

Preparation of bis-((bis-thiophene)-5-yl)dimethoxycalix[4]arene (Method g)

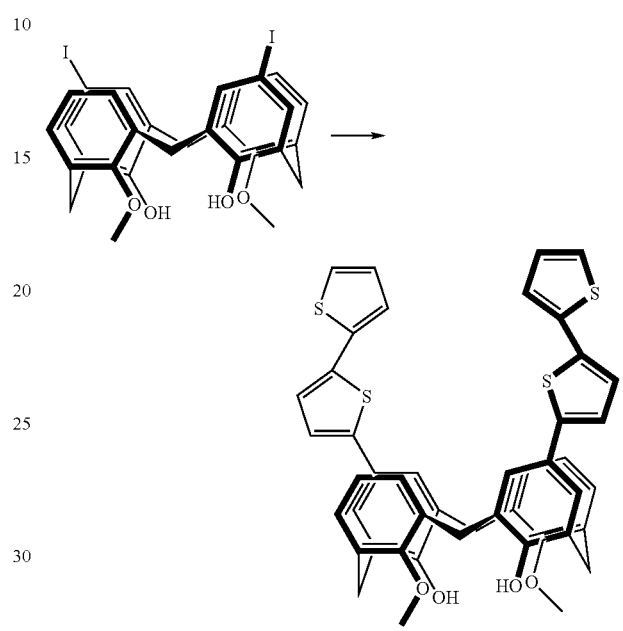

In an airfree tube, dimethoxydiiodocalix[4]arene (70 mg, 0.1 mmole), Pd$_2$ dba$_3$ (3 mg, 0.003 mmole), P(tBu)$_3$ (0.0033 mmole), LiCl (17 mg, 0.4 mmole), tributylstanny-2,2'-bis-thiophene (227 mg, 0.5 mmole), and NMP (1 mL) was mixed together under Ar. The reaction mixture was heated to 50° C. and stirred for 2 days. The mixture was cooled down to room temperature and passed though a short column with CH$_2$Cl$_2$. The solvent was removed the in vacuo and dark brown liquid was obtained. Addition of hexane generate precipitate and the precipitate was collected by filtration. The crude product was further purified by column chromatography (hexane/dichloromethane 1/1) to yield light yellow crystal (70 mg, 84%).

Preparation of crown-bis-((bis-thiophene)-5-yl)calix[4]arene (method g)

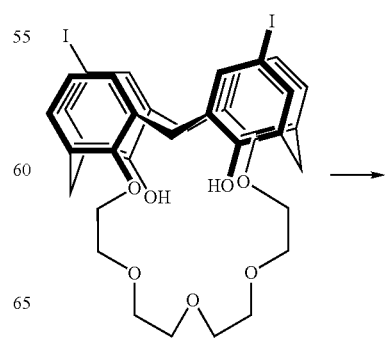

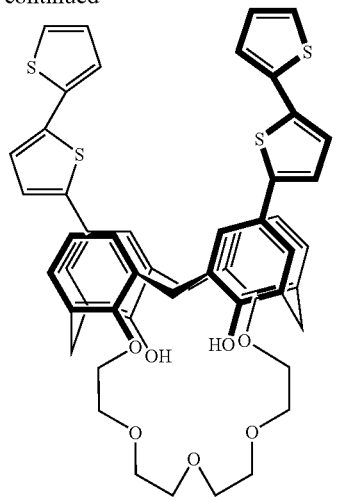

In an airfree tube, crowndiiodocalix[4]arene (168 mg, 0.2 mmole), Pd$_2$dba$_3$ (6 mg, 0.003 mmole), P(tBu)$_3$ (0.0066 mmole), LiCl (33 mg, 0.8 mmole), tributylstanny-2,2'-bis-thiophene (455 mg, 1 mmole), and NMP (2 mL) was mixed together under Ar. The reaction mixture was heated to 50° C. and stirred for 2 days. The mixture was cooled down to room temperature and passed though a short column with CH$_2$Cl$_2$ and CH$_2$Cl$_2$/ethyl acetate (1/1). The solvent was removed the in vacuo and dark brown liquid was obtained. Addition of MeOH generate precipitate and the precipitate was collected by filtration. The crude product was further purified by column chromatography (dichloromethane, then dichloromethane/ethyl acetate 1/1) to yield light yellow crystal (160 mg, 88%).

Preparation of bis-([3,4-ethylenedioxylthiophene]-5-yl)dimethoxycalix[4]arene (Method h)

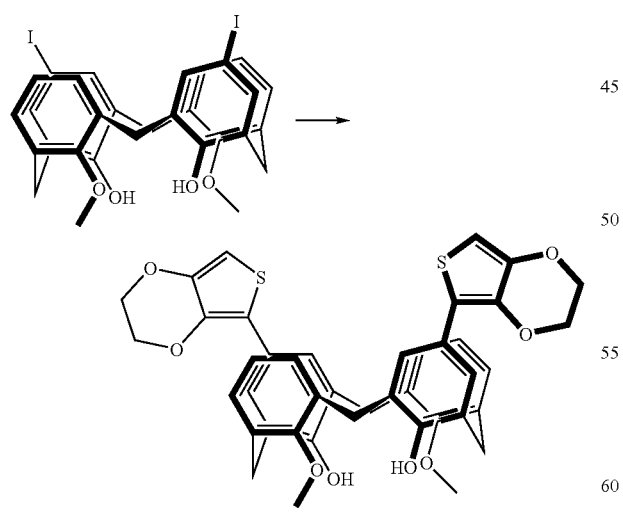

In an airfree tube, dimethoxydiiodocalix[4]arene (351 mg, 0.5 mmole), Pd$_2$dba$_3$ (15 mg, 0.015 mmole), P(tBu)$_3$ (0.017 mmole), LiCl (82 mg, 2 mmole), tributylstanny-3,4-ethylenedioxythiophene (1.07 g, 2.5 mmole), and NMP (5 mL) was mixed together under Ar. The reaction mixture was heated to 50° C. and stirred for 2 days. The mixture was cooled down to room temperature and passed though a short column with CH$_2$Cl$_2$. The solvent was removed the in vacuo. The crude product was further purified by column chromatography (dichloromethane) to yield light yellow crystal (196 mg, 54%).

Example 3

Preparation of bis-(bis-thiophene-5-yl)dipropoxycalix[4]arene

Scheme 14.

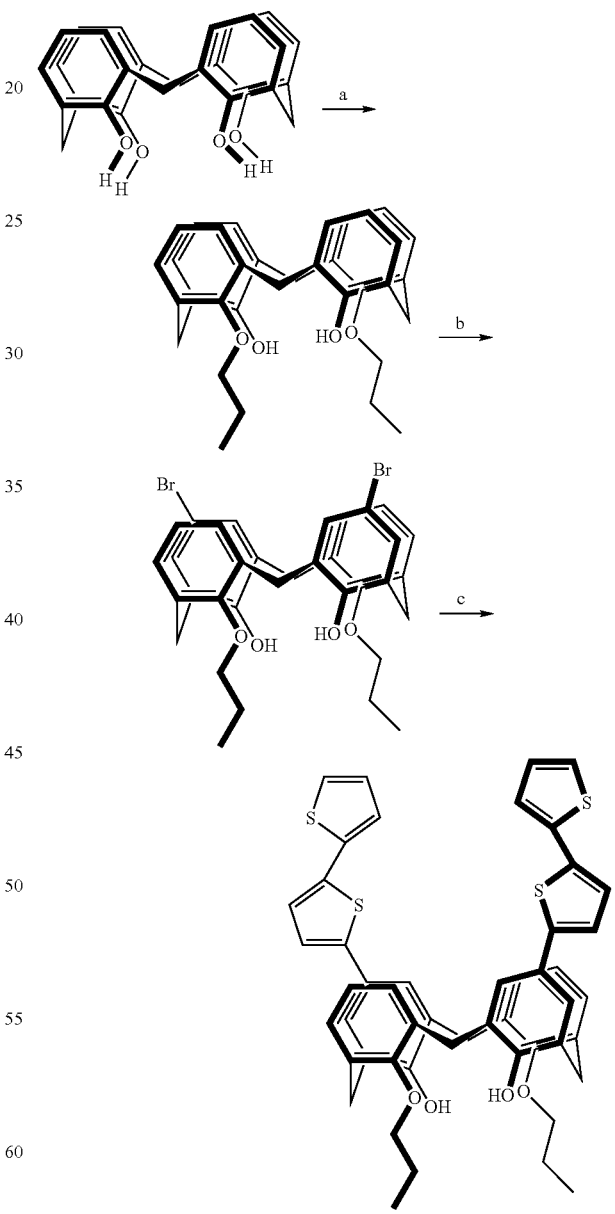

a). CH$_3$CH$_2$CH$_2$I, K$_2$CO$_3$, CH$_3$CN, 70%. b). Br$_2$, CHCl$_3$, 96%.
c). Pd$_2$dba$_3$, P(tBu)$_3$, KF, 5-tributylstannyl-2,2'-bithilphene, NMP, 64%.
Methods a and b were carried out according to procedures set forth in *Reinhoudt D. N. et al. J. Org. Chem. 1990, 55, 5639,* incorporated in its entirety herein by reference.

Preparation of bis-(bis-thiophene-5-yl)dipropoxycalix[4]arene (Method c)

In an airfree tube, dipropyldibromocalix[4]arene (665 mg, 1 mmole), $Pd_2 dba_3$ (30 mg, 0.03 mmole), $P(tBu)_3$ (0.033 mmole), KF (232 mg, 4 mmole), tributylstanny-2,2'-bis-thiophene (2.28 g, 5 mmole), and NMP (10 mL) was mixed together under Ar. The reaction mixture was heated to 50° C. and stirred for 2 days. The mixture was cooled down to room temperature and passed though a short column with $CH_2Cl_2$. The solvent was removed the in vacuo and dark brown liquid was obtained. Addition of hexane generate precipitate and the precipitate was collected by filtration. The crude product was further purified by column chromatography (hexane/dichloromethane 4/1, 2/1, then 1/1) to yield light yellow crystal (534 mg, 64%).

Example 4

Preparation of 2,7-diiodothianthrene

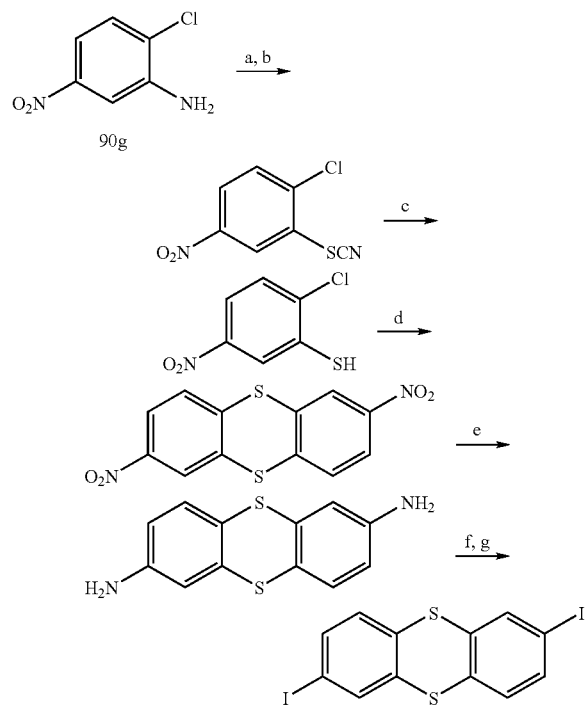

Scheme 15.

a) $NaNO_2$, HCl. b) CuSCN, KSCN, 42% (over 2 steps). c) $NaBH_4$, $H_3O^+$.
d) $Et_3N$, DMF, 60% (over 2 steps). e) $NH_2NH_2$, graphite, EtOH.
f) $NaNO_2$, HCl. g) KI, 29% (over 3 steps).
Steps a, b, c, and d were carried out according to procedures set forth in Still, I. W. et al. *Synth. Commun.*, 1983, 13, 1181, incorporated herein in its entirety by reference.

2-Chloro-5-nitrophenyl thiocyanate (Method a,b)

2-Chloro-5-nitroaniline (90.0 g, 522 mmole) and 6 N HCl (600 mL) were stirred at room temperature until a homogeneous paste was obtained. Sodium nitrite (40.5 g, 585 mmole) in water (60 mL) was added drop by drop to this solution at 0° C. under inert atmosphere. After the addition was complete, the mixture was stirred for an additional hour. This was added in portions to a solution of KSCN (72.0 g, 738 mmole) and CuSCN (63.0 g, 522 mmole) in water (200 mL) at room temperature over a period of 2 hrs. On adding the diazonium salt to the thiocyanates, the solution turned from yellow to black with foaming. The mixture was stirred overnight and then filtered. The precipitate washed with $CH_2Cl_2$ three times. The filtrate was also washed with $CH_2Cl_2$. The combined organic extracts were washed with water and dried with $MgSO_4$. The solvent was then removed and the crude mixture was further recrystallized in hexane to yield light yellow powder (44.7 g, 42%). mp 103° C. (lit. 102° C.). $^1$H NMR (250 MHz, $CDCl_3$) δ: 8.32 (d, 1H, J=2.5 Hz), 8.10 (dd, 1H, J=8.8, 2.5 Hz), 7.66 (d, 1H, J=8.8 Hz). $^{13}$C NMR (62.5 MHz, $CDCl_3$) δ: 147.0, 138.7, 131.1, 124.6, 124.0, 107.4. HR-MS (EI): calcd. for $C_7H_3ClN_2O_2S$ 213.9600 [M$^+$]. Found 213.9598.

2-Chloro-5-nitrobenzenethiol (Method c)

To a solution of 2-chloro-5-nitrophenyl thiocyanate (4.38 g, 20.4 mmole) in dry DMF (70 mL) under inert atmosphere, excess sodium borohydride (1.1 g) was added. The mixture was stirred for half hour and poured over crushed ice. The mixture was acidified with 1 N HCl and left at 0° C. for 1 hr. The precipitate were collected by filtration and redissolved in $CH_2Cl_2$. The organic layer was further washed with water and dried with $MgSO_4$. The solvent was removed in vacuo to afford yellow crystals. The product was used in the next step without further purification. $^1$H NMR (300 MHz, d$^6$-acetone) δ: 8.42 (d, 1H, J=2.7 Hz), 7.98 (dd, 1H, J=8.7, 2.7 Hz), 7.68 (d, 1H, J=8.7 Hz), 5.26 (bs, 1H). $^{13}$C NMR (75 MHz, d$^6$-acetone) δ: 147.5, 137.9, 136.4, 131.2, 124.8, 121.7. HR-MS (EI): calcd. for $C_6H_4ClNO_2S$ 189.9646 [M$^+$]. Found 189.9646.

2,7-Dinitrothianthrene (Method d)

To a solution of 2-chloro-5-nitrobenzenethiol previously obtained in DMF (250 mL), triethylamine (3 mL) was added. The reaction mixture turned violet and stirred under inert atmosphere overnight. The reaction mixture was then turned into red. The reaction mixture was then poured into icy water and the solution was neutralized with 1 N HCl. Precipitate was formed and then collected by filtration. It was then dissolved in $CH_2Cl_2$ and washed with water until the aqueous layer was colorless. The organic layer was dried with $MgSO_4$ and the solvent was removed in vacuo. The crude mixture was recrystallized from ethyl acetate to yield yellow crystals (1.87 g, 60% over two steps). mp 267-268° C. (lit. 263~264° C.). $^1$H NMR (300 MHz, $CDCl_3$) δ: 8.31 (d, 2H, J=2.1 Hz), 8.14 (dd, 2H, J=8.4, 2.1 Hz), 7.62 (d, 2H, J=8.4 Hz). $^{13}$C NMR (75 MHz, $CDCl_3$) δ: 147.8, 142.3, 135.4, 129.1, 123.5, 123.3. HR-MS (ESI): calcd. for $C_{12}H_6N_2O_4S_2$+Na 328.9661 [(M+Na)$^+$]. Found 328.9670.

2,7-diaminothianthrene (Method e)

To a solution of 2,7-dinitrothianthrene (550 mg, 1.8 mmole) in 100 mL of ethanol was added graphite (1.72 g, 144 mmole) and hydrazine (0.56 mL, 18 mmole) with continued stirring and the mixture was refluxed for over night. The reaction mixture was cooled to room temperature and filter through a short column of celite 545. The solvent was then removed and the resulting white solid was dried in vacuo. It was then recrystallized from $CHCl_3$ or used without further purification. mp 185~186° C. $^1$H NMR (300 MHz, $CDCl_3$) δ: 7.15 (d, 2H, J=8.1 Hz), 6.81 (d, 2H, J=2.7 Hz), 6.52 (dd, 2H, J=8.1, 2.7 Hz), 3.68 (bs, 4H). $^{13}$C NMR (75 MHz, d$^6$-acetone) δ: 149.5, 139.1, 130.0, 121.9, 114.8, 114.6. HR-MS (ESI): calcd. for $C_{12}H_{10}N_2S_2$+Na 269.0178 [(M+Na)$^+$]. Found 269.0176.

2,7-diiodothianthrene (Methods f and g)

To a solution of 2,7-diaminothianthrene (716 mg, 2.9 mmole) in 6 mL HCl/water (1/1) was added sodium nitrite (455 mg, 6.6 mmole) in 3 mL water dropwise with continued stirring at 0° C. The reaction mixture was stirred at 0° C. for an additional hour after all the sodium nitrite was added. This solution was then transferred to a solution of potassium iodide (10.95 g, 66 mmole) in water (15 mL). The reaction mixture was stirred at room temperature for over night. The reaction mixture was then filtered, and the precipitate was dissolved in dichloromethane. The filtrate was also extracted by dichloromethane and the organic layer was combined. The organic layer was further washed by aqueous NaOH, NaHCO$_3$, and water, dried by MgSO$_4$ and the solvent was removed in vacao. The brownish powder was sublimed to afford light yellow powder (29% over three steps). mp 169~170° C. $^1$H NMR (500 MHz, CDCl$_3$) δ: 7.79 (d, 2H, J=2.0 Hz), 7.54 (dd, 2H, J=8.0, 2.0 Hz), 7.17 (d, 2H, J=8.0 Hz). $^{13}$C NMR (125 MHz, CDCl$_3$) δ: 137.5, 137.0, 136.7, 134.9, 130.0, 92.6. FT-IR (KBr) v/cm$^{-1}$: 3048, 2923, 2850, 1881, 1736, 1548, 1434, 1358, 1246, 1106, 1045, 874, 803, 773, 528, 450. HR-MS (EI): calcd. for $C_{12}H_6I_2S_2$ 467.7995 [M$^+$]. Found 467.8010.

Example 5

Preparation of 2,3-dibromothianthrene

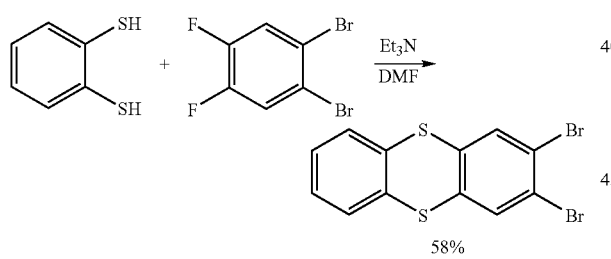

Scheme 16.

To a solution of triethylamine (0.1 mL) in 10 mL DMF, 1,2-benzenedithiol (272 mg, 1 mmole) in 1 mL DMF and 1,2-difluoro-4,5-dibromobenzene (171 mg, 1.2 mmole) in 1 mL DMF was slowly added separately at the same time with continued stirring and under Ar. The reaction mixture was heated at 80° C. for over night. The solution was then turned dark yellow. The reaction mixture was cooled and poured into dichloromethane (50 mL). The organic layer was further washed with 1N HCl and water (twice), dried by MgSO$_4$, and the solvent was removed in vacao. The crude product was further purified by column chromatography (hexane/dichloromethane 6/1) to yield white solids (217 mg, 58%). mp 160~161° C. $^1$H NMR (300 MHz, CDCl$_3$) δ: 7.67 (s, 2H), 7.40 (dd (AA'XX'), 2H, $J_{AX}$=5.7 Hz and $J_{AX'}$=3.3 Hz), 7.24 (dd (AA'XX'), 2H, $J_{AX}$=3.3 Hz and $J_{AX'}$=2.7 Hz). $^{13}$C NMR (75 MHz, CDCl$_3$) δ: 136.4, 134.4, 132.3, 128.8, 128.0, 123.6. FT-IR (KBr)v/cm$^{-1}$: 3059, 1451, 1429, 1304, 1106, 1056, 879, 826, 746, 662, 576, 473, 441. HR-MS (EI): calcd. for $Cl_2H_6Br_2S_2$ 371.8272 [M$^+$]. Found 371.8283.

Example 6

Preparation of 19-dibromothianthrene

Scheme 17. 1,9-dibromothianthrene was synthesized according to procedures set forth in Lovell, J.M. et al. Tetrahedron, 1996, 52, 4745, incorporated herein its entirety by reference.

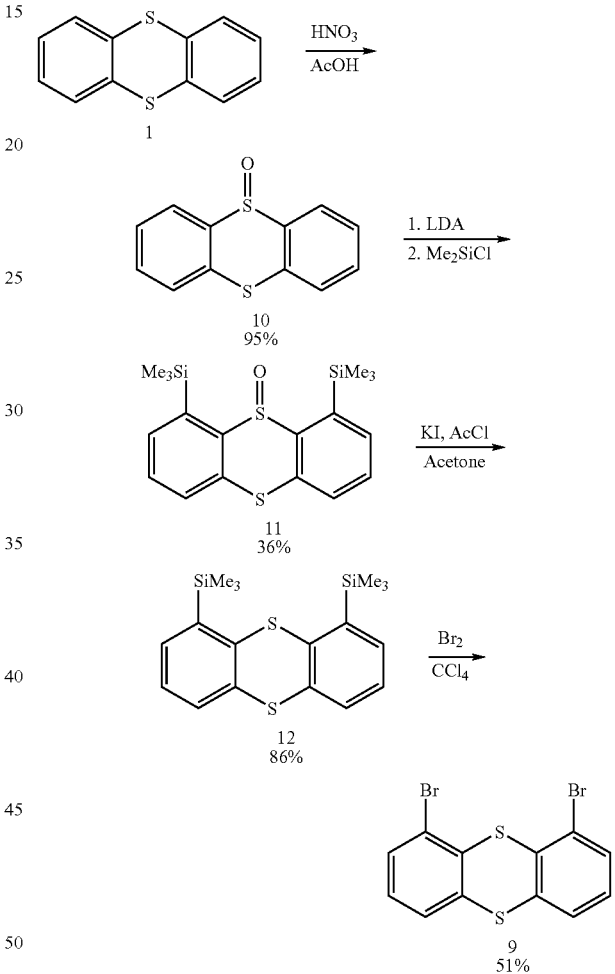

Thianthrere-5-oxide (10)

To a solution of thianthrene (10.0 g 46.2 mmole) in glacial acetic acid (160 mL), HNO$_3$ (5.8 mL) in water (12.6 mL) was added through the top of the condenser. The color immediately changed to pink and eventually yellow. The reaction mixture was refluxed for an additional half hour and then poured into ice water (600 mL). White precipitate was formed and collected by filtration. The precipitate was redissolved in CH$_2$Cl$_2$, washed with water, and dried with MgSO$_4$. The solvent was removed in vacuo to yield white powder (10.7 g, 95%).

4,6-Bis(trimethylsilyl)thianthrene-5-oxide (11)

To a stirred solution of thianthrene-5-oxide (9.40 g, 40.5 mmole) in THF (200 mL), lithium diisopropylamide (prepared by the addition of n-butyl lithium (1.6 M, 64.0 mL, 101 mmole) to a solution of diisopropylamine (14.2 mL, 101 mmole) at −78° C.) in THF (100 mL) was added in portion at −78° C. under inert atmosphere. The reaction mixture was stirred at this temperature for 4 hrs and became dark green. Chlorotrimethylsilane (12.8 mL, 101 mmole) was then added to the cold solution. The solution was then turned into yellowish brown, warmed back to room temperature, and stirred overnight. Water (100 mL) was then added to the reaction mixture to quench the excess base. The solvent was removed and the crude mixture was redissolved in ether. The aqueous layer was extracted by ether and the organic layers were combined. It was further washed by water, brine, and dried with $MgSO_4$. The solvent was then removed in vacuo. The crude product was further purified by column chromatography (hexane/$CH_2Cl_2$ 4/1, and then 2/1) to afford light yellow crystals (5.50 g, 36%). mp 210~211° C. (lit. 213~214° C.). $^1$H NMR (300 MHz, $CDCl_3$) δ: 7.69 (dd, 2H, J=7.8, 1.5 Hz), 7.60 (dd, 2H, J=7.8, 1.5 Hz), 7.41 (dd, 2H, J=7.8, 7.8 Hz), 0.57 (s, 18H). $^{13}$C NMR (125 MHz, $CDCl_3$) δ: 144.1, 140.9, 134.0, 133.8, 129.9, 129.3, 1.55. HR-MS (ESI): calcd. for $C_{18}H_{24}OS_2Si_2$+Na 399.0699 [(M+Na)$^+$]. Found 399.0690.

1,9-Bis(trimethylsilyl)thianthrene (12)

To a stirred solution of 4,6-bis(trimethylsilyl)thianthrene-5-oxide (1.67 g, 4.44 mmole) and acetyl chloride (3.80 mL, 53.2 mmole) in acetone (75 mL), KI (17.00 g, 102.0 mmole) was added. After stirring at room temperature for 2 hrs, solvent was removed in vacuo and the residue was extracted with ether. The extract washed with water and 1 M $Na_2S_2O_3$ solution, dried with $MgSO_4$, and the solvent was removed in vacuo to afford yellow oil (1.50 g, 86%). The product was eventually crystallized and used without further purification. mp 90~91° C. (lit. 95~96° C.). $^1$H NMR (300 MHz, $CDCl_3$) δ: 7.47 (dd, 2H, J=7.5, 1.5 Hz), 7.42 (dd, 2H, J=7.5, 1.2 Hz), 7.20 (dd, 2H, J=7.5, 7.5 Hz), 0.46 (s, 18H). $^{13}$C NMR (125 MHz, $CDCl_3$) δ: 142.4, 139.8, 134.3, 134.0, 129.6, 126.8, 0.52. HR-MS (ESI): calcd. for $C_{18}H_{24}S_2Si_2$+Na 383.0750 [(M+Na)$^+$]. Found 383.0747.

1,9-Dibromothianthrene (9)

To a solution of 1,9-bis(trimethylsilyl)thianthrene (700 mg, 1.94 mmole) in $CCl_4$ (15 mL), bromine (1.0 mL, 19.5 mmole) was added. The resulting red solution was stirred at room temperature for 3 hrs. Bromine was quenched by addition saturated $Na_2S_2O_3$ aqueous solution. The organic layer washed by water and dried with $MgSO_4$. The solvent was removed in vacuo. The crude product was recrystallized from toluene/hexane to yield brownish crystals (370.2 mg, 51%). mp 176~178° C. (lit. 181~183° C.). $^1$H NMR (500 MHz, $CDCl_3$) δ: 7.54 (dd, 2H, J=8.0, 1.0 Hz), 7.42 (dd, 2H, J=8.0, 1.0 Hz), 7.11 (dd, 2H, J=8.0, 8.0 Hz). $^{13}$C NMR (125 MHz, $CDCl_3$) δ: 136.6, 136.4, 131.9, 128.7, 127.4, 123.3. HR-MS (ESI): calcd. for $C_{12}H_6Br_2S_2$+Na 394.8170 [(M+Na)$^+$]. Found 394.8186.

Example 7

Preparation of Thienyl Substituted Thianthrenes

Scheme 18

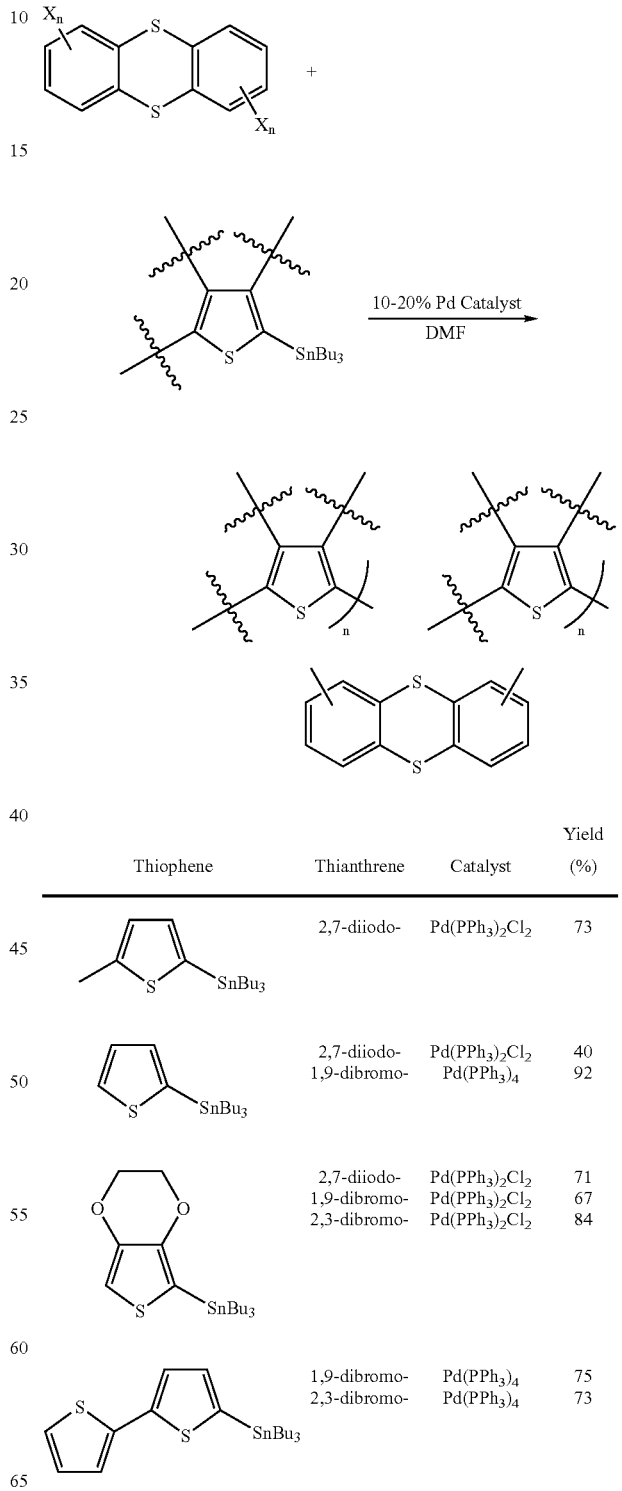

| Thiophene | Thianthrene | Catalyst | Yield (%) |
|---|---|---|---|
| (5-methyl-2-SnBu₃-thiophene) | 2,7-diiodo- | Pd(PPh₃)₂Cl₂ | 73 |
| (2-SnBu₃-thiophene) | 2,7-diiodo-<br>1,9-dibromo- | Pd(PPh₃)₂Cl₂<br>Pd(PPh₃)₄ | 40<br>92 |
| (EDOT-SnBu₃) | 2,7-diiodo-<br>1,9-dibromo-<br>2,3-dibromo- | Pd(PPh₃)₂Cl₂<br>Pd(PPh₃)₂Cl₂<br>Pd(PPh₃)₂Cl₂ | 71<br>67<br>84 |
| (bithiophene-SnBu₃) | 1,9-dibromo-<br>2,3-dibromo- | Pd(PPh₃)₄<br>Pd(PPh₃)₄ | 75<br>73 |

1,9-bis(2-thienyl)thianthrene

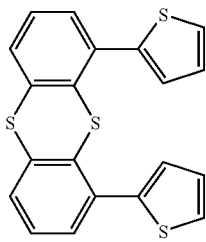

An airfree tube containing 1,9-dibromothianthrene (187 mg, 0.5 mmole) and Pd(PPh₃)₂Cl₂ (35 mg, 0.05 mmole) was flame dried and filled with Ar. DMF (5 mL) was added to the tube and the tube was heated to 70° C. Tributylstannylthiophene (580 mg, 1.5 mmole) was added and the solution turned black. The reaction mixture was stirred for 2 days and then cooled down to room temperature. It was poured into dichloromethane (50 mL) and the organic layer washed by water twice, dried by MgSO$_4$. The solvent was removed in vacao. The crude product was further purified by column chromatography (hexane/dichloromethane 6/1) and yield white crystal (196 mg, 92%).

1,9-bis([2,2'-bis-thiophene]-5-yl)thianthrene

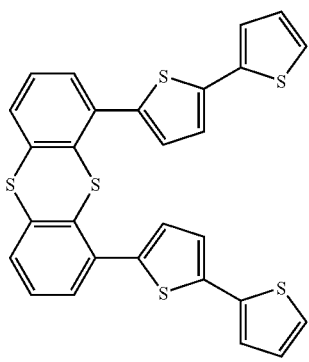

An airfree tube containing 1,9-dibromothianthrene (187 mg, 0.5 mmole) and Pd(PPh₃)₄ (58 mg, 0.05 mmole) was flame dried and filled with Ar. DMF (5 mL) was added to the tube and the tube was heated to 70° C. 5-Tributylstannyl-2,2'-bis-thiophene (683 mg, 1.5 mmole) was added and the solution turned black. The reaction mixture was stirred for 2 days and then cooled down to room temperature. It was poured into dichloromethane (50 mL) and the organic layer washed by water twice, dried by MgSO$_4$. The solvent was removed in vacao. The crude product was further purified by column chromatography (hexane/dichloromethane 8/1, and then 6/1) to yield yellow crystal (133 mg, 49%). mp 197~198° C. ¹H NMR (500 MHz, CDCl₃) δ: 7.54 (dd, 2H, J=7.5, 1.0 Hz), 7.45 (dd, 2H, J=7.5, 1.0 Hz), 7.28 (dd, 2H, J=7.5, 7.5 Hz), 7.17 (dd, 2H, J=5.0, 1.0 Hz), 7.14 (d, 2H, J=4.0 Hz), 7.12 (d, 2H, J=4.0 Hz), 7.09 (dd, 2H, J=3.5, 1.0 Hz), 6.88 (dd, 2H, J=5.0, 3.5 Hz). ¹³C NMR (125 MHz, CDCl₃) δ: 139.4, 138.4, 138.1, 137.2, 135.3, 134.7, 129.4, 129.3, 128.3, 127.8, 127.6, 124.3, 123.8, 123.5. FT-IR (KBr) ν/cm⁻¹: 3059, 1466, 1435, 1424, 1400, 1388, 838, 801, 786, 767, 732, 698, 683. HR-MS (ESI): calcd. for C₂₈H₁₆S₆+Na 566.9474 [(M+Na)⁺]. Found 566.9468.

1,9-bis([3,4-ethylenedioxythiophene]-5-yl)thianthrene

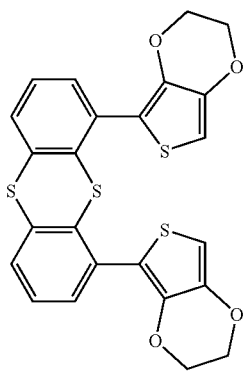

An airfree tube containing 1,9-dibromothianthrene (187 mg, 0.5 mmole) and Pd(PPh₃)₄ (58 mg, 0.05 mmole) was flame dried and filled with Ar. DMF (5 mL) was added to the tube and the tube was heated to 70° C. 5-Tributylstannyl-3,4-(ethylenedioxy)thiophene (645 mg, 1.5 mmole) was added and the solution turned black. The reaction mixture was stirred for 2 days and then cooled down to room temperature. It was poured into dichloromethane (50 mL) and the organic layer washed by water twice, dried by MgSO$_4$. The solvent was removed in vacao. The crude product was further purified by column chromatography (hexane/dichloromethane 1/1) to yield yellow crystal (165 mg, 67%).

2,3-Bis([2,2'-bis-thiophene]-5-yl)-thianthrene

In an airfree tube, 2,3-dibromothianthrene (187 mg, 0.50 mmole), Pd(PPh₃)₄ (3 mg, 0.0025 mmole) and tributylstanny-2,2'-bis-thiophene (569 mg, 12.5 mmole) were mixed in toluene (anhydrous, 2 mL). The reaction mixture was heated to 100° C. and stirred for 48 hrs. The solvent was then removed in vacuo. The crude product was further purified by column chromatography (hexane/CH₂Cl₂=6/1, and then 6/1, 3/1) to yield light yellow crystal (204 mg, 75%). mp 210~211° C. ¹H NMR (500 MHz, CDCl₃) δ: 7.62 (s, 2H), 7.50 (dd (AA'XX'), 2H, $J_{AX}$=5.5 Hz and $J_{AX'}$=3.0 Hz), 7.27 (dd (AA'XX'), 2H, $J_{AX}$=5.5 Hz and $J_{AX'}$=3.0 Hz), 7.20 (dd, 2H, J=5.0, 1.0 Hz), 7.13 (dd, 2H, J=3.5, 1.0 Hz), 7.04 (d, 2H, J=3.5 Hz), 6.99 (dd, 2H, J=5.0, 3.5 Hz), 6.82 (d, 2H, J=3.5 Hz). $^{13}$C NMR (125 MHz, CDCl$_3$) δ: 139.7, 138.4, 137.1, 135.4, 135.0, 132.7, 130.5, 128.9, 128.3, 127.9, 127.8, 124.5, 123.8, 123.7. FT-IR (KBr) v/cm$^{-1}$: 3062, 1562, 1469, 1447, 1437, 838, 800, 793, 754, 711, 698, 475, 445. HR-MS (LSI): calcd. for $C_{28}H_{16}S_6$+Na 566.9474 [(M+Na)$^+$]. Found 566.9493.

Example 8

Preparation of S-PHE (MR=1)

To a solution of poly(bis-phenol A-co-epichlorohydrin) (28.4 g) in DMF (150 mL) at 50° C., SO$_3$Py (17.5 g) in DMF (20 mL) was added. The reaction mixture was stirred at that temperature for at least 6 hrs. The reaction mixture was then cooled to 0° C. and a solution of (nBu)$_4$OH (40% aqueous solution, 72 mL) was added. The reaction mixture was then poured into water and the product is isolated by filtration, washed with water, and dried. $^1$H NMR (500 MHz, CDCl$_3$) δ: 7.06~6.99 (bm, 4H), 6.77~6.71 (bm, 4H), 4.24 (bs, 4H), 4.11 (bs, 1H), 3.11 (bs, 8H), 1.60~0.83 (m, 28H). To synthesis S-PHE with different MR, follow the quantity summarized in Table 4. The quantity of the table is based on 28.4 g of starting polymer.

TABLE 4

Reagent quantity for synthesis of S-PHE with different MR value.[a]

| Theoretical MR Value | SO$_3$•Py | (nBu)$_4$OH (40% aqeous solution) |
|---|---|---|
| 1.00 | 17.5 g | 72.0 mL |
| 0.50 | 8.80 g | 36.0 mL |
| 0.33 | 5.80 g | 24.0 mL |
| 0.20 | 3.50 g | 14.4 mL |
| 0.10 | 1.75 g | 7.50 mL |

[a]table is from Ding, J.; Price, S. F.; Wallace, G. G. Synth. Met. 2000, 110, 123, incorporated herein in its entirety by reference.

Example 9

Preparation of Polymers

Electropolymerizations were conducted in a one component cell with a platinum button, a piece of ITO glass, 5 micron interdigitated microelectrode, or platinum wire as the working electrode, a platinum coil counter electrode, and an isolated Ag/Ag+ reference electrode. The electrolyte solutions used for all electropolymerization were 0.1M nBu$_4$PF$_6$ in CH$_2$Cl$_2$, CH$_3$CN or propylene carbonate. Films from electropolymerization was grown either by swept, constant current, or constant voltage methods.

Synthesis was performed by electrodeposition under galvanostatic or swept potential conditions onto a conducting substrate. The working electrode materials were glassy carbon or 200 nm gold coated PET films (Alfa Aesar) and the counter electrode was a copper sheet (Aldrich). Conducting polymer films were grown from a solution of 5 mM calix[4]arene-bis-thiophene or quarterthiophene (QT) monomer, 0.1 M tetraethylammonium hexafluorophosphate and diverse S-PHE concentrations (0.02; 0.2; 0.5; 1; 2% weight) as well as MR values (1; 0.09; 0.06) in acetonitrile. Galvanostatic depositions were conducted at current densities of 1.25 A/m$^2$ for 5 hours resulting in film thickness between 120 and 150 μm. Deposition took place at room temperature (25° C.). The resulting films of poly(QT)/S-PHE were then peeled off the working electrode substrate, rinsed in acetonitrile and allowed to dry for 24 hours. Poly(QT)/S-PHE films had conductivities of 10$^{-1}$ S·m$^{-1}$, densities of between 550 and 750 kg m$^{-3}$ dry, tensile strengths of 20 MPa in their dry form and of 1.3 MPa when soaked in acetonitrile. Polymerization was also performed using swept potential methods (0.0 V to +1.0 V vs. Fc/Fc+ at a rate of 100 mV/s).

Example 10

Techniques and Instrumentation

Electrodepositions and electroactivations were carried out with a potentiostat (Amel, Model 2049). Bulk conductivity measurements were conducted on a custom built four point measurement apparatus connected to a multimeter (Keithley, model 2001). In situ conductivity measurements where acquired using interdigitated microelectrodes. Madden P. G., Madden J. M. and Hunter I. W., "Parallel Electrochemical Methods to Accelerate Electroactive Material Discovery and Optimization", *Material Research Society Symposium Proceedings*, Vol. 698, pp. EE1.7.1-EE1.7.6, 2002. To enhance productivity of synthesizing films, parallel high throughput electrochemical synthesis methods were developed. The purpose was to reduce the time necessary to scan through a large synthesis parameter space. In addition, such a small volume parallel system allowed us to utilize minimal quantities of monomer compound as possible. In a typical parallel synthesis setup, up to 12 polymers can be synthesized at the same time. Considering that single polymer film synthesis may take as much as 5 hours of deposition time, the high throughput synthesis technique enabled acceleration of material discovery time. The parallel deposition system is based around a 12 well tissue culture plate (Falcon, 35,3225) typically used for biological studies. Each well can contain up to 5 mL of solution. This volume can be increased to 20 mL by using tall vials (VWR). Details of this system have been previously described. Madden P. G., Madden J. M. and Hunter I. W., "Parallel Electrochemical Methods to Accelerate Electroactive Material Discovery and Optimization", *Material Research Society Symposium Proceedings*, Vol. 698, pp. EE1.7.1-EE1.7.6, 2002. In-situ conductivity measurements where acquired using interdigitated microelectrodes (Abtech Scientific); Kittelsen G. P., White H. S, and Wrighton M. S., "Chemical Derivation of Microelectrode Arrays by Oxidation of Pyrrole and N-Methylpyrrole—Fabrication of Molecule-Based Electronic Devices", *Journal of the American Chemical Society*, Vol. 106, (24): pp. 7389-7396, (1984). In-situ EPR spectroscopic data was acquired using a platinum working electrode onto which poly(QT) was polymerized.

Example 11

Preparation of poly(OT)/S-PHE Film

Synthesis was performed by electrodeposition under galvanostatic or swept potential conditions onto a conducting substrate. The working electrode materials were glassy carbon or 200 nm gold coated PET films (Alfa Aesar) and the counter electrode was a copper sheet (Aldrich). Conducting polymer films were grown from a solution of 5 mM calix[4]arene-bis-thiophene or quarterthiophene (QT) monomer, 0.1 M tetraethylammonium hexafluorophosphate and diverse S-PHE concentrations (0.02; 0.2; 0.5; 1; 2% weight) as well as MR values (1; 0.09; 0.06) in acetonitrile. Galvanostatic depositions were conducted at current densities of 0.125 A/cm2 for 5 hours, resulting in film thickness between 120 and 150 μm. Deposition took place at room temperature (25° C.). The resulting films of poly(QT)/S-PHE were then peeled off the working electrode substrate, rinsed in acetonitrile and allowed to dry for 24 hours. Poly(QT)/S-PHE films had conductivities between of $10^{-1}$ S·m$^{-1}$, densities of 550 to 750 kg m−3 dry and tensile strengths of 20 MPa in their dry form and 1.32 MPa when soaked in acetonitrile. Polymerization was also performed using swept potential methods (−0.2 V to +1 V vs. Ag/Ag+ at a rate of 100 mV/s or 25 mV/s).

INCORPORATION BY REFERENCE

All of the patents and publications cited herein are hereby incorporated by reference.

Equivalents

Those skilled in the art will recognize, or be able to ascertain using no more than routine experimentation, many equivalents to the specific embodiments of the invention described herein. Such equivalents are intended to be encompassed by the following claims.

We claim:
1. A polymer having the following formula:

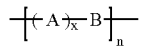

wherein,
A represents independently for each occurrence thiophene;
x is independently for each occurrence an integer from 2 to 8 inclusive;
B represents

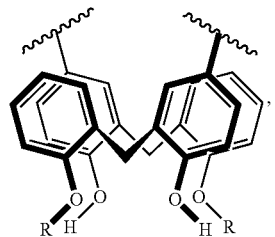

wherein
R represents independently for each occurrence H, alkyl, alkaryl, alkenyl, alkynyl, silyl, alkylthio, imino, amido, phosphoryl, phosphonate, phosphine, phosphonamide, carboxyl, carboxamide, keto, alkylsulfonyl, arylsulfonyl, selenoalkyl, formyl, ester, heteroalkyl, cyano, guanidine, amidine, acetal, ketal, aryl, heteroaryl, aralkyl, heteroaralkyl, epoxide, hydroxamic acid, imido, oxime, sulfonamine, sulfonamide, sulfonomate, thioamide, thiocarbamate, urea, thiourea, saturated or mono or poly unsaturated fatty acid, or —(CH$_2$)$_m$—R$_{80}$, or two instances of R taken together represent —CH$_2$CH$_2$OCH$_2$(CH$_2$OCH$_2$)$_y$CH$_2$OCH$_2$CH$_2$—, with the proviso that R is not methyl;

R$_{80}$ represents independently for each occurrence an aryl, cycloalkyl, cycloalkenyl, heterocyclyl, or polycyclyl group;
m is independently for each occurrence an integer in the range 0 to 8 inclusive;
y is an integer in the range 0 to 3 inclusive; and
n represents an integer from 2 to about 100.

2. The polymer of claim 1, wherein R represents independently for each occurrence H, alkyl, alkaryl, heteroalkyl, heteroalkaryl, aryl, aralkyl, heteroaryl, or heteroaralkyl, or two instances of R taken together represent —CH$_2$CH$_2$OCH$_2$(CH$_2$OCH$_2$)$_y$CH$_2$OCH$_2$CH$_2$—.

3. The polymer of claim 1, wherein x is 4, and two instances of R taken together represent —CH$_2$CH$_2$OCH$_2$(CH$_2$OCH$_2$)$_y$CH$_2$OCH$_2$CH$_2$—.

4. The polymer of claim 1, wherein x is 4, and R is H.

5. The polymer of claim 1, wherein x is 4, and R is propyl.

6. A polymeric composite comprised of a polymeric anion and a polymer having the following formula:

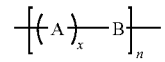

wherein
A represents independently for each occurrence thiophene;
x is independently for each occurrence an integer from 2 to 8 inclusive;
B represents

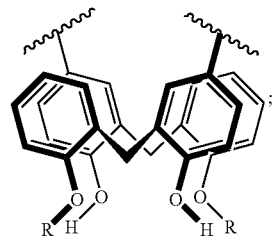

wherein
R represents independently for each occurrence H, alkyl, alkaryl, alkenyl, alkynyl, silyl, alkylthio, imino, amido, phosphoryl, phosphonate, phosphine, phosphonamide, carboxyl, carboxamide, keto, alkylsulfonyl, arylsulfonyl, selenoalkyl, formyl, ester, heteroalkyl, cyano, guanidine, amidine, acetal, ketal, aryl, heteroaryl, aralkyl, heteroaralkyl, epoxide, hydroxamic acid, imido, oxime, sulfonamine, sulfonamide, sulfonomate, thioamide, thiocarbamate, urea, thiourea, saturated or mono or poly unsaturated fatty acid, or —(CH$_2$)$_m$—R$_{80}$, or two instances of R taken together represent —CH$_2$CH$_2$OCH$_2$(CH$_2$OCH$_2$)$_y$CH$_2$OCH$_2$CH$_2$—;

R$_{80}$ represents independently for each occurrence an aryl, cycloalkyl, cycloalkenyl, heterocyclyl, or polycyclyl group;
m is independently for each occurrence an integer in the range 0 to 8 inclusive;
y is an integer in the range 0 to 3 inclusive; and
n represents an integer from 2 to about 100.

7. The polymeric composite of claim 6, wherein the polymeric anion is sulfated poly-β-hydroxy ether (S-PHE).

8. The polymeric composite of claim 7, wherein R represents independently for each occurrence H, alkyl, alkaryl, heteroalkyl, heteroalkaryl, aryl, aralkyl, heteroaryl, or heteroaralkyl, or two instances of R taken together represent —$CH_2CH_2OCH_2(CH_2OCH_2)_yCH_2OCH_2CH_2$—.

9. The polymeric composite of claim 7, wherein x is 4, and R is two instances of R taken together represent —$CH_2CH_2OCH_2(CH_2OCH_2)_yCH_2OCH_2CH_2$—.

10. The polymeric composite of claim 7, wherein x is 4, and R is H.

11. The polymeric composite of claim 7, wherein x is 4, and R is propyl.

* * * * *

UNITED STATES PATENT AND TRADEMARK OFFICE
CERTIFICATE OF CORRECTION

| | | |
|---|---|---|
| PATENT NO. | : 7,658,868 B2 | Page 1 of 1 |
| APPLICATION NO. | : 11/603314 | |
| DATED | : February 9, 2010 | |
| INVENTOR(S) | : Anquetil et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 438 days.

Signed and Sealed this

Twenty-eighth Day of December, 2010

David J. Kappos
*Director of the United States Patent and Trademark Office*